(12) United States Patent
Walia et al.

(10) Patent No.: US 8,566,223 B2
(45) Date of Patent: Oct. 22, 2013

(54) SYSTEMS AND METHODS TO BALANCE PORTFOLIOS OF SECURITIES

(75) Inventors: Hardeep Singh Walia, San Mateo, CA (US); Tariq Ali Hilaly, San Mateo, CA (US); Tuhin Ghosh, San Mateo, CA (US); Michael Vileisis Harris, San Mateo, CA (US)

(73) Assignee: Motif Investing, Inc., San Mateo, CA (US)

(*) Notice: Subject to any disclaimer, the term of this patent is extended or adjusted under 35 U.S.C. 154(b) by 14 days.

(21) Appl. No.: 13/464,719

(22) Filed: May 4, 2012

(65) Prior Publication Data

US 2013/0198014 A1    Aug. 1, 2013

Related U.S. Application Data

(60) Provisional application No. 61/592,088, filed on Jan. 30, 2012, provisional application No. 61/608,479, filed on Mar. 8, 2012.

(51) Int. Cl.
*G06Q 40/00* (2012.01)
(52) U.S. Cl.
USPC .............................. 705/37; 705/35; 705/36 R
(58) Field of Classification Search
USPC ............................................ 705/35, 36 R, 37
See application file for complete search history.

(56) References Cited

U.S. PATENT DOCUMENTS

| | | | |
|---|---|---|---|
| 7,197,484 B1 | 3/2007 | Yuyama | |
| 7,216,099 B2 * | 5/2007 | Chen et al. | 705/36 R |
| 7,769,677 B2 | 8/2010 | Waddell | |
| 7,827,087 B2 | 11/2010 | Adatia | |
| 7,860,774 B1 | 12/2010 | Peterson et al. | |
| 8,156,023 B2 | 4/2012 | Depetris et al. | |
| 8,165,948 B2 | 4/2012 | O'Shaughnessy et al. | |
| 8,355,973 B2 | 1/2013 | Geller et al. | |

(Continued)

FOREIGN PATENT DOCUMENTS

EP    1351179 A1 * 10/2003 ............... G06F 17/60

OTHER PUBLICATIONS

Maillard, S., Roncalli, T., & Teïletche, J. (2010). The properties of equally weighted risk contribution portfolios. Journal of Portfolio Management, 36(4), 60-70,10. Retrieved from http://search.proquest.com/docview/742655800?accountid=14753.*

(Continued)

*Primary Examiner* — Muriel Tinkler
(74) *Attorney, Agent, or Firm* — Goodwin Procter LLP

(57) ABSTRACT

A system and associated method allows a client to balance the client's security portfolio that includes constituent securities. A client device is provided with a client interface. A host server is coupled to the client device and executes logic resources for balancing the portfolio. A balancing engine allows a client to manipulate the client's security portfolio and keep it in balance at all times. The balancing engine provides that any constituent moved by a client remains at a declared level and remaining constituents are proportionally balanced so that the sum of the weights adds to 100%.

24 Claims, 42 Drawing Sheets

(56) References Cited

U.S. PATENT DOCUMENTS

| | | |
|---|---|---|
| 2003/0120575 A1 | 6/2003 | Wallman |
| 2003/0216932 A1 | 11/2003 | Foley |
| 2005/0010516 A1 | 1/2005 | Ivanov et al. |
| 2005/0154662 A1* | 7/2005 | Langenwalter .................. 705/35 |
| 2005/0222941 A1 | 10/2005 | Tull, Jr. |
| 2007/0130043 A1 | 6/2007 | O'Shaughnessy et al. |
| 2007/0192223 A1* | 8/2007 | Cifrese et al. ............... 705/36 R |
| 2008/0162377 A1 | 7/2008 | Pinkas |
| 2009/0063365 A1 | 3/2009 | Pinkas |
| 2010/0023416 A1* | 1/2010 | Floyd .............................. 705/26 |
| 2011/0302105 A1 | 12/2011 | Yakubov |
| 2012/0047089 A1* | 2/2012 | Waldron et al. ............. 705/36 R |

OTHER PUBLICATIONS

Barone-Adesi, G., Giannopoulos, K., & Vosper, L. (1999). VaR without correlations for portfolios of derivative securities. The Journal of Futures Markets, 19(5), 583. Retrieved from http://search.proquest.com/docview/211273064?accountid=14753.*

McClure, D. (2008). Stocks for managing portfolios. Accounting Technology, 24(10), 18-23. Retrieved from http://search.proquest.com/docview/214009106?accountid=14753.*

* cited by examiner

SYSTEMS AND METHODS TO BALANCE PORTFOLIOS OF SECURITIES

CROSS-REFERENCE TO RELATED APPLICATION

This application claims the benefit of U.S. Application No. 61/592,088 filed Jan. 30, 2012, and U.S. Application No. 61/608,479 filed Mar. 8, 2012, both of which applications are fully incorporated herein by reference.

BACKGROUND OF THE INVENTION

Field of the Invention

The present invention relates generally to systems and methods for securities transactions, and more particularly to systems and methods for client securities transactions where a balancing engine provides that any constituent moved by a client remains at a declared level and remaining constituents are proportionally balanced so that the sum of the weights adds to 100%.

SUMMARY OF THE INVENTION

An object of the present invention is to provide systems and methods for clients to balance their securities portfolios using a system with a rebalancing in operation which provides that any constituent moved by a client remains at a declared level and remaining constituents are proportionally balanced so that the sum of the weights adds to 100%.

Another object of the present invention is to provide systems and methods for clients to balance their securities portfolios with a system that has a balancing engine configured to provide for adjustment of weight for a group of securities.

A further object of the present invention is to provide systems and methods for clients to balance their securities portfolios where positive and negative weights can be adjusted to represent long or short exposure to an underlying security, and a sum of an absolute value of the negative and positive percentages adds to 100%.

A further object of the present invention is to provide systems and methods for clients to balance their securities portfolios where a declared weight level of a security can be overridden by client adjustment.

Yet another object of the present invention is to provide systems and methods for clients to balance their securities portfolios with a client disabling declared weight levels for a given constituent.

Another object of the present invention is to provide systems and methods for clients to balance their securities portfolios where errors are displayed to the client when a declared weight level of a constituent prevents a desired action These and other objects of the present invention are achieved in a system for allowing a client to balance a client's security portfolio that includes constituent securities. A client device is provided with a client interface. A host server is coupled to the client device and executes logic resources for balancing the portfolio. A balancing engine allows a client to manipulate the client's security portfolio and keep it in balance at all times. The balancing engine provides that any constituent moved by a client remains at a declared level and remaining constituents are proportionally balanced so that the sum of the weights adds to 100%.

In another embodiment of the present invention, a method is provided for allowing a client to balance a client's security portfolio that includes constituent securities. A client device is provided with a client interface and a balancing engine. The balancing engine allows the client to manipulate the client's security portfolio and keep it in balance at all times. The balancing engine is configured to provide that any constituent moved by the client remains at a declared level, and remaining constituents are proportionally balanced so that the sum of the weights adds to 100%.

DETAILED DESCRIPTION OF THE PREFERRED EMBODIMENTS

The following description is presented to enable one skilled in the art to make and use the share-weighted portfolios, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Note that any of the methods described herein may be performed by hardware, software (including microcode), firmware, or any combination thereof. For example, a storage medium may store thereon instructions that when executed by a machine result in performance according to any of the embodiments described herein. Thus, the present invention is not intended to be limited to the embodiments shown and the inventor regards his invention as any patentable subject matter described.

Figure 1:
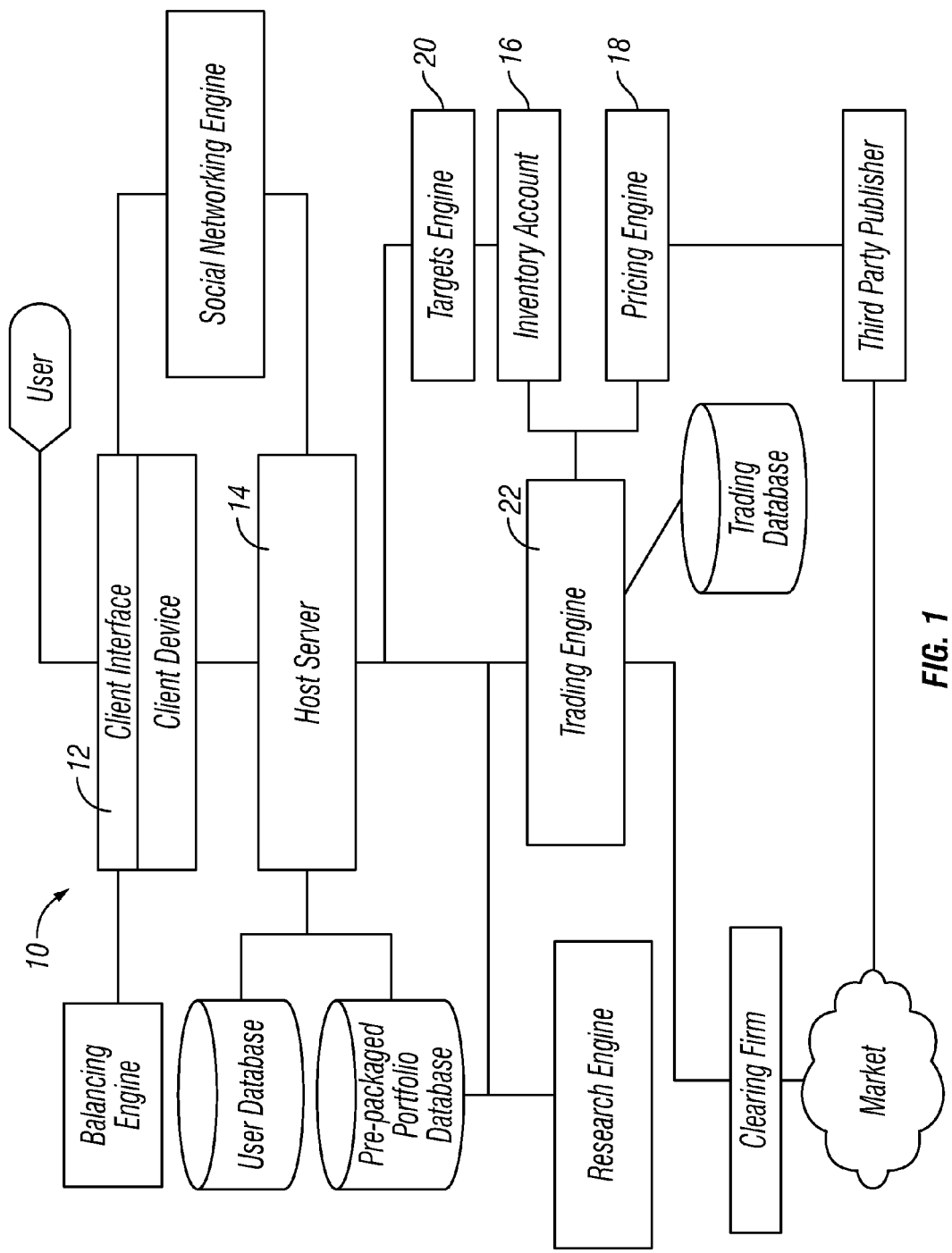
FIG. 1 is an overall block diagram illustrating one embodiment of a system of the present invention.

FIG. 1 illustrates one embodiment of a system 10 of the present invention. The system 10 includes, a client device 12 with an interface, a host server 14, inventory account 16, pricing engine 18, targets engine 20 and a trading engine 22.

The system 10 can also include a balancing engine that is configured to provide for adjustment of weight for a group of securities. The system 10 can also include a social networking engine, a research engine and a third party publisher device. The research engine can include logic resources used to build and customize pre-packaged share weighted portfolios of securities.

In various embodiments, the client device 12 can be a smart or dumb terminal, network computer, personal digital assistant, wireless device, smartphone, tablet, game machine, music player, mobile telephone, laptop, palmtop, wireless telephone, information appliance, workstation, minicomputer, mainframe computer and other computing device. In one embodiment, the user interface has application logic implemented as part of the interface presented to the client device 12. In one embodiment, the client interface is a web page rendered on the client device 12 that includes interactive components, text, graphics, sounds, and links to other web pages. The client uses the interface to research and analyze currently owned and desired securities/portfolios and to communicate their intention to the host server 14.

In one embodiment, the inventory account 16 holds the securities bought, or sold short. In one embodiment the inventory account 16 is associated with an order management system 10 that can include, logic resources, databases and communication infrastructure used to receive, analyze, route, and execute client buy, sell, sell short, and buy to cover share-weighted portfolio orders.

In one embodiment, the host server 14 has hardware resources coupled with software resources, including a web server that receives a client web request, delegates the request to appropriate hardware or logic resources for processing and communicates the resulting response to the client device 12. In one embodiment, the host server 14 includes a database that stores at least one of historical market data, third party data, client account data, positions data, customized portfolio data and pre-packaged portfolio data. This database is in communication with the trading engine. The database provides access to data in response to requests received from the client device 12. In one embodiment, the host server 14 is configured to receive requests for dynamic advertisement.

The targets engine 20 includes logic resource that calculates the target number of long and short shares of a security to be held in the inventory account 16, and the like.

In one embodiment, the trading engine is a combination of hardware, logic, and communication resources that executes a client request for the purchase and sale of securities through a combination of routing of orders to market venues and/or allocations from the inventory account 16. The trading engine can include, pricing, reservation cost optimization, buying power and the like. The trading engine is configured to provide return communications with the client device 12 with regard to status or execution of a transaction. In one embodiment, the targets engine 20 includes logic resources that uses probabilistic models to compute target long or short positions for each security in the inventory account 16.

A trading database, with hardware resources in conjunction with software resources, can be associated with the trading engine and used to store details on client and system 10 transactions.

In one embodiment, the pricing engine 18 includes network infrastructure, hardware, and logic resources used to determine real time market prices for securities ordered by a client. The pricing engine 18 calculates a current market price of shares of a security.

Market data is utilized that is pricing data obtained from market venues that quantifies the valuation of securities.

In one embodiment, the research engine includes portfolio creation and optimization logic resources used to determine final share-weighted portfolio constituents as a subset of an idea index and to compute weights for constituent securities in a final thematic share-weighted portfolio. In one embodiment, a research database includes hardware resources in conjunction with software resources used to store fundamental and pricing data on securities.

In one embodiment, a clearing firm can be used by the system 10. The clearing firm is a financial organization that handles trades, settlement and delivery of stocks and securities.

The system 10 can include a pre-packaged portfolio database with hardware resources in conjunction with software resources used to store thematic share-weighted portfolio constituents. A user database is included with hardware resources in conjunction with software resources used to store client details and their respective positions.

The system 10 can also include an optimizer that is a logic resource used to compute weights for constituent stocks in a final motif. Security weights in the share-weighted portfolio are chosen to minimize historical tracking error between a final share-weighted portfolio and the idea index while maintaining the risk-return characteristics of the idea index. A pre-packaged share-weighted portfolio constructor is a logic resource used to determine final share-weighted portfolio constituents as a subset of the idea index.

An order flow data aggregator can be provided that has logic resources to analyze historical share-weighted portfolio transaction data and compute aggregated statistically relevant measures.

In one embodiment, the system 10 includes user accounts which are records of a client's portfolio positions and transaction history that is maintained and stored using the system's logic and hardware resources.

The system 10 can also include an order overlay that is an open order overlay is a data resource that tracks un-executed orders that will have a net impact on the inventory account 16 if and when they are executed.

An outer-flow is a reference in the child logic resource to the parent logic resource where the parent requests a response or decision based on the input fed to the child.

In one embodiment, the system 10 has a target number of shares for conducting security transactions. The client device 12 with client interface receives a client buy, sell, sell short, or buy to cover order. The host server 14, coupled to the client device 12, executes logic resources for carrying out transactions for the client. The targets engine 20 determines a target number of long and shorted shares of a security to be held by the inventory account 16. The trading engine processes the client buy, sell, sell short, or buy to cover order. For a buy order the trading engine fills the buy order for both whole and fraction shares from the inventory account 16 if there is sufficient inventory in the inventory account 16. When there is insufficient inventory for the buy order, the trading engine completes a purchase of fraction shares first from the inventory account 16 and then purchases the remainder of the buy order from the market. When the inventory account 16 can not fill any of the buy order, the trading engine purchases the entire buy order from the market and in the same order purchases a target of shares set by the targets engine 20 for the inventory account 16. An associated method is provided.

In one embodiment, the purchase and sales of securities for the inventory account 16 is made in conjunction with a client order. In another embodiment, the client order is selected from at least one of, a thematic share-weighted portfolio, customization or modification of a default share-weighted portfolio, purchase of a share-weighted portfolio, and selling of an owned share-weighted portfolio.

In another embodiment, for a sell order the trading engine sells a whole and fraction number of the shares of a security to the inventory account 16 when a sum of the inventory account's 16 current balance and a size of the order is less than or equal to the inventory account's target. The trading engine sells only a fraction to the inventory account 16 and sends a whole component of the order to market if the inventory account's balance is near its target and cannot buy the whole component of the order. The trading engine increases a size of a market sell order by 1 to reduce the inventory account balance when the inventory account balance has exceeded the target set by the targets engine 20.

For a short sell order, the trading engine fills the short sell order for whole and fraction shares from the inventory account 16 if there is sufficient short inventory in the inventory account 16. When there is insufficient inventory in the inventory account 16, the trading engine completes the short sell of fraction shares first from the inventory account 16 and then shorts the whole component of the short sell order from the market. When the inventory account 16 can not fill any of the short sell order the trading engine shorts the entire short order from the market and also shorts a target of shares set by the targets engine 20 for the inventory account 16.

For a buy to cover order the trading engine acquires an obligation of a borrowed whole and fraction number of the shares for the inventory account 16 when a sum of the inventory account's current balance and a size of the order is less than or equal to the inventory account's short target. The trading engine acquires the obligation of the borrowed of only the fraction to the inventory account 16 and sends the whole component of the order to market if the inventory account's balance is near the target. The trading engine increases a size of a market buy to cover the order by 1 to reduce the inventory account's short balance when the inventory account balance has exceeded the short sell target.

In another embodiment, the trading engine is configured to process the client buy, sell, sell short or buy to cover order. The trading engine enables the trading of fraction shares in real time as well as reduces the frequency of orders sent to market by executing principal trades against the inventory account 16. A corresponding method is provided.

In another embodiment, the targets engine 20 calculates a target number of long and short shares of a stock to be included in the inventory account 16 to meet present and future buy, sell, sell short, and buy to cover client orders. A corresponding method is provided. In one embodiment, lower targets are set for thinly traded stocks. In another embodiment, the targets are set in response to a probabilistic model for future orders. In another embodiment, predicted order flow and client order flow are both used to calculate the targets.

In another embodiment, the balancing engine allows a client to manipulate the client's security portfolio and keep it in balance at all times. The balancing engine provides that any constituent moved by a client remains at a declared level and remaining constituents are proportionally balanced so that the sum of the weights adds to 100%. An associated method is provided. In another embodiment, positive and negative weights can be adjusted to represent long or short exposure to an underlying security, with the sum of an absolute value of the negative and positive percentages adding to 100%. In another embodiment, a declared weight level of a security can be overridden by client adjustment. In another embodiment, a client can disable declared weight levels for a given constituent. In another embodiment, errors are displayed to the client when the declared weight level of a constituent prevents the desired action In another embodiment of the present invention, the targets engine 20 determines a target number of long and shorted shares of a security to be held by the inventory account 16. The trading engine processes a rebalance order of the client's portfolio. The client receives a list of current positions, selects a share-weighted portfolio, chooses an alternate weighting, and decides to: (i) add funds, (ii) remove funds or (iii) rebalance the share-weighted portfolio. A corresponding method is provided. In another embodiment, logic resources are applied to calculate a set of buy, sell, buy to cover, or sell short orders to fulfill the client's alternate weighting scheme as well as add to, remove from, or retain the amount of capital specified by the client.

In another embodiment of the present invention, the trading engine processes a client index or theme based basket order as a single order. The trading engine enables the trading of fraction shares in real time as well as reduces a frequency of orders sent to market by executing principal trades against the inventory account 16. A corresponding method is provided. In one embodiment, the client's order is based on a pre-packaged or customized thematic share-weighted portfolio.

In another embodiment of the present invention, the trading engine processes a client order for hedging of market exposure or harvesting of tax losses. The trading engine enables the trading of fraction shares and reduces a frequency of orders sent to market by executing principal trades against the inventory account 16. A corresponding method is provided.

In another embodiment of the present invention, the social networking engine allows clients to share information for at least one of, portfolios, orders and investment ideas. The social networking engine allows users to execute securities transactions based on the shared information. A corresponding method is provided. Users can communicate, collaborate and collectively build portfolios of securities. In one embodiment, the social networking engine is configured to provide that a client's positions can be viewed by a configurable set of other clients. In another embodiment, the social networking engine is configured to provide that a client can comment as themselves or anonymously on a portfolio of securities. In one embodiment, the social networking engine is configured to provide that a client may create or customize lists of friends who are clients on the system 10 and/or friends on one or more external social network sites. In one embodiment, the social networking engine is configured to provide that a client can adjust privacy filters to enable or prevent a sharing of the client's positions, orders, and comments with one or more lists of friends. In another embodiment, the social networking engine is configured to provide that clients can flag other user's comments as inappropriate. In another embodiment, the social networking engine is configured to provide that flagged comments can be removed based on statistics about the comment, number of times it was flagged, and the clients who flagged the comment.

In one embodiment of the system 10, the trading engine processes the client order in real time. In another embodiment, the trading engine processes client orders independently from other clients. In yet another embodiment, the trading engine does not net client orders when processing client orders. In one embodiment, the pricing engine 18 provides a market price of shares transacted from the inventory account 16.

Figure 2:
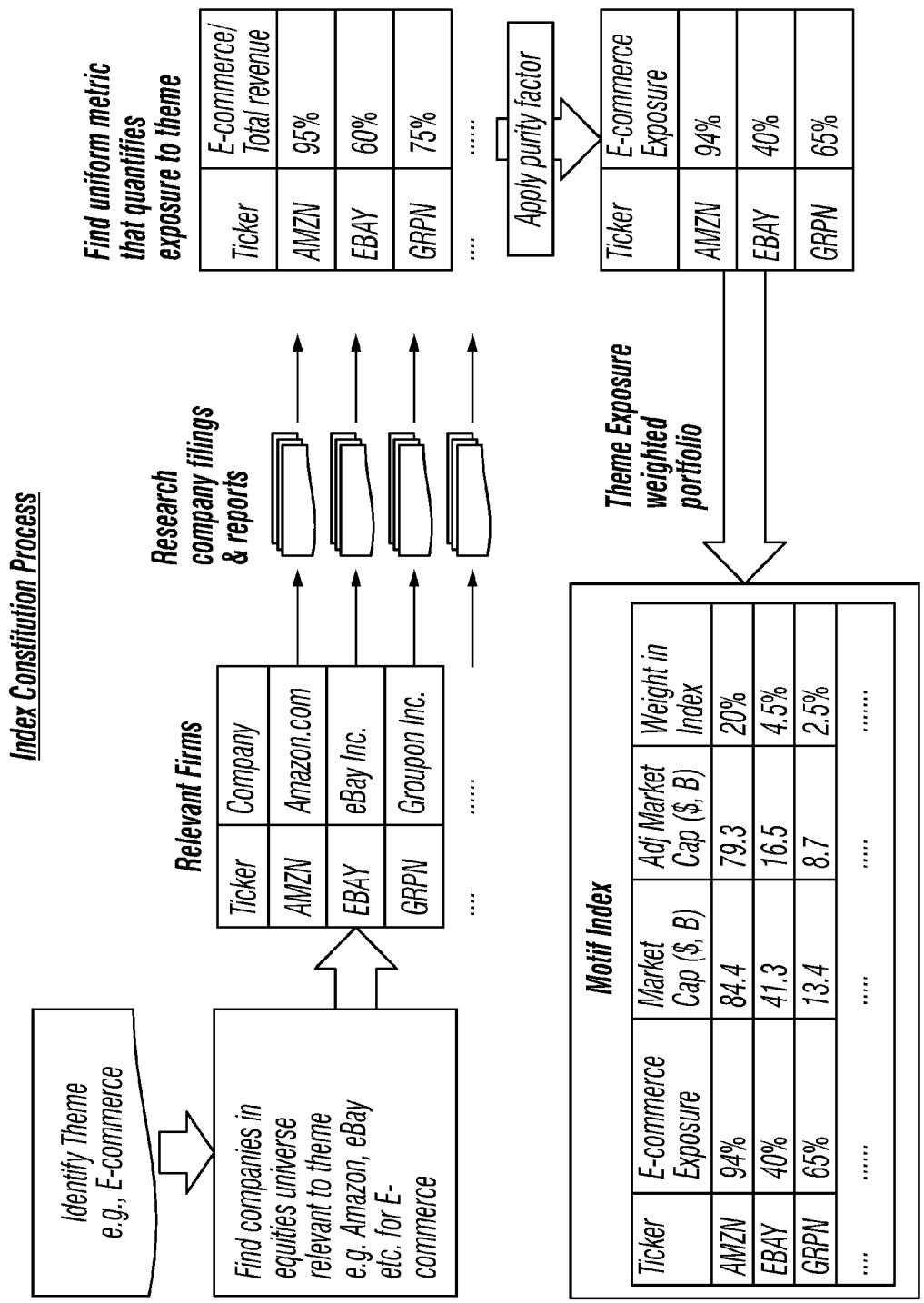
FIG. 2 is a flow chart illustrating one embodiment of an index constitution process.

Referring to FIG. 2, a flow chart of the Index constitution process is illustrated. An identifying theme is used and companies are found in the equities universe that have exposure to the selected theme. The public SEC filings and reports on the relevant firms are researched to determine each firm's exposure to the theme. A uniform metric such as revenue, operating income etc. is found that quantifies exposure of each firm in the Idea Index to the theme. A purity premium factor is then applied that further scales down the weight for firms that have a relatively small exposure to the theme. A thematically weighted Index is thus created and is used as an input for share-weighted portfolio construction.

Figure 3:
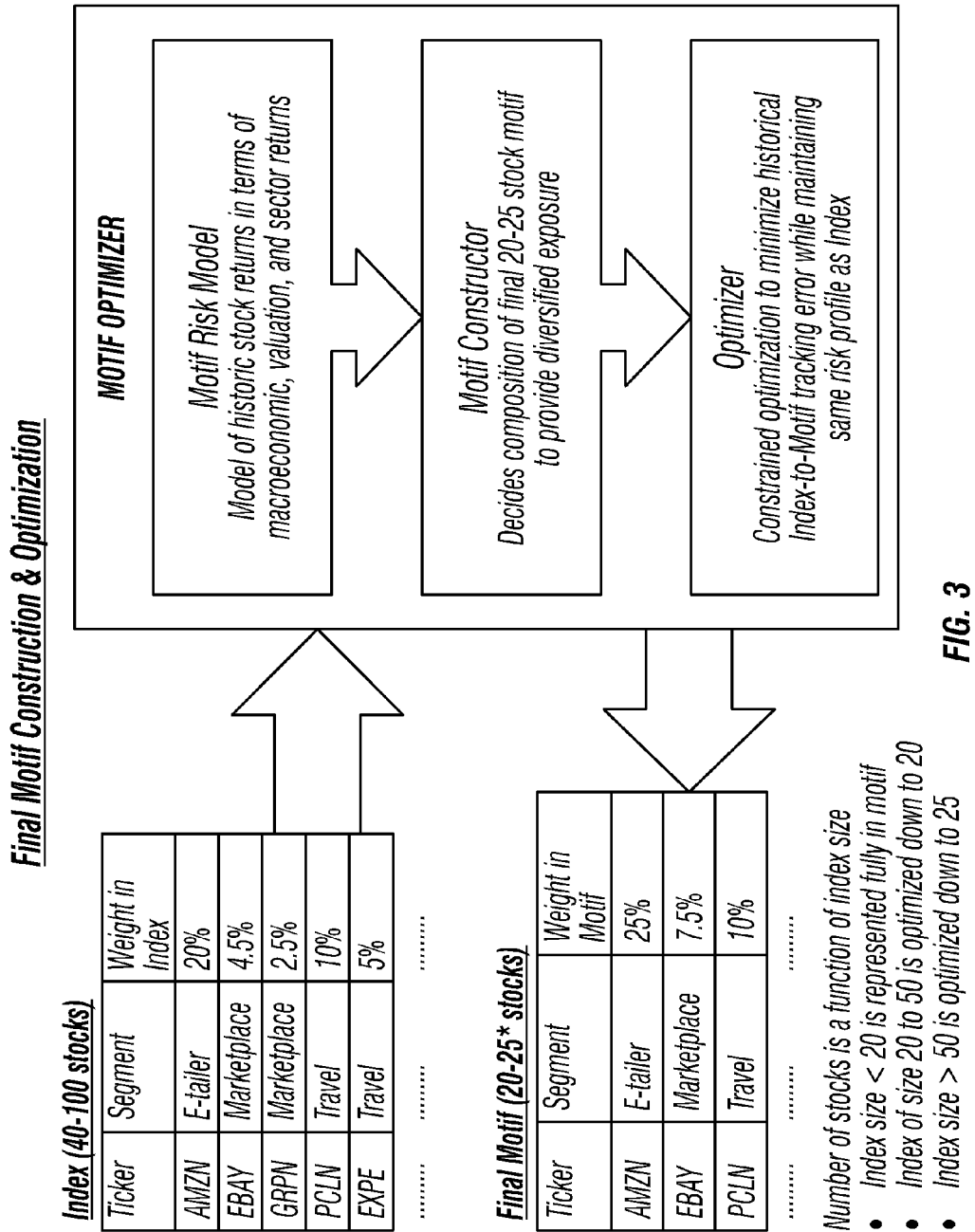
FIG. 3 illustrates one embodiment of the creation of a final share-weighted portfolio, construction and optimization.

The creation of a final share-weighted portfolio (construction and optimization) is illustrated in FIG. 3. An Idea that includes each relevant firm's ticker, segment and weight is input to a share-weighted portfolio optimizer. The share-weighted portfolio optimizer uses a risk model which is a model of historical stock returns in terms of macroeconomic conditions, valuation factors and sector returns. The share-weighted portfolio constructor decides the composition of the final share-weighted portfolio to provide the maximum diversification possible using the stocks from the Idea Index. The optimizer applies a constrained minimization algorithm to decide the weights of the stocks in the final share-weighted portfolio such that the tracking error of the final portfolio with respect to the Index is minimized while maintaining the same risk-return characteristics as the Idea Index. The output from the share-weighted portfolio optimizer is the final thematically weighted pre-packaged portfolio.

In one embodiment, share-weighted portfolio order customization uses logic resources that are implemented to allow, (i) weight modification of each segment, (ii) weight modifications for individual stocks in share-weighted portfolio, (iii) deletion of stocks, (iv) one-click deletion of all stocks in a segment and (v) the addition of stocks not included in the original construction. In all cases logic resources are implemented to automatically balance the construction such that the sum of the weights of the segments as well as the sum of the weights of the stocks remains 100%.

Figure 4:
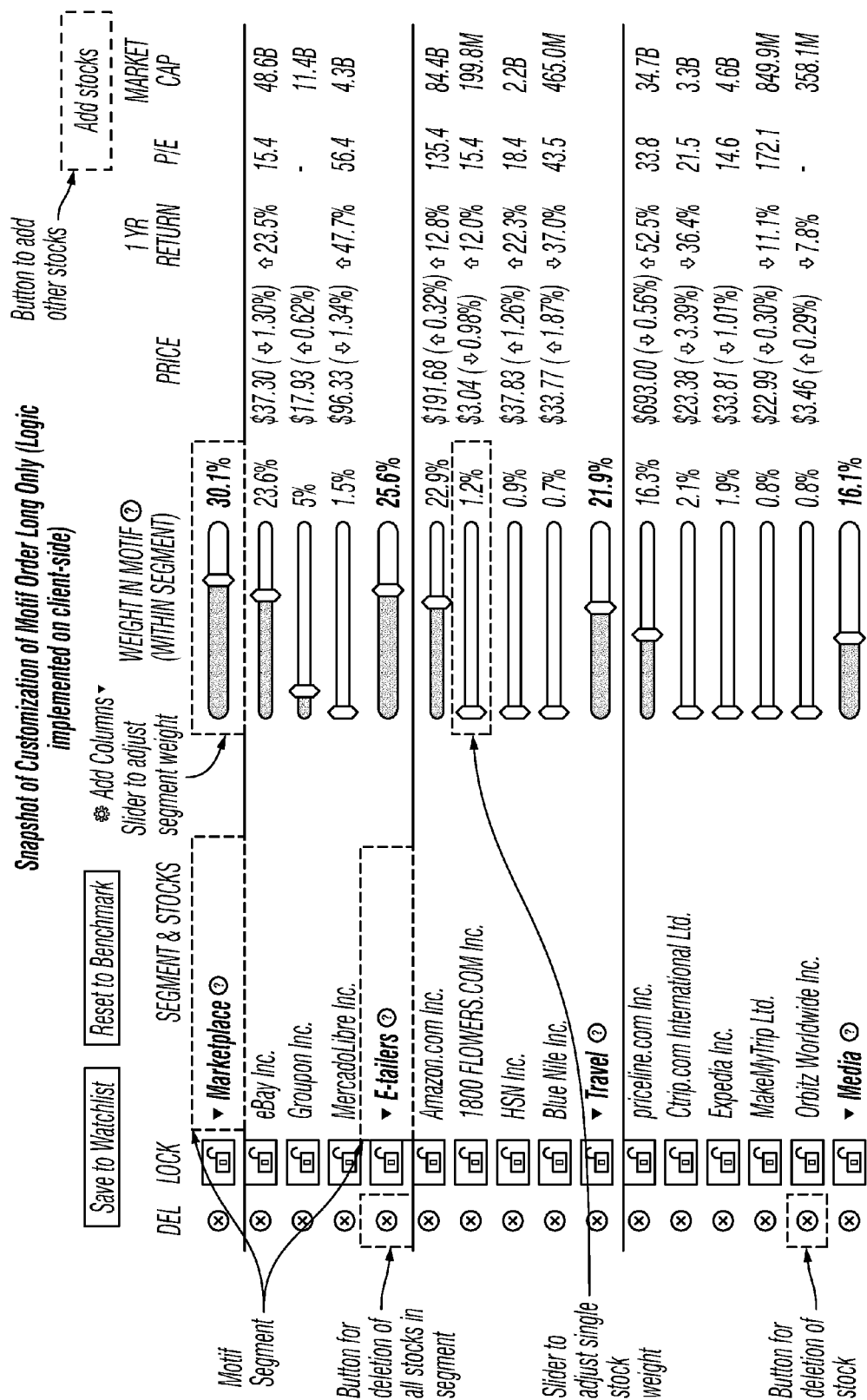
FIG. 4 is a snapshot of one embodiment for manipulation of a client's long only security portfolio kept at balance at all times that is implemented at the client interface.

FIG. 4 is a snapshot of one embodiment for manipulation of the client's long only security portfolio and keep it in balance at all times that is implemented at the client interface. As shown, motif segments, including but not limited to Marketplace, E-tailers, Travel, Media and the like are listed. A slider, or other equivalent structure, is included to enable the client to adjust a segment weight. A button or other equivalent structure is provided for the client to add other stocks. A button, or other equivalent structure, is provided for the deletion of all stocks in a segment, as well as for the deletion of a stock, and the like. A slider, or other equivalent structure, is also included to adjust an individual stock weight inside a segment. Additionally buttons, or other equivalent structures, are provided to enable setting of declared levels for segment weights and stock weights such that their values are not changed when auto balancing logic is engaged.

Figure 5:
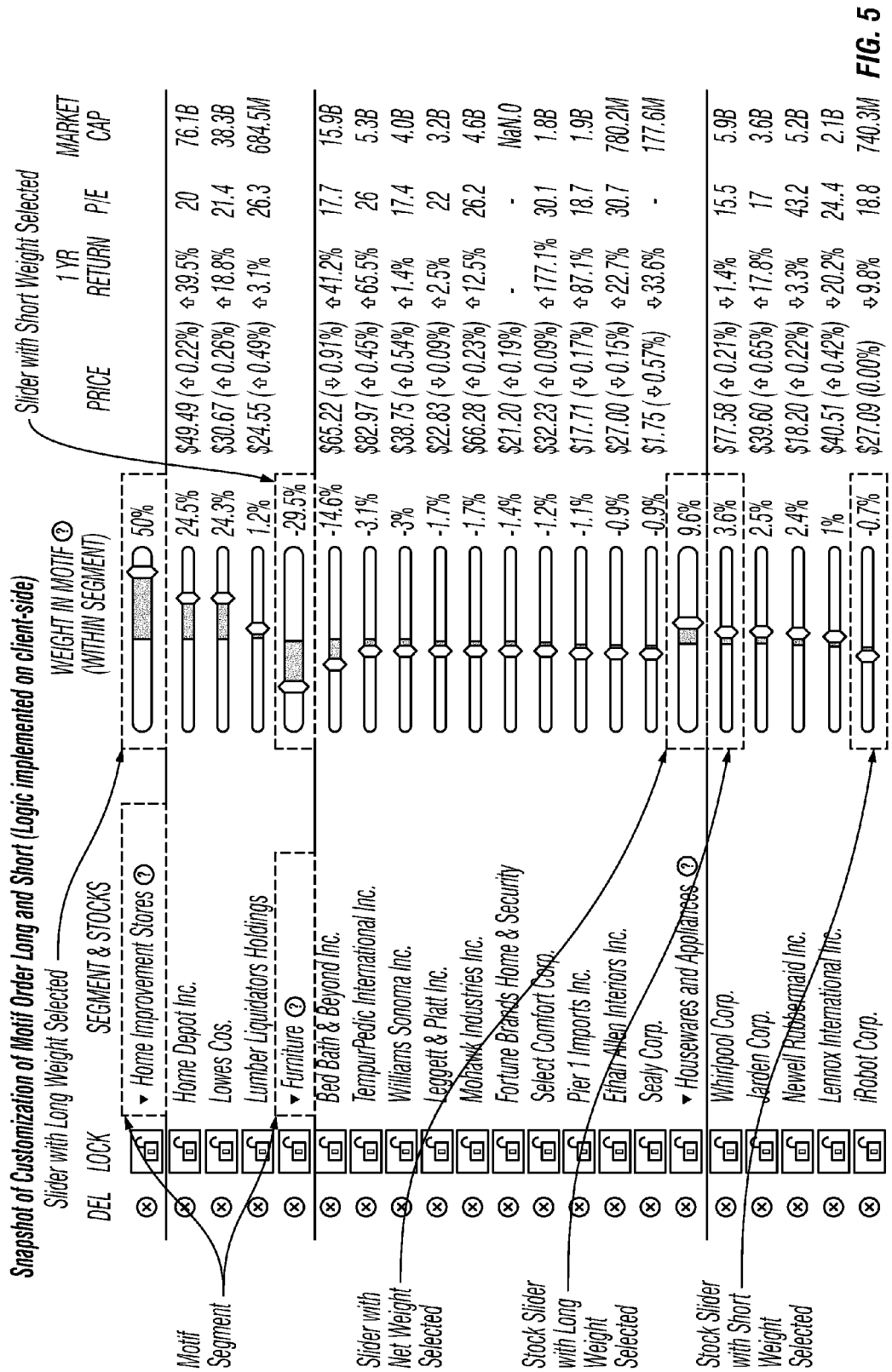
FIG. 5 is a snapshot of one embodiment for customization of a share-weighted portfolio construction that includes long and short weights.

FIG. 5 is a snapshot of one embodiment for customization of a share-weighted portfolio construction, for long and short, that is implemented at the client interface. Sliders or equivalent structures are provided for the selection of long and short weights. Sliders or equivalent structures are provided for, selecting a net segment weight, as well as for the selection of a long weight and selection of a short weight for an individual security.

Figure 6:
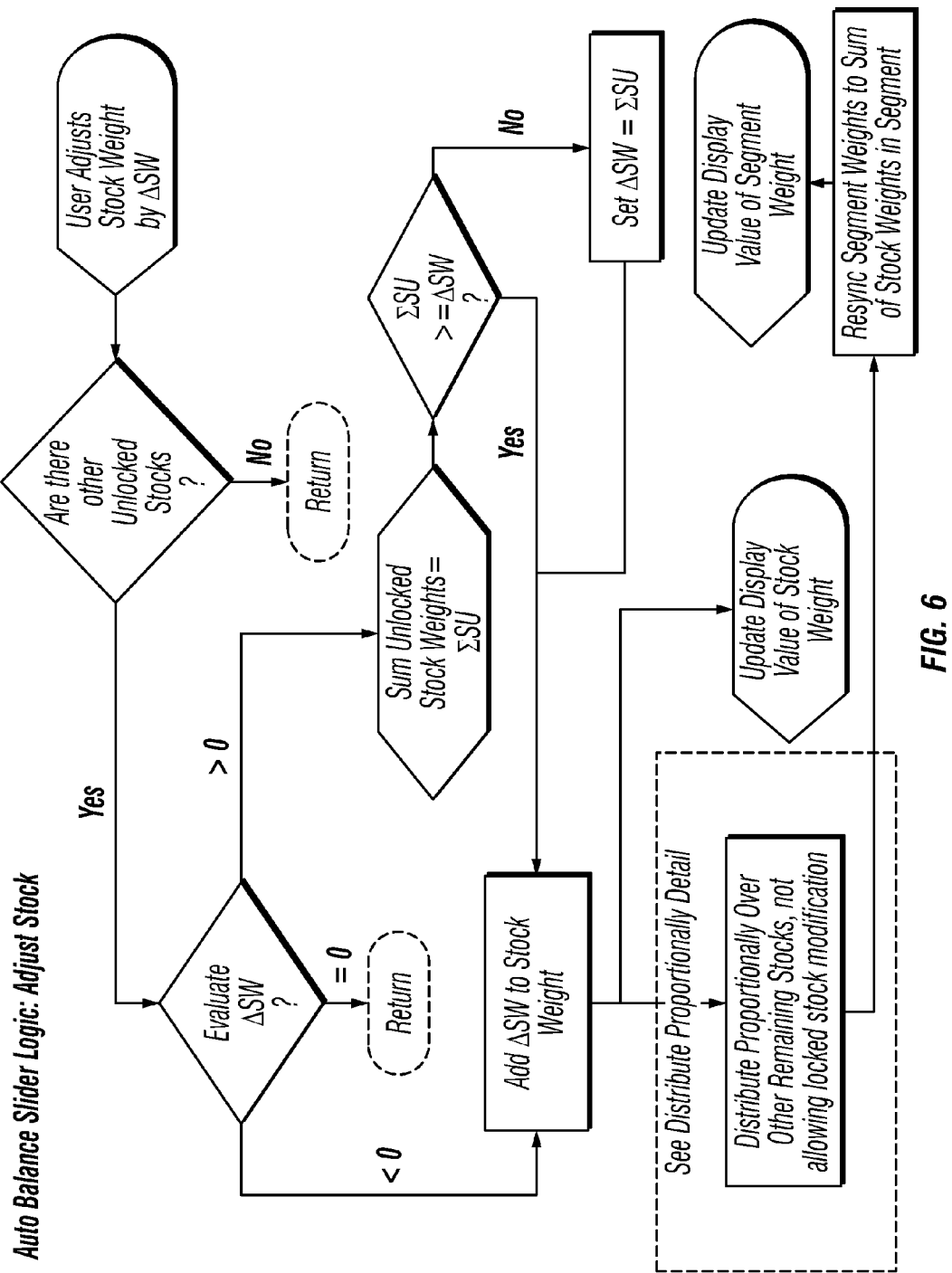
FIG. 6 is a flowchart illustrating an embodiment of auto balancing a client's portfolio in response to a security weight adjustment.

FIG. 6 is a flowchart illustrating an embodiment of auto balancing a client's portfolio in response to a security weight adjustment. The client adjusts a security weight by ΔSW. If there aren't other securities with weights set at declared levels, then the system 10 cannot make the requested adjustment and will return an error message to the client, else the direction of the change is evaluated.

If the change is an increase in weight, the sum of the security weights of securities whose levels have not been set by the client is computed. If there is not a sufficient amount of unlocked weight then the weight change adjustment requested by the client is reduced to the amount available. In either case the modified or unmodified change is applied to the security's weight and the user interface components are updated. Once the change has been made to the security itself the weights of the other securities and segments must be computed.

Figure 7:
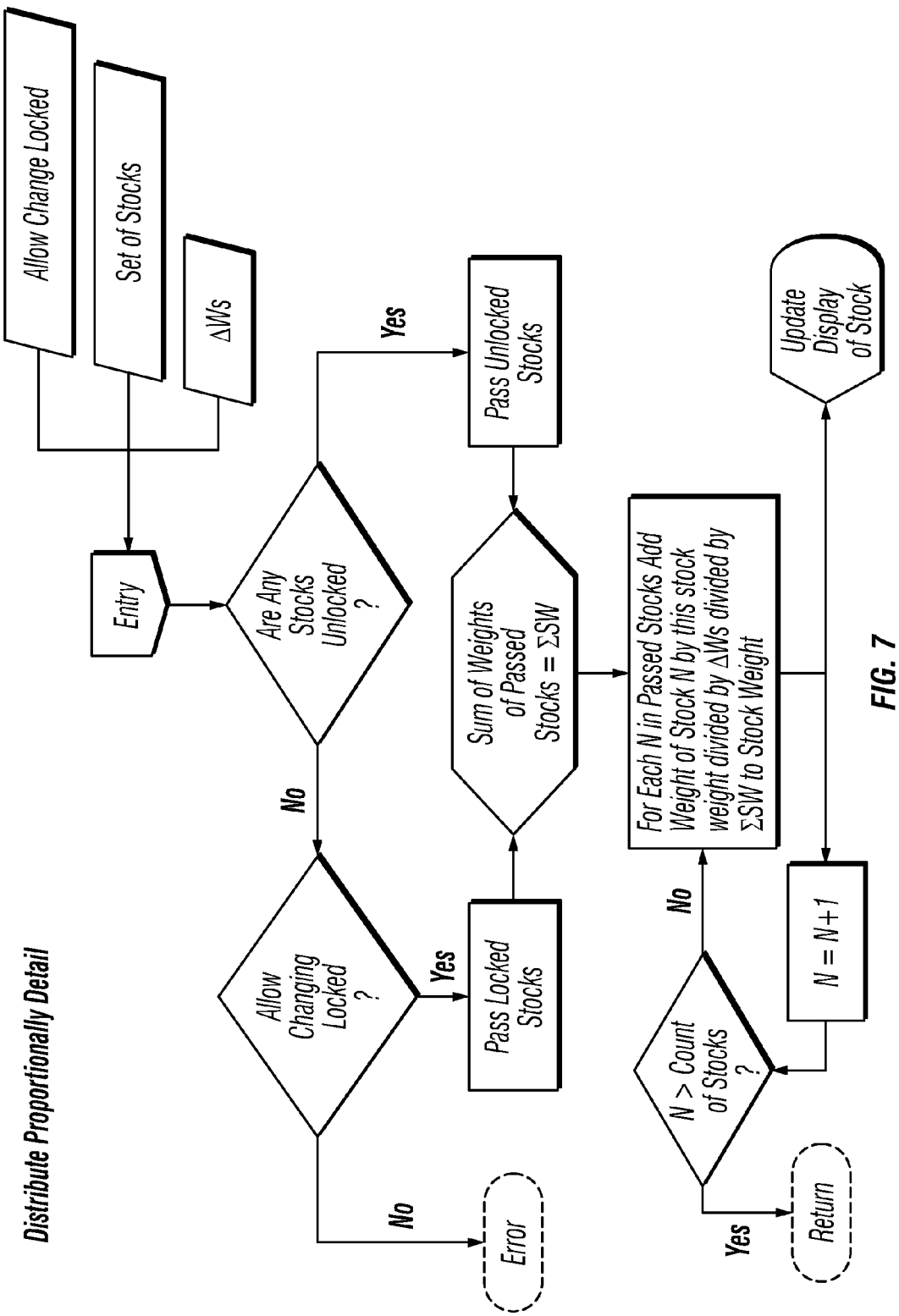
FIG. 7 illustrates an embodiment of the logic applied to determine how to distribute a weight change among the other securities.

The logic applied to determine how to distribute the weight change among the other securities is illustrated in FIG. 7. The logic is passed in three pieces of data: whether or not to allow the modification of weights for securities that have been set at declared levels, the set of securities to be modified, and the amount to apply across the set of securities passed in. The logic first determines if there are any unlocked securities that do not have weights set at levels declared by the client. If there are unlocked securities then, the set of securities is filtered to only include the unlocked securities. The sum of these unlocked securities is computed. For each of securities to be adjusted, the adjustment is calculated as the weight of the security divided by the sum of the weights of the securities to be adjusted multiplied by the total amount to apply across the set of securities. This proportional adjustment is then added to the security's weight and the user interface elements related to the security are updated with the new values. However, if there are no unlocked securities in the set of securities passed then the logic checks whether it is allowed to modify the weights of locked securities whose weights have been set at declared levels by the client. If it is not allowed to modify the weights of locked securities, the logic then returns an error to the client. If the modification of locked securities is allowed, then the locked securities are used as the set of securities to be adjusted. This set of securities then follows the aforementioned logic to calculate and apply the proportional adjustment to each security.

Once the logic illustrated in FIG. 7 is applied to the remaining securities, the segment weights are recalculated as the sum of the weights of the securities within each respective segment. The user interface elements related to the segments are subsequently updated.

Figure 8:
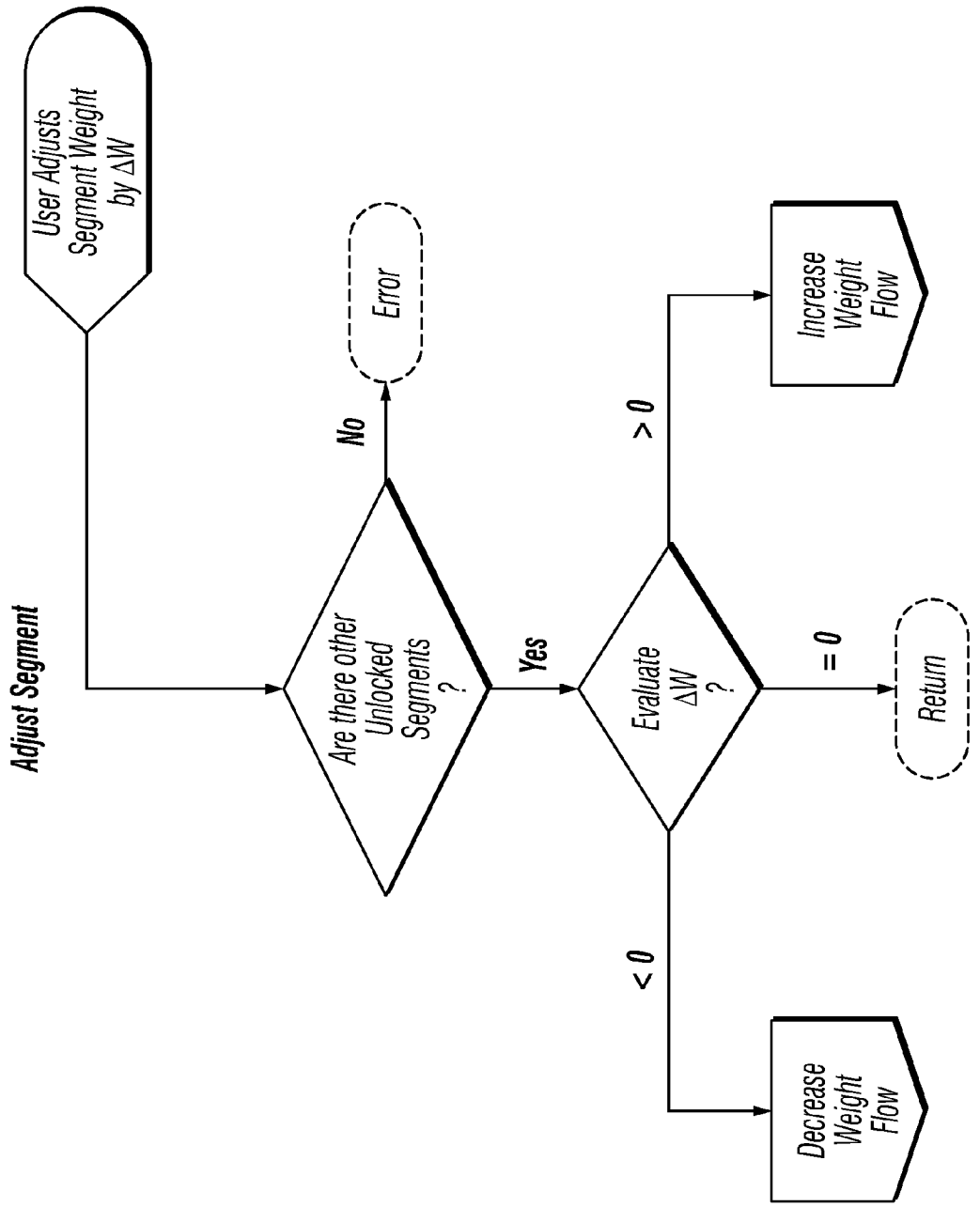
FIG. 8 illustrates an embodiment of auto balancing logic in response to a segment weight change requested by a client.

FIG. 8 illustrates an embodiment of auto balancing logic in response to a segment weight change requested by the client. The logic first determines whether or not there are other unlocked segments. If there are no other unlocked segments than the requested modification cannot be made and an error is returned to the client. If there are other unlocked segments, then the quantity change is evaluated to determine whether the client is requesting to add weight, subtract weight, or make no change to the segment. When the requested change is zero, the logic returns immediately to the client since no change has been requested.

Figure 9:
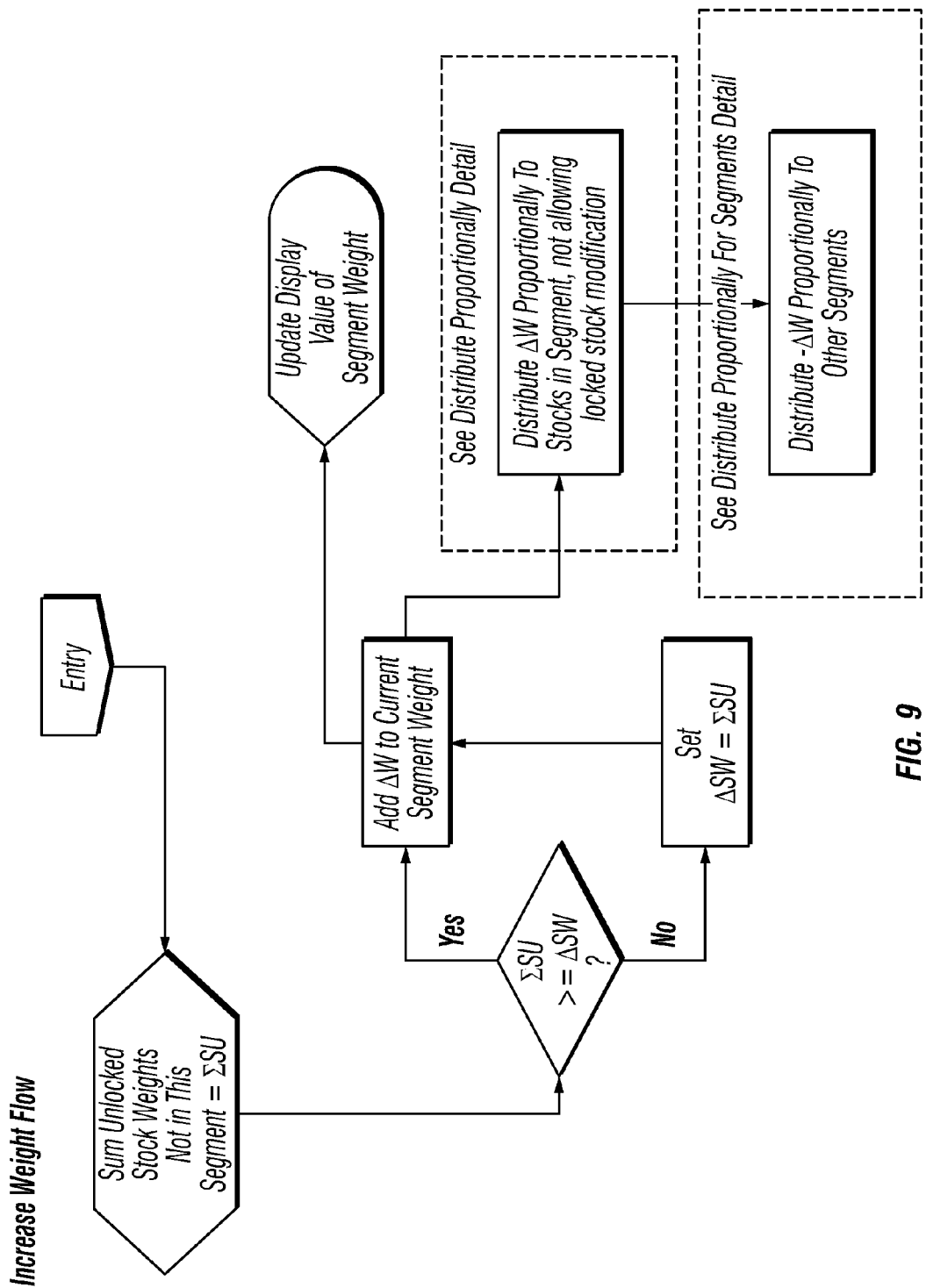
FIG. 9 illustrates an embodiment of the logic when a weight of the segment is being increased.

FIG. 9 illustrates the logic when the weight of the segment is being increased. The logic first computes the sum of the unlocked weights that are not in the segment that is being changed as the weight available to change. The weight available to change is compared to the change requested. If the weight available to change is less than the requested change than the requested change is reduced to the weight available to change. The requested change is then applied to the segment being modified and the user interface elements associated with that segment are updated to reflect the new value. The requested change is then propagated to the securities within the segment not allowing any securities that have been set at declared levels to be modified. The logic for distributing an arbitrary weight to a set of securities is illustrated in FIG. 7 and described above. Finally, the negation of the requested change is proportionally distributed to the other segments.

Figure 10:
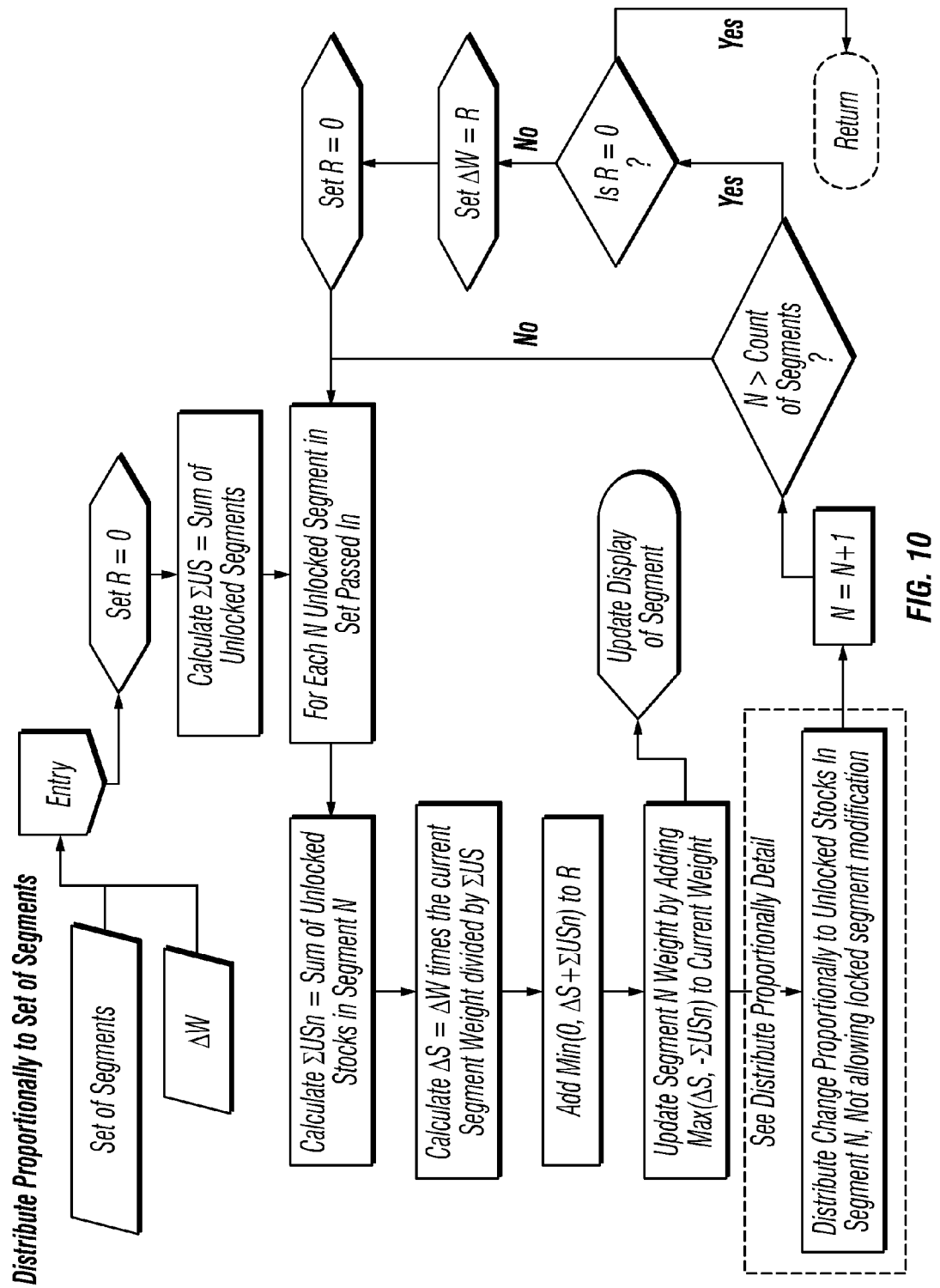
FIG. 10 illustrates an embodiment of how the other segment weights are updated.

FIG. 10 illustrates how the other segments weights are updated. The logic here takes in a set of segments to be modified, along with the amount with which to modify the segments. Since the calling logic always negates the amount passed in to this flow, the change requested here will always be a negative value. The logic first sets a remainder value to zero. The remainder value will later be used in a recursive manner to calculate the appropriate proportional distribution for each segment. With an unlocked segment defined as a segment that has one or more unlocked security, the logic sums these unlocked segment weights. For each of the unlocked segment, the sum of the unlocked securities within the segment is computed. The logic then computes the amount by which the segment should be adjusted. This amount is defined as the current segment's weight divided by the sum of the unlocked segments multiplied by the requested overall change.

The minimum of zero and the sum of the segment adjustment and the sum of the unlocked segment weights is added to the current value of the remainder. This amount represents the change that could not be applied to the segment proportionally due to some of the securities within the segment being set at declared levels by the client (and therefore unmodifiable). The segment weight is updated by adding the maximum value of the segment change and the negation of the sum of the unlocked security weights within the segment to its current value. Since both values are negative, the least negative number will be returned by the maximum evaluation and the segment will always go down in weight. The user interface elements associated with the segment are updated to reflect the new value.

The change to the segment is then proportionally distributed to the unlocked segment as described in FIG. 7 and described above. Once all segments have been updated, the remainder must also be distributed proportionally. This distribution is performed by setting the change requested to the remainder, resetting the remainder to zero and looping over the segments again distributing the remainder to the segments in the same manner as described earlier. The recursive loop ends when there is no longer a remainder and the logic is complete and returns.

Figure 11:
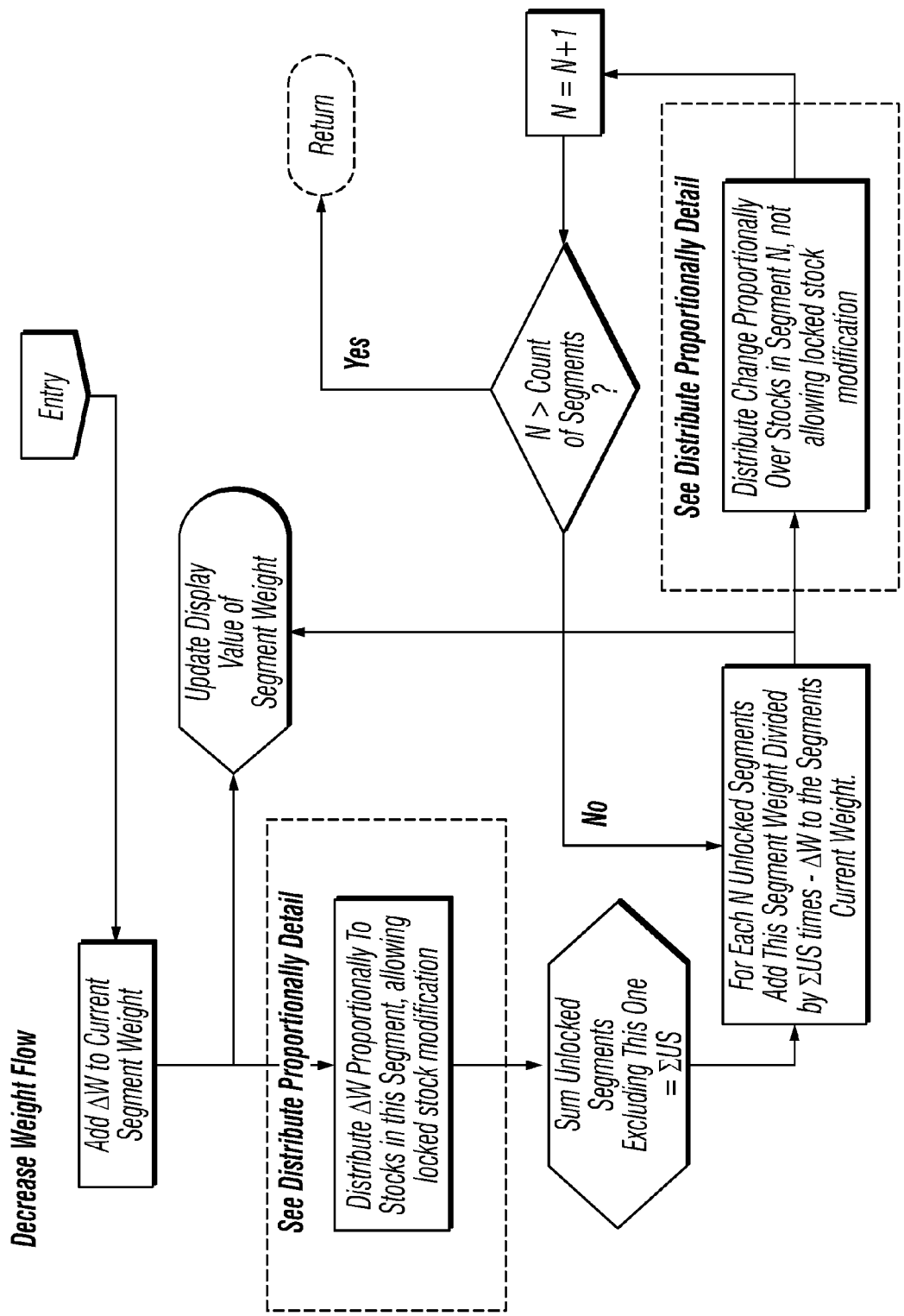
FIG. 11 illustrates an embodiment of the logic applied when the weight of a segment is being decreased.

FIG. 11 illustrates the logic applied when the weight of the segment is being decreased. The amount of the decrease is first added to the requested segment and the associated user interface elements are updated to reflect the new value. The change is applied to the securities within the segment allowing security weights that have been set at declared levels by the client to be modified. The process for distributing the weight among the securities in the segment is illustrated in FIG. 4 and described above. The logic then computes the sum of the other unlocked segments. For each of the other unlocked segments the proportional weight change to be applied is calculated as the segment weight divided by the sum of the unlocked segment weights, multiplied by the negation of the requested change. This weight change is applied to the weight of the segment by adding its value to the weight of the segment. The user interface elements associated with the segment are updated to reflect the new value. The change must then be distributed to the securities within the segment. The logic that proportionally distributes the change is illustrated in FIG. 4 and described above. Once all segments have been modified, the logic is complete and returns.

Figure 12:
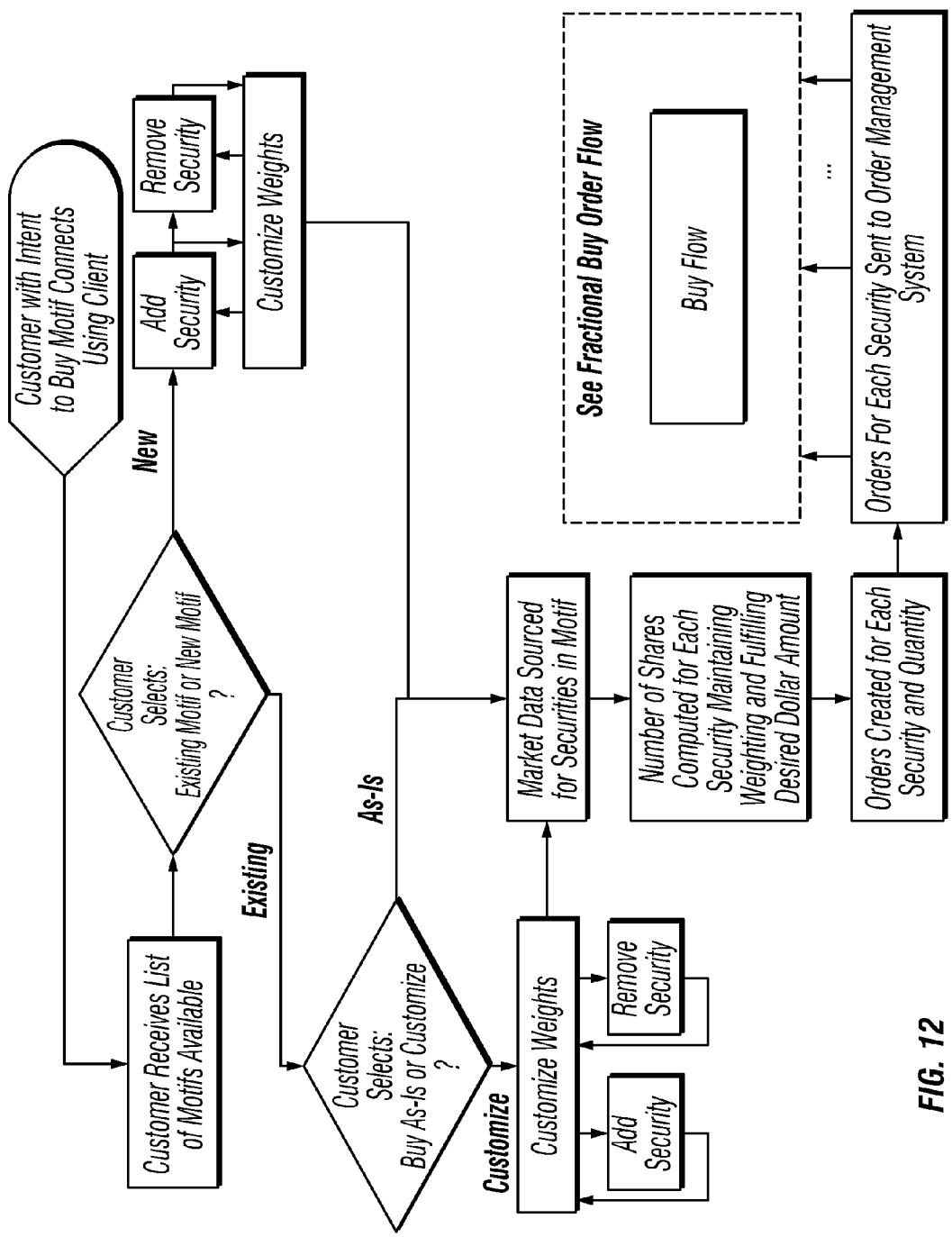
FIG. 12 is a flowchart illustrating how a customer that desires to purchase a share-weighted portfolio connects using the client interface.

In the FIG. 12 flowchart, a customer desires to purchase share-weighted portfolio connects using the client interface. The customer receives a list of available share-weighted portfolios and selects an existing or new share-weighted portfolio. If the share-weighted portfolio is new, securities are added, removed, and the customer customizes their weights. Once the customer is satisfied with the construction they have produced, market data is sourced to securities in the share-weighted portfolio. The number of shares is computed for each security while maintaining weighting of the construction and fulfilling a desired dollar amount. Orders are created for each security and quantity. Orders for each security are sent to the order management system. The buy flow is then followed, including that for fraction shares described herein. When the customer selects an existing share-weighted portfolio, the customer selects whether to "buy as is" or to customize. For customization, the customer customizes the weights, adds securities, or removes securities until the desired construction is produced. The customized weights are then sent for sourcing of market data of the securities.

In various embodiments, the client transactions are done in real time. A client device 12 has a client interface that in operation is configured to receive at least one of, a client buy, sell, sell short, or buy to cover order. The host server 14 is coupled to the client device 12 which in operation executes logic resources for carrying out transactions for a client. The pricing engine 18, the inventory account 16 and the targets engine 20 are included. The targets engine 20 determines the target number of long and shorted shares of a security to be held by the inventory account 16. A trading engine in operation is configured to process at least one of client buy, sell, sell short, or buy to cover order. For a buy order the trading engine (i) fills the buy order for both whole and fraction shares from the inventory account 16 if there is sufficient inventory in the inventory account 16, (ii) when there is insufficient inventory completes a purchase of fraction shares first from the inventory account 16 and then purchases the remainder of the buy order from the market, and (iii) when the inventory account 16 can not fill any of the buy order then the trading engine purchase the entire buy order from the market and in the same order purchases a target of shares set by the targets engine 20 for the inventory account 16.

In another embodiment of the present invention, a method of conducting security transactions in real time provides the system 10 with the client device 12 and an inventory account 16 and a target number of shares. A client buy order is received from the client device 12. The client buy order is filled for both whole and fraction shares from the inventory account 16 if there is sufficient inventory in the inventory account 16. A remainder of the buy order is purchased from the market when there is insufficient inventory to complete a purchase of fraction shares first from the inventory account 16. An entirety of the buy order is purchased from the market and in a same order a target of shares set by the targets engine 20 for the inventory account 16 is purchased when the inventory account 16 can not fill any of the buy order.

In another embodiment of the present invention, a method of conducting security transactions provides the system 10 with the client device 12 and the inventory account 16 with a target number of shares for the inventory account 16. A client sell order is received from the client device 12. A whole and fraction number of the shares is sold to the inventory account 16 when a sum of the inventory account's current balance and a size of the sell order is less than or equal to an inventory target. Only the fraction number of shares is sold to the inventory account 16 and a whole component of the order is sent to the market if an inventory account balance is near target and cannot buy the whole component of the order. A size of a market sell order is increased by 1 to reduce inventory balance when the inventory account balance has exceeded the target.

In another embodiment of the present invention, a method of conducting security transactions provides the system 10 with the client device 12 and the inventory account 16 with a target number of shares for the inventory account 16. A client short sell order is received from the client device 12. The short order is filled from the inventory account 16 if there is sufficient short inventory in the inventory account 16. When there is insufficient inventory in the inventory account 16, the trading engine completes the short sell of fraction shares first from the inventory account 16 and then shorts the whole component of the short sell order from the market. When the inventory account 16 cannot fill any of the short sell order the trading engine shorts the entire short order from the market and also shorts a target of shares set by the targets engine 20 for the inventory account 16.

In another embodiment of the present invention, a method of conducting security transactions provides the system 10 with the client device 12 and the inventory account 16 with a target number of shares and the inventory account's short target for the inventory account 16. A buy to cover order is received from the client device 12. An obligation is acquired of borrowed whole and fraction number of the shares for the inventory account 16 when a sum of the inventory account's current balance and a size of the buy to cover order is less than or equal to the inventory account's short target. An obligation is acquired of borrowed of only a fraction to the inventory and a whole component of the order is sent to the market if an inventory balance is near the inventory account's short target. A size of a market buy to cover order is increased by 1 to reduce inventory balance when the inventory balance has exceeded the inventory account's short target.

In one embodiment, fraction shares are traded. The client device 12 has a client interface that in operation is configured to receive a client buy, sell, sell short or buy to cover order. The host server 14 is coupled to the client device 12 which in operation executes logic resources for carrying out transactions for a client. The pricing engine 18, the inventory account 16 and a trading engine are provided. In operation, the trading engine processes the client buy, sell, sell short or buy to cover order. The trading engine enables the trading of fraction shares in real time as well as reduces the frequency of orders sent to market by executing principal trades against the inventory account 16.

In another embodiment of the present invention, a method is provided for conducting security transactions using the system 10 with the client interface and the inventory account 16. A client buy, sell, sell short or buy to cover order is processed. Fraction shares of the buy, sell, sell short, or buy to cover order are traded in real time. A frequency of orders sent to market is reduced by executing principal trades against the inventory account 16.

Figure 13:
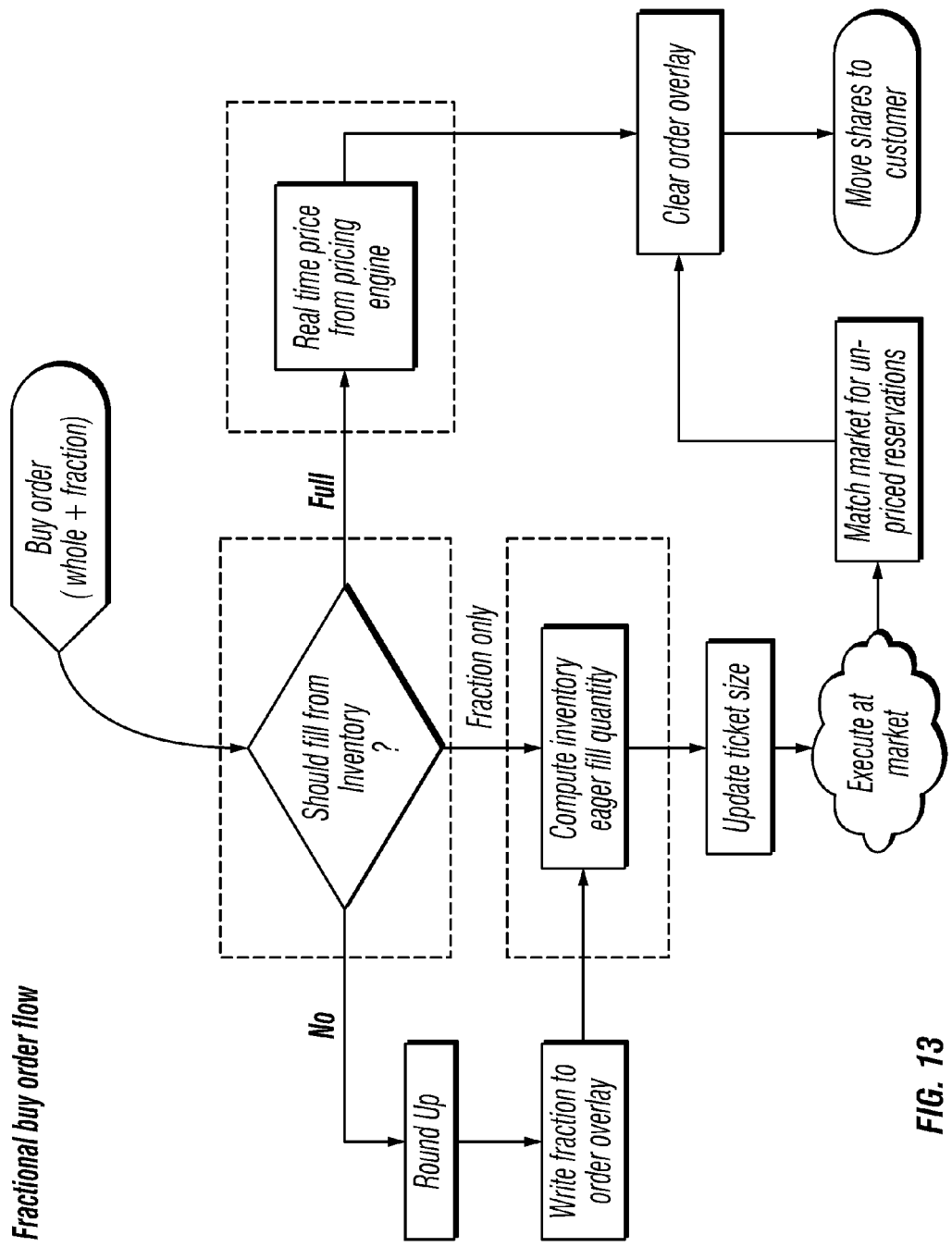
FIG. 13 is a flowchart for a fraction, whole share, or whole share with fraction buy order.

FIG. 13 is a flowchart for a fraction, whole share, or whole share with fraction buy order. A determination is made as to whether the inventory account 16 can and should fill all, part, or none of the order. If the logic determines that the inventory account 16 should fill the entire order, then a real time price is received from the pricing engine 18. To protect against overfilling the inventory account 16 in the presence of concurrent real-time and/or long-standing limit orders the concept of an open order overlay is introduced. The open order overlay is a data resource that tracks un-executed orders that will have a net impact on the inventory account 16 if and when they are executed. For a market order one hundred percent of the number of shares for the benefit of the inventory account 16 will be applied to the overlay. For limit orders, the number of shares will be discounted according to the probability of fill, determined by historical volatility of the security, the limit price, and the current market price. These factors are periodically recomputed to account for price movements. Once an order completes either by allocating shares to or from the inventory account 16 or by filling at the market, the full quantity of that order is moved to the actual balance of the inventory account 16 and cleared from the open order overlay.

If the order cannot be filled from the inventory account 16, the quantity of the order is rounded up and the fraction component of the order (if any) is written to order overlay. Due to the fact that there are often fixed costs associated with execution, settlement, and clearing, bunching system orders with customer orders to refill the inventory can represent a significant cost savings. Therefore logic is implemented which determines whether the quantity of the order should be increased to eagerly fill the inventory in anticipation of future customer orders. The quantity of the order is increased as determined by the logic described in FIG. 17 and described herein. The order is then sent to the appropriate market and/or market maker to execute. Any un-priced share reservations created are priced at the same price as the whole share order executed at the market. Finally any open order overlay created for this order is cleared, and the shares are allocated to the customer and/or the inventory account 16 as appropriate.

Figure 14:
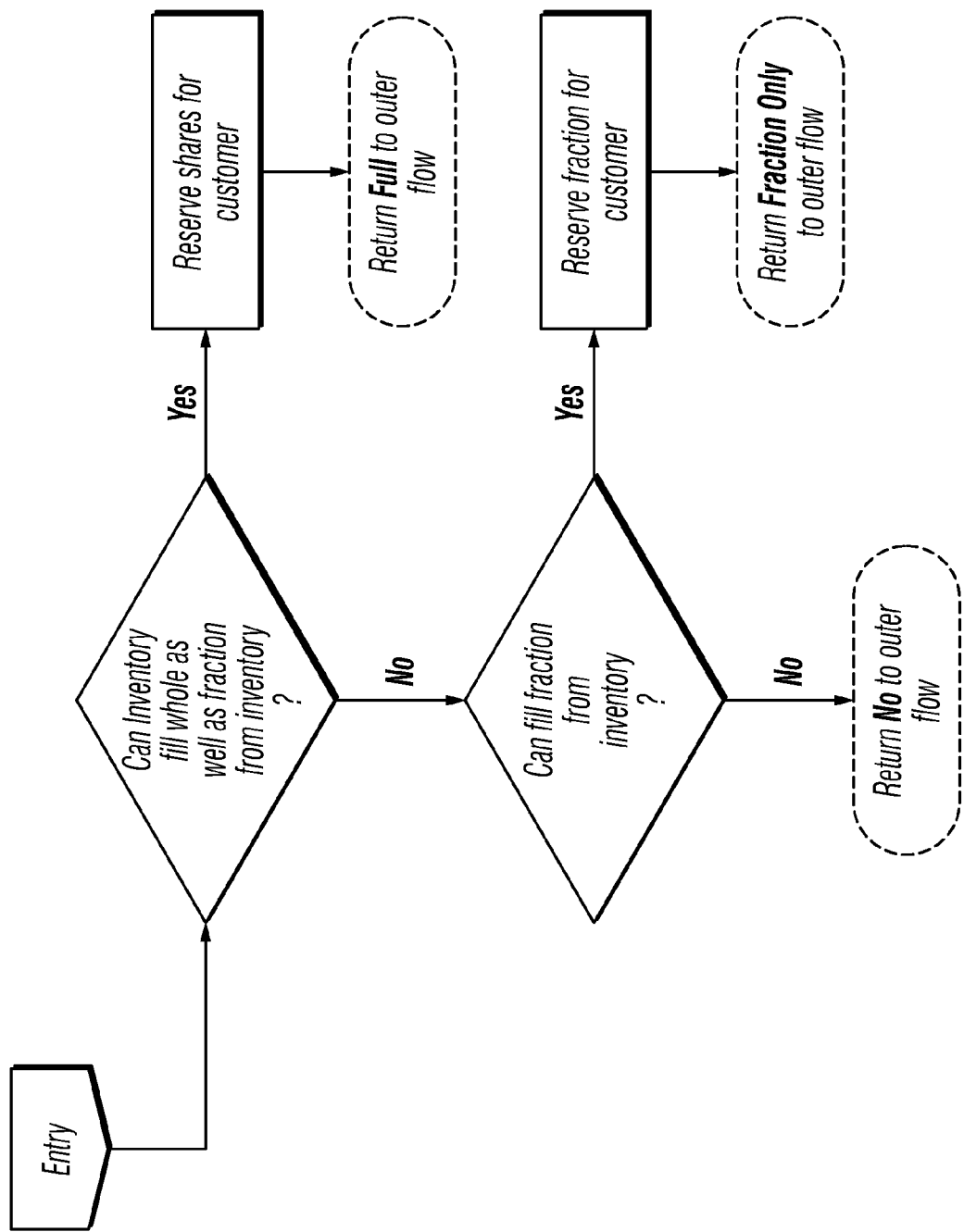
FIG. 14 illustrates an embodiment of a process that determines whether or not the inventory can and should fill all, part, or none of the order for buy market orders.

FIG. 14 illustrates an embodiment of the process that determines whether or not the inventory can and should fill all, part, or none of the order for buy market orders. A database of security inventory held and owned by the firms consulted to determine whether or not there are sufficient shares of the security being traded to fill the customer's order. If so, those shares are reserved for the customer. In this path no order is routed to the market, thereby saving the system 10 the cost associated with executing on the open market. If it is determined that the number of shares in the order cannot exclusively be filled from inventory, the database will be consulted again to determine if the fraction piece of the order can be filled by the inventory account 16. If so the fraction is reserved for the customer. The appropriate return condition is sent to the outer flow depending on how many shares were reserved for the client from the inventory account 16.

Figure 15:
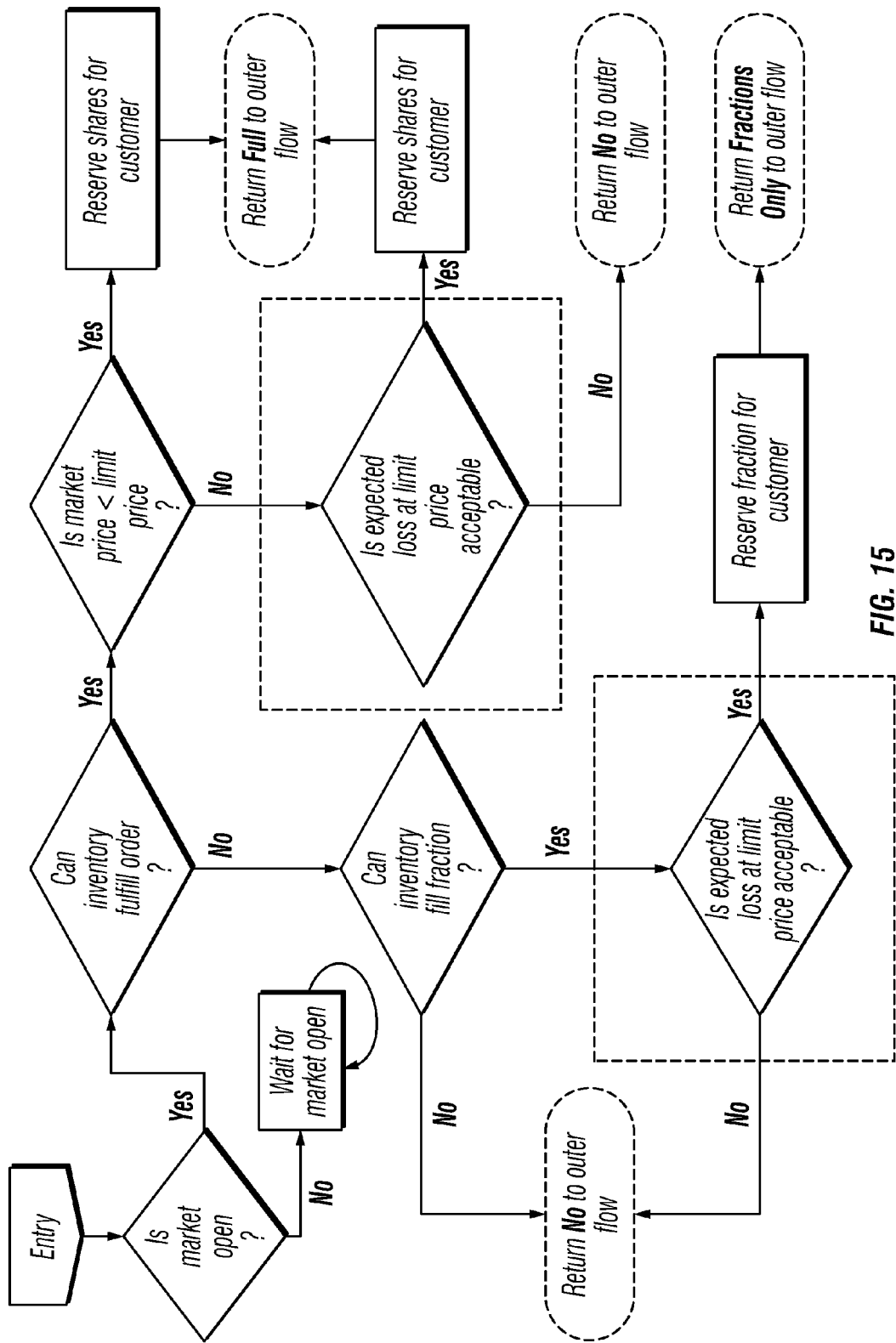
FIG. 15 illustrates one embodiment of a process that determines whether or not the inventory can and should fill all, part, or none of the order for buy limit orders.
Figure 16:
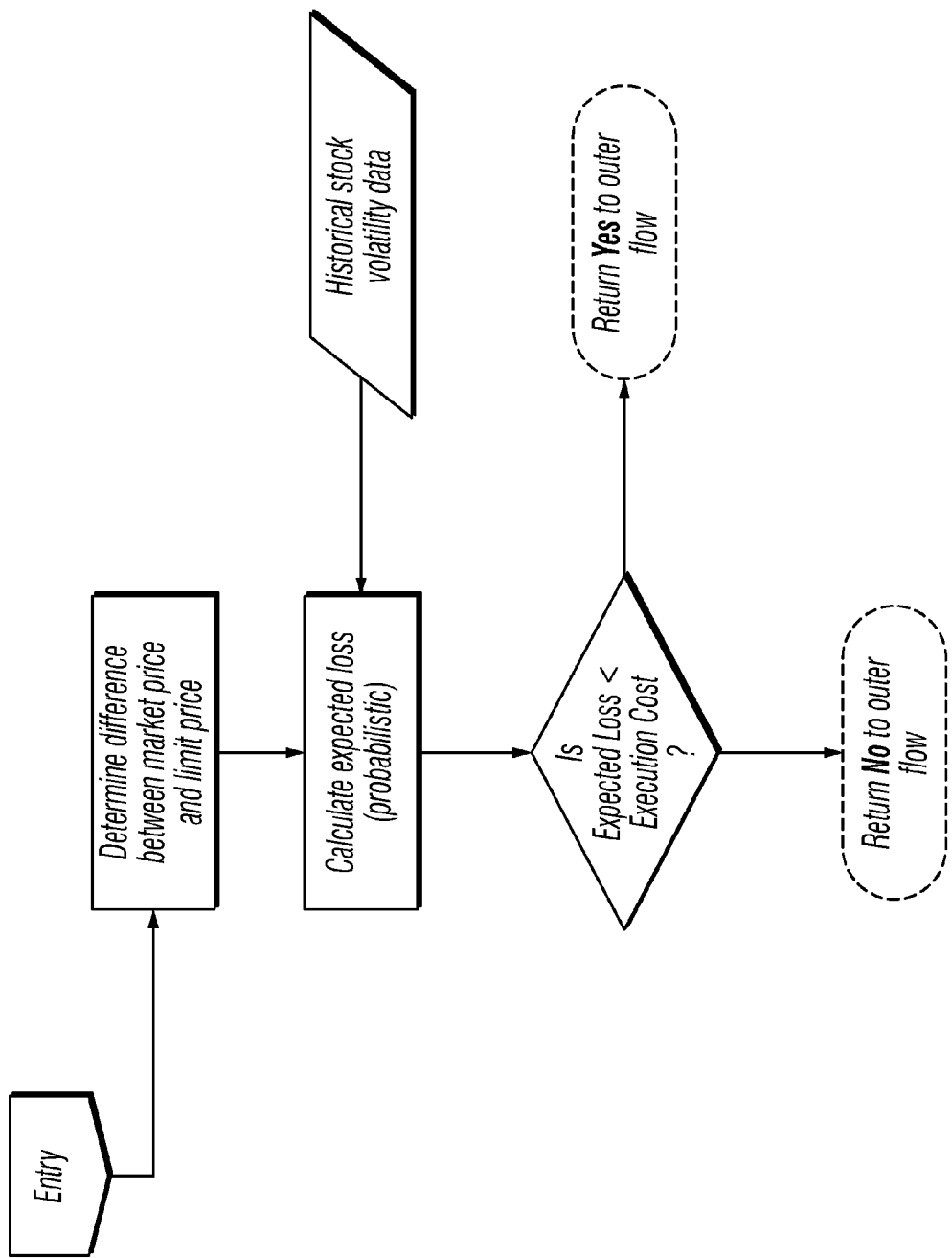
FIG. 16 illustrates if an order is not marketable, a decision is made as to whether or not filling from inventory is more or less beneficial to the system than executing at market.

FIG. 15 illustrates one embodiment of the process that determines whether or not the inventory can and should fill all, part, or none of the order for buy limit orders. If the market is open then the process continues and a determination is made to see if the inventory account 16 can fulfill the order. If the market is not open, then the transaction does not process until the market opens. After-market limit orders are held until the open when the open market price of the security can be determined. The inventory database is consulted just as in the case of market orders. If there is sufficient inventory available, the marketability of the order is evaluated. If the order is marketable (the market price is less than the limit price for a buy order), then the shares are reserved for the customer. If the order is not marketable, a decision is made as to whether or not filling from inventory will be more or less beneficial to the system 10 than executing at market. The process is illustrated in FIG. 16. The expected loss from executing this order is computed using historical stock volatility data, the limit price, and the current market price. If the expected loss from executing at the limit price is less than the cost to go to market, the shares will be reserved for the client. Alternatively if there are insufficient shares in the inventory to cover the entire order, the database is consulted to see if the fraction is available. Although the cost of going to market must be incurred at this point, the system 10 still performs an acceptable loss computation. If the loss is too high, the system 10 does not reserve the fraction for the client, since doing so will preclude those shares from servicing other orders that are more likely to fill. However if the order is highly likely to fill, the fraction will be reserved for the customer. The appropriate return condition is sent to the outer flow depending on how many shares were reserved for the client from the inventory account 16.

Figure 17:
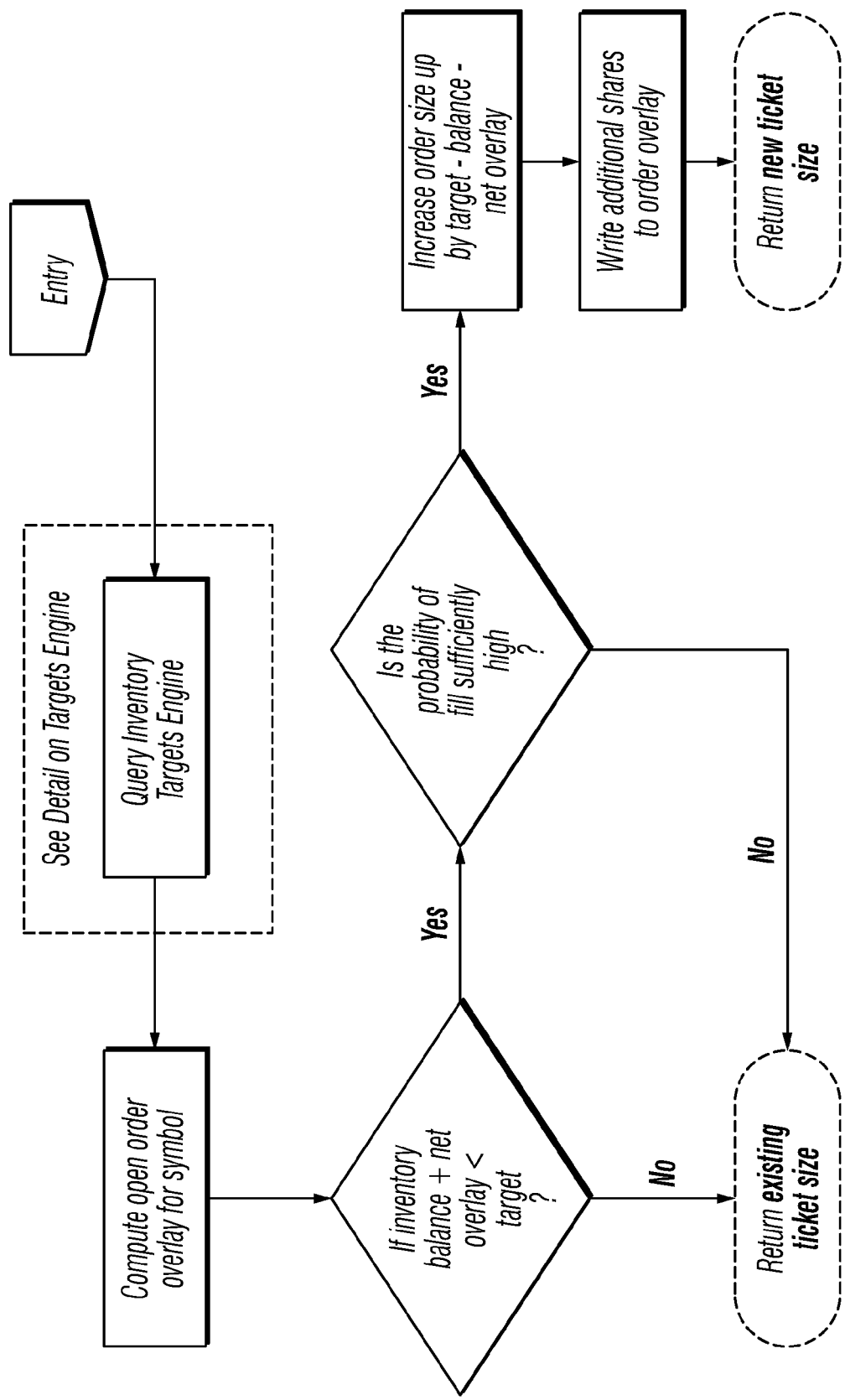
FIG. 17 illustrates that in the case of a both no-inventory and fraction-only results eager fill logic resources are run to determine if the system desires to bunch an inventory order with the client order to refill the inventory to its target balance in the security.

Referring now to FIG. 17, in the case of a both no-inventory and fraction-only order, eager fill logic resources are run to determine if the system 10 desires to bunch an inventory order with the client order to refill the inventory to its target balance in the security. If the system 10 determines that the net probabilistic exposure of outstanding orders (the open order overlay) summed with the current inventory balance is less than the target, and the order is likely to fill, then the system 10 adjusts the order size. The inventory target, minus the current inventory balance, minus the net open order overlay, is added to the number of shares the client ordered to determine the new order size. That quantity is then written to the order overlay to prevent other orders from over-purchasing for the inventory account 16. If the order is unlikely to fill in the near future then no eager fill is applied, as it would preclude other orders that are more likely to fill, from bunching and filling the inventory to the target level. The probability is defined as 100% for market orders and for limit orders as a function of the historical volatility as well as the limit and current market prices.

Once the final order size has been determined through the above process, the order will be directed to the market.

Figure 18:
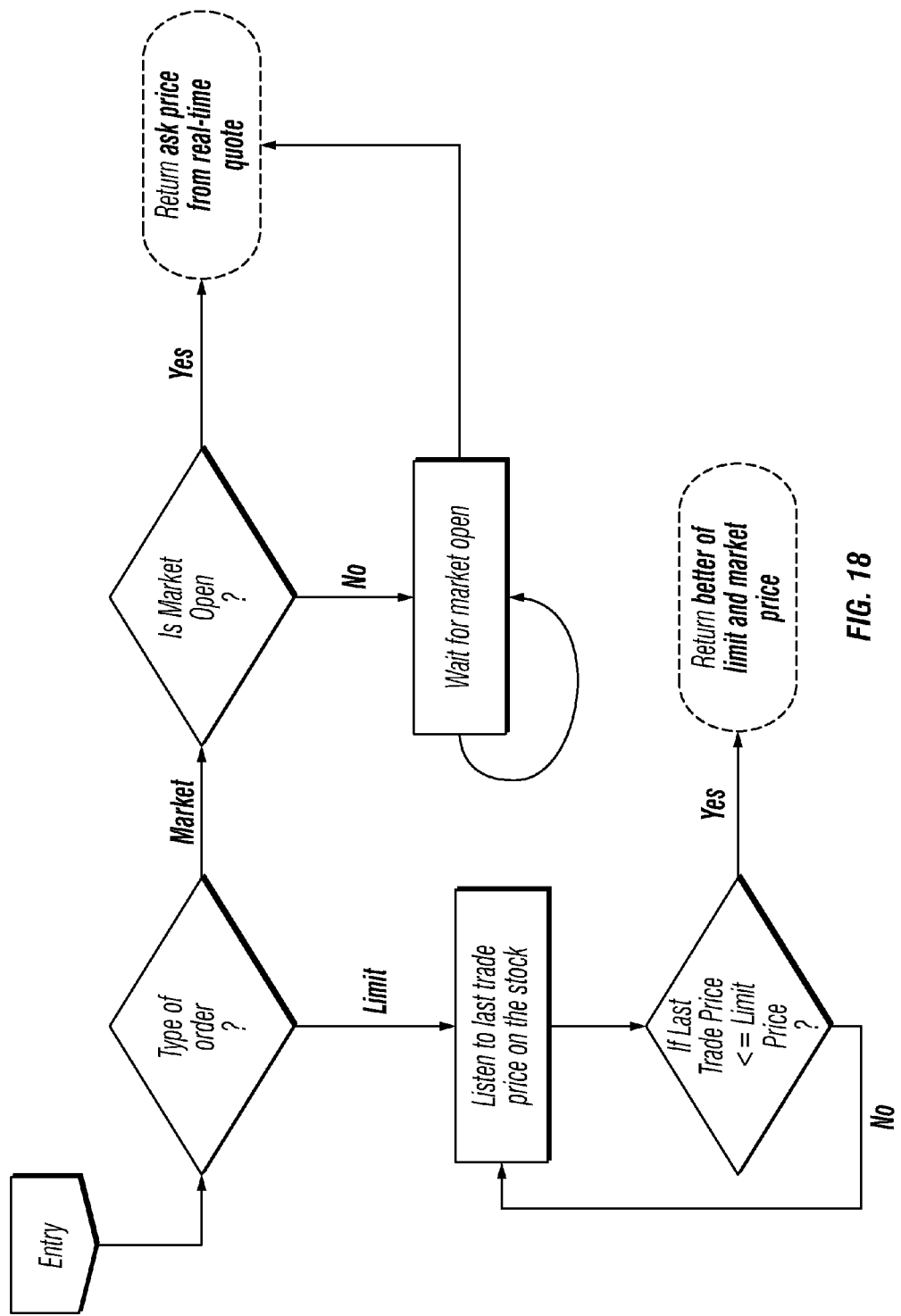
FIG. 18 illustrates an embodiment of how the pricing engine logic prices buy orders.

FIG. 18 illustrates how the pricing engine 18 logic prices buy orders. First, the type of order is determined. If it is a limit order, then the pricing engine 18 looks at the last trade price of the stock. When the last trade price is not less than or equal to the limit price, then the pricing engine 18 goes back and looks at the most recent trade price of the stock. When the last trade price is less than or equal to the limit price, then the price is assigned as the better of the limit and market price. In the event the order is market order, and the market is open, the price is assigned as the ask price of a real time quote. If the market is not open, then the pricing engine 18 waits for the market to open before it proceeds.

Figure 19:
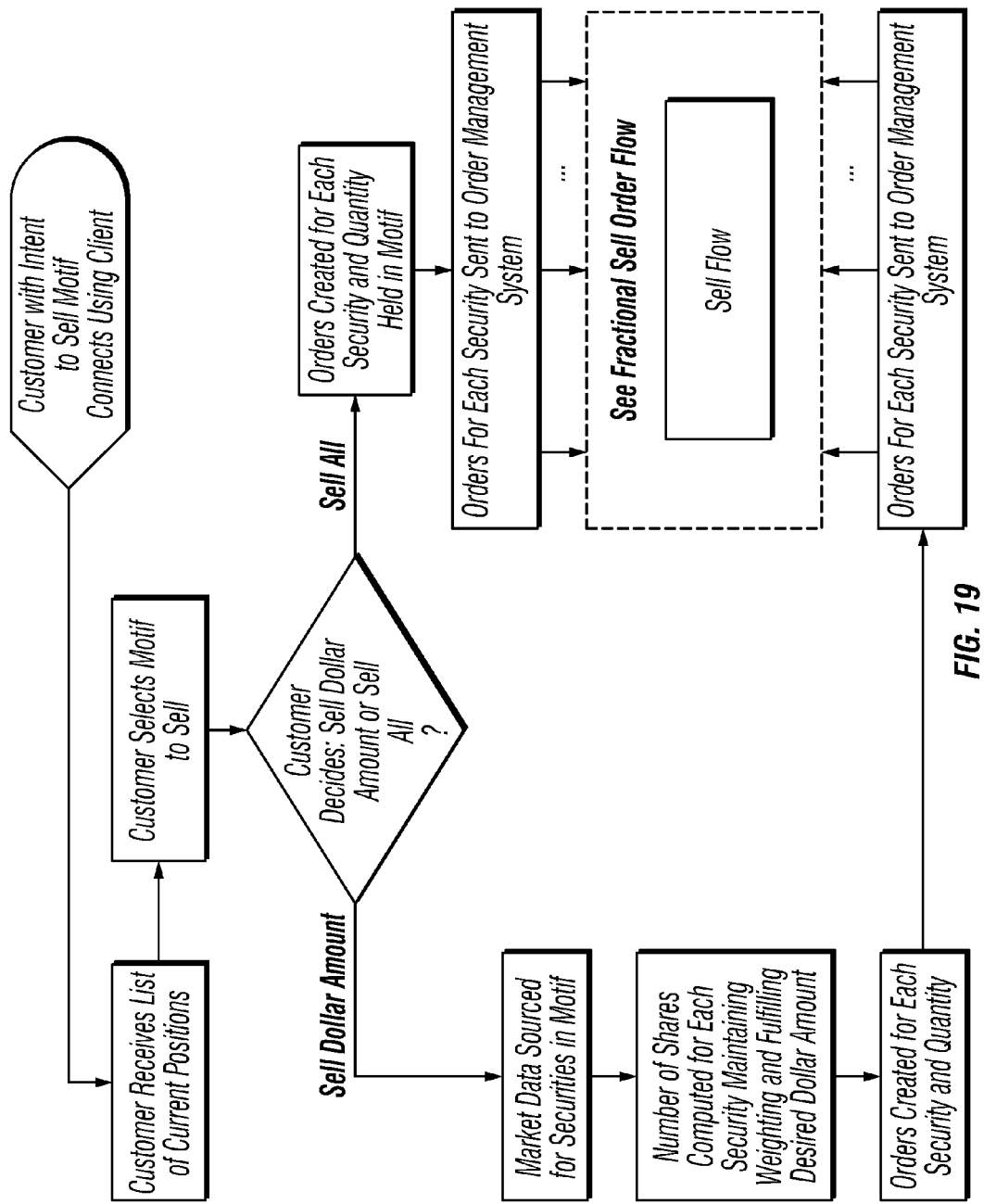
FIG. 19 is a flowchart illustrating one embodiment of a customer sell order flow.

The flowchart of FIG. 19 illustrates one embodiment of a customer sell flow. In this embodiment, the customer wants to sell a share-weighted portfolio. The customer receives a list of current positions and selects a share-weighted portfolio to sell. The customer decides the sell dollar amount or decides to sell all. When the customer decides to sell all, orders are created for each security and quantity held in the share-weighted portfolio. Orders for each security are sent to the order management system. When the sell order is for a dollar amount, market data is sourced for the securities in the share-weighted portfolio. The number of shares to be sold from the share-weighted portfolio is computed for each security, while maintaining weighting and fulfilling the desired dollar amount. Orders are created for each security and quantity and sent to the order management system.

In another embodiment, the inventory account 16 allows a client to purchase or sell fraction shares of a portfolio in real time.

In another embodiment, the inventory account 16 holds securities and in operation executes on the purchase or sale of fraction shares of securities from the inventory account 16 by the client in real time. The transaction of fraction shares can be done without aggregating with third parties.

As non-limiting examples, handling fraction shares can be, (i) a client fraction buy order when an inventory position can not fill a fraction, (ii) a fraction buy order when an inventory position can fill a fraction, (iii) client fraction sell orders and the like.

Figure 20:
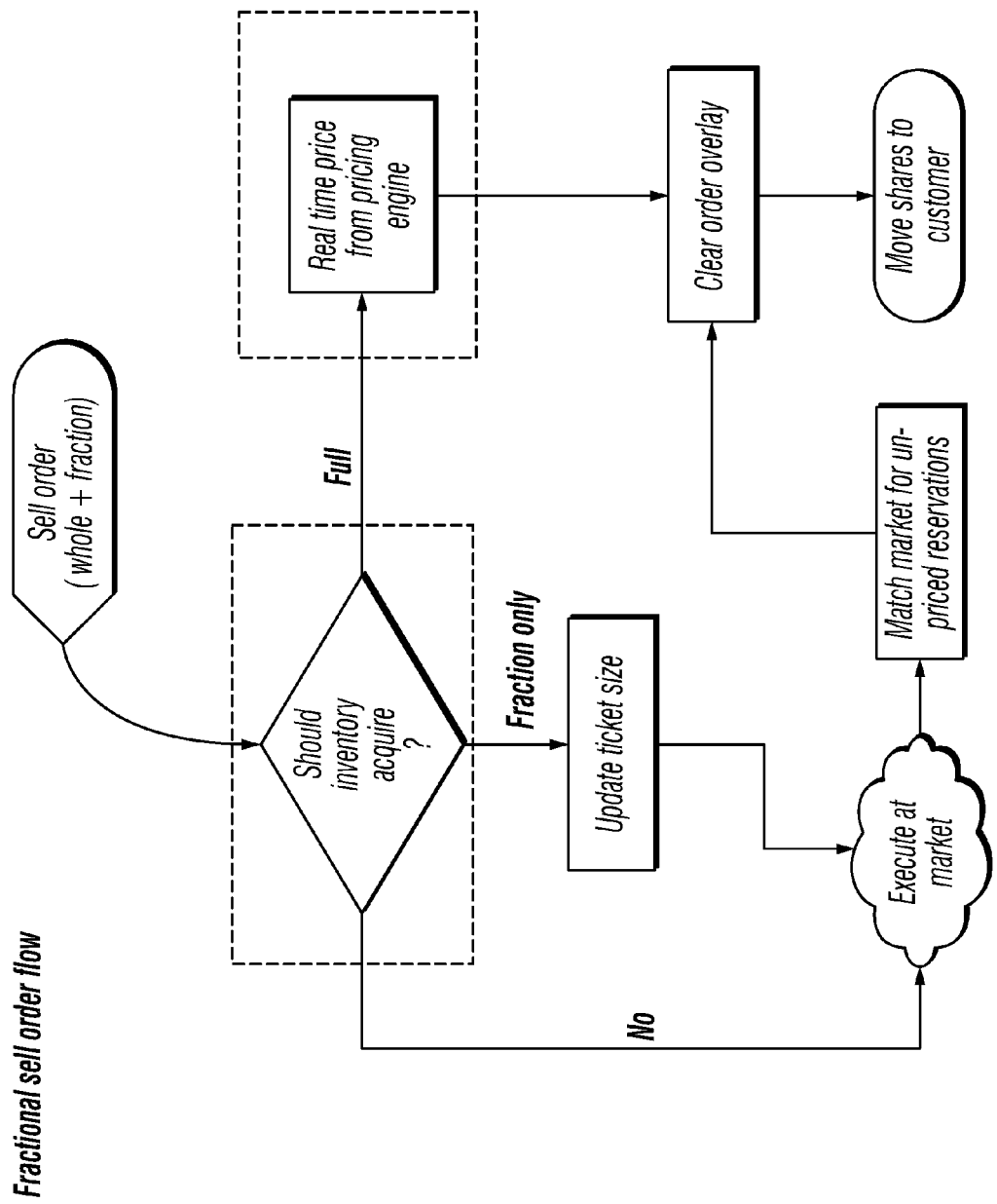
FIG. 20 illustrates an embodiment of the system routing a sell order through a logic resource that decides whether or not the full order, only the fraction component of the order, or no part of the order will be acquired in the inventory account.

As discussed above, the system 10 also provides for the selling of fraction shares. Logic resources are applied for handling client whole and fraction sell orders. In an attempt to reduce execution costs and facilitate fraction order execution, inventory logic resources are applied. As illustrated in FIG. 20, the system 10 routes the sell order through a logic resource that decides whether or not the full order, only the fraction component of the order, or no part of the order will be acquired in the inventory account 16. Depending on the decision from the flow an order overlay is created which represents the net impact of the order on the inventory account 16 e.g. an acquisition of shares will cause the balance of the inventory account 16 to increase.

Figure 21:
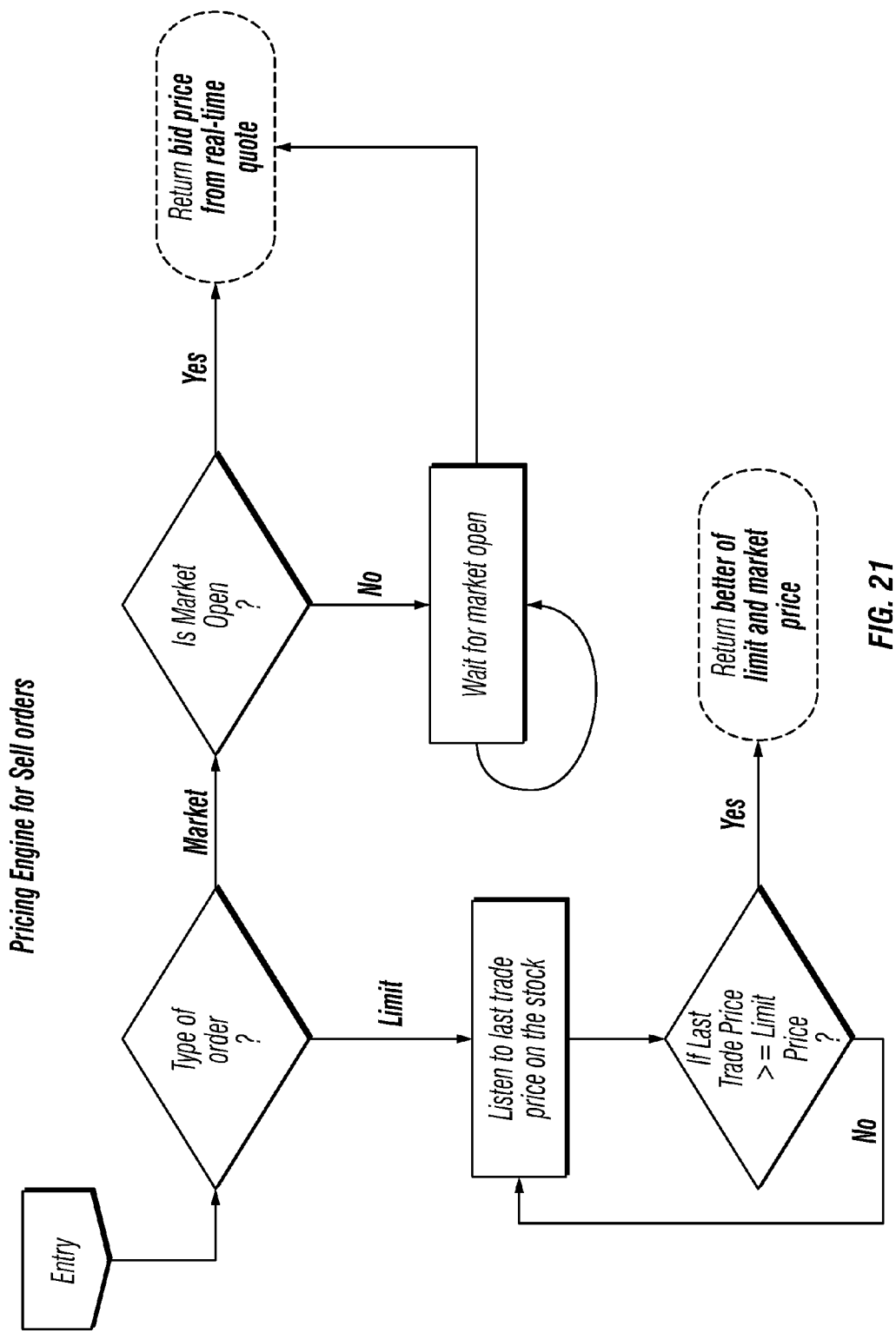
FIG. 21 illustrates an embodiment of how the pricing engine logic prices sell orders.

If the full order is to be acquired by the inventory and is deemed to be filled given the current market prices for the stock, the shares are allocated to the inventory at a price determined by the pricing engine 18, FIG. 21. If only the fraction component of the order is to be acquired by the inventory, the size of the order is updated e.g. for a sell of 2.7 shares, 0.7 shares will be acquired by the inventory and the order size is updated to 2 shares. No change is made to the size of the order if the order is for a sell on a whole number of shares and the inventory will not acquire any portion of it. For the cases where the inventory will acquire nothing, the order size may be increased to eagerly sell out an inventory position that is higher than the target for that security. When the inventory does not acquire or it only acquires only the fraction component, the updated order is then sent to the market and the price for the prior reservations is determined from the average fill price obtained in the market e.g., if 2 shares were sent to the market for a sell order for 2.7 shares, the allocation of the 0.7 shares to the inventory will be based on the average fill price for the 2 shares.

Figure 22:
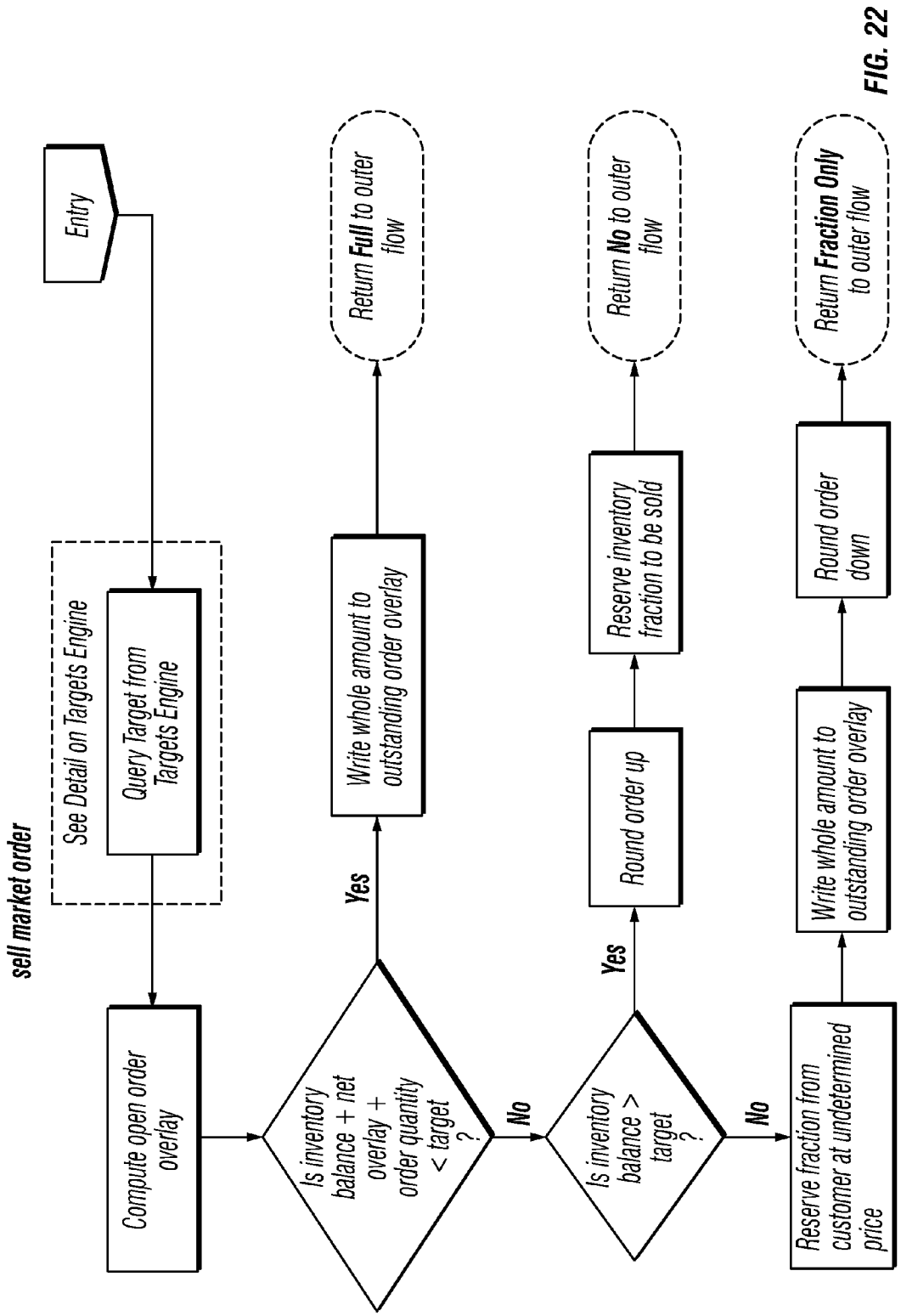
FIG. 22 illustrates an embodiment of details of the decision process on how much will be acquired by the inventory account for a sell market order.
Figure 23:
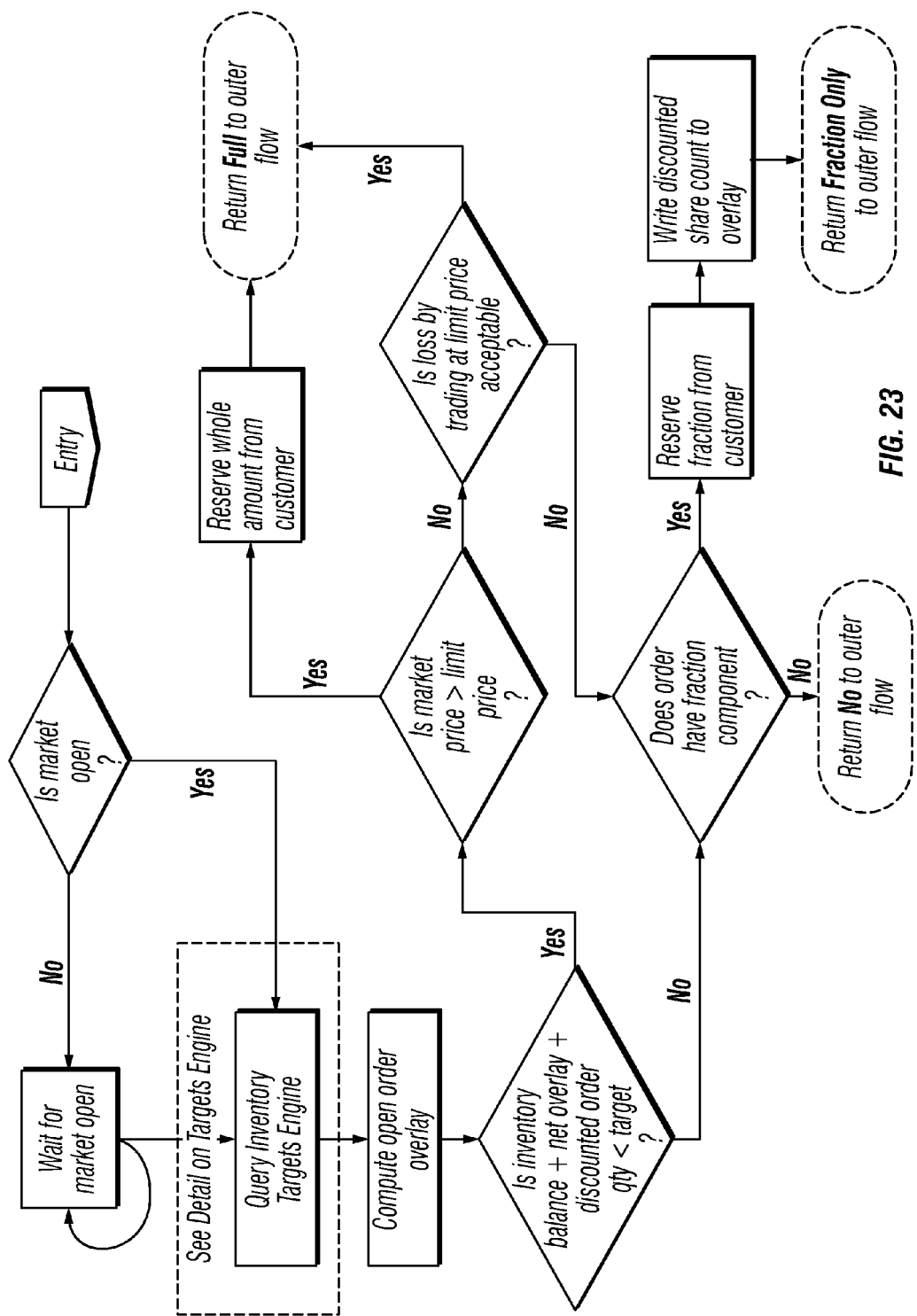
FIG. 23 illustrates one embodiment of the logic for sell limit orders.
Figure 24:
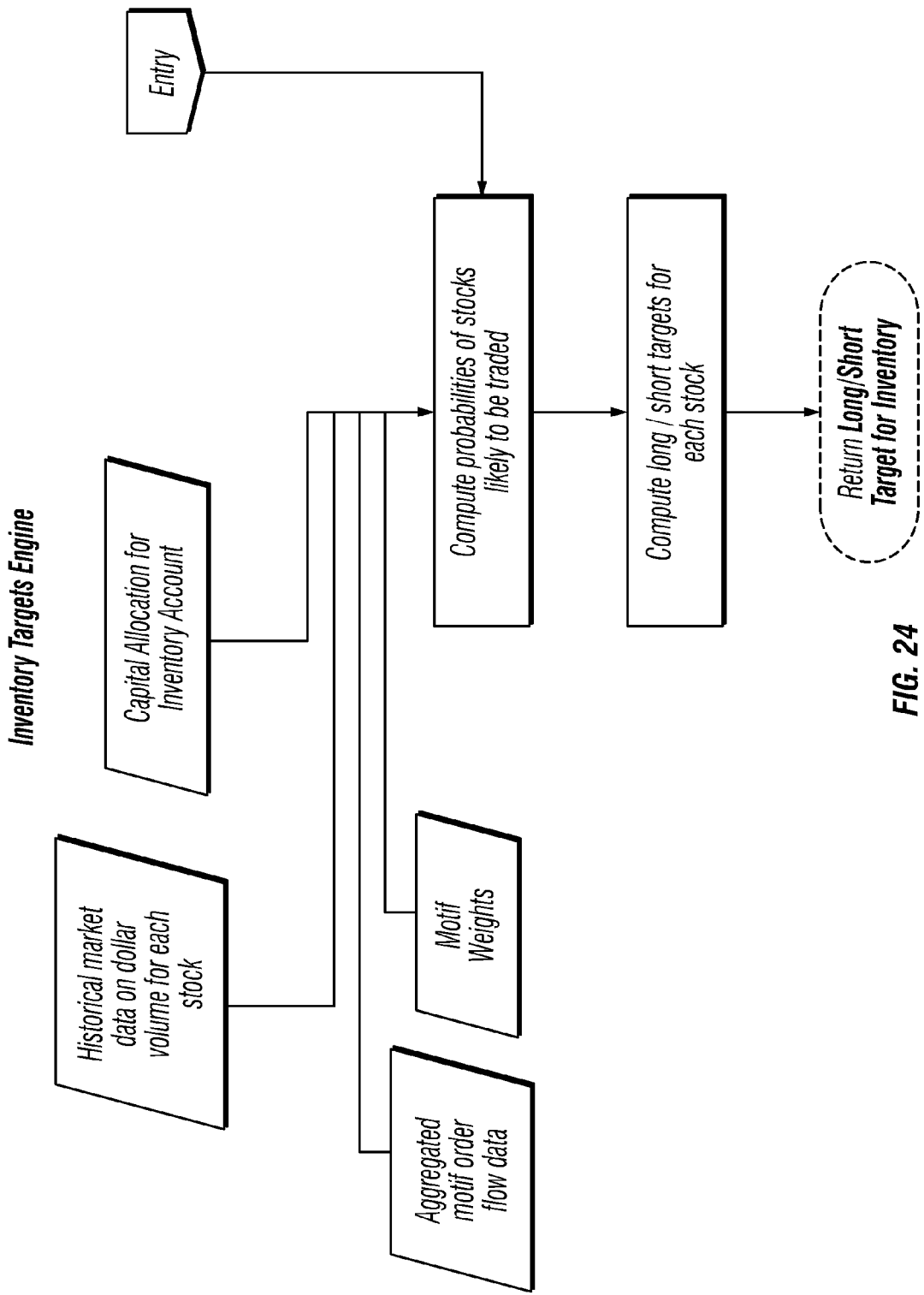
FIG. 24 illustrates an embodiment of targets engine operation.

FIG. 22 illustrates the details of the decision process on how much will be acquired by the inventory for a sell market order. The targets engine 20 is queried to determine the current target for the security being traded. The open order overlay is computed for any outstanding buy and sell orders for the eventual benefit of the inventory. Determination of the correct target is illustrated in FIG. 24 and described herein. If the sum of the current inventory balance, open overlays and the size of the sell order under consideration is less than the inventory target for that security, the logic informs the outer process flow that the entire sell order will be acquired by the inventory. If the entire order cannot be acquired, the logic checks if the inventory balance has exceeded the inventory target. If the inventory balance is in excess of the inventory target, the sell order is rounded up to reduce inventory risk e.g. if the inventory target is 10 and the balance is currently 10.5, a sell order for 4.2 shares will be rounded up to 5 such that the inventory balance is reduced to 9.7 (10.5-0.8) when the order is filled. FIG. 23 illustrates the logic for sell limit orders. The logic first determines whether or not the market is open. If it is not open the logic waits until the market opens before proceeding. The targets engine 20 is queried for the appropriate target for the security being traded. The target, in conjunction with the net open order overlay and current balance, is used to determine whether or not the inventory account 16 should acquire the shares. If the inventory balance summed with the open order overlay and discounted order quantity is less than the target, then the inventory attempts to acquire the shares. If the order is marketable, then the order quantity is reserved from the customer and the logic returns to the outer flow that the inventory will acquire the full amount of the order. If the order is not marketable the logic determines whether or not the projected loss from acquiring the shares is acceptable. If it is acceptable, the logic returns to the outer flow that the inventory will acquire the full amount of the order. However if the limit price is too high relative to the current market price, the minimal number of shares will be acquired by the inventory. In the case when the order has no fraction component or when acquiring the order would push the balance above the target, the inventory does not acquire anything and returns to the outer flow that it will acquire nothing. However if a fraction component of the order exists the fraction will be reserved from the customer and written to the order overlay. The order size will be reduced by rounding down to the nearest integer.

Trading logic resources are used for dynamic inventory targets. The other cited references fail to provide for inventory targets that are based on a probabilistic model where higher targets are set for stocks in share-weighted portfolios likely to be traded heavily and/or for stocks which have a large observed trading volume. Within a share-weighted portfolio, relatively higher targets are set for stocks with larger weights and zero targets are set for thinly traded stocks. Dynamic inventory targets are also based on order flow. Targets are dynamically adjusted using data on client order flow.

In one embodiment, the targets engine 20 calculates a target number of long and short shares of a security to be included in the inventory account 16 to meet present and future buy, sell, sell short, and buy to cover customer orders.

In another embodiment of the present invention, a method of conducting security transaction for a client, the target number of long and short shares of a security is calculated to be included in the inventory account 16 to meet at least one of, present and future buy, sell, sell short, and buy to cover customer orders.

FIG. 24 illustrates an embodiment of the targets engine 20 operation. The targets engine 20 computes probabilities of stocks that are likely to be traded. Input is received from, (i) a capital allocation for the inventory account 16, (ii) historical market data on dollar volume for each stock, (iii) aggregated share-weighted portfolio order flow data and (iv) share-weighted portfolio weights. Long and short targets are computed for each stock. The order management system is in real time communication with the targets engine 20 as it processes customer orders. The order management system and the order flow data aggregator communicate order flow statistics calculated over a selected time period. The order flow data aggregator provides probabilities calculated from the order flow and communicates these to the targets engine 20. When queried, the targets engine 20 returns the appropriate long or short target for the security being traded.

Figure 25:
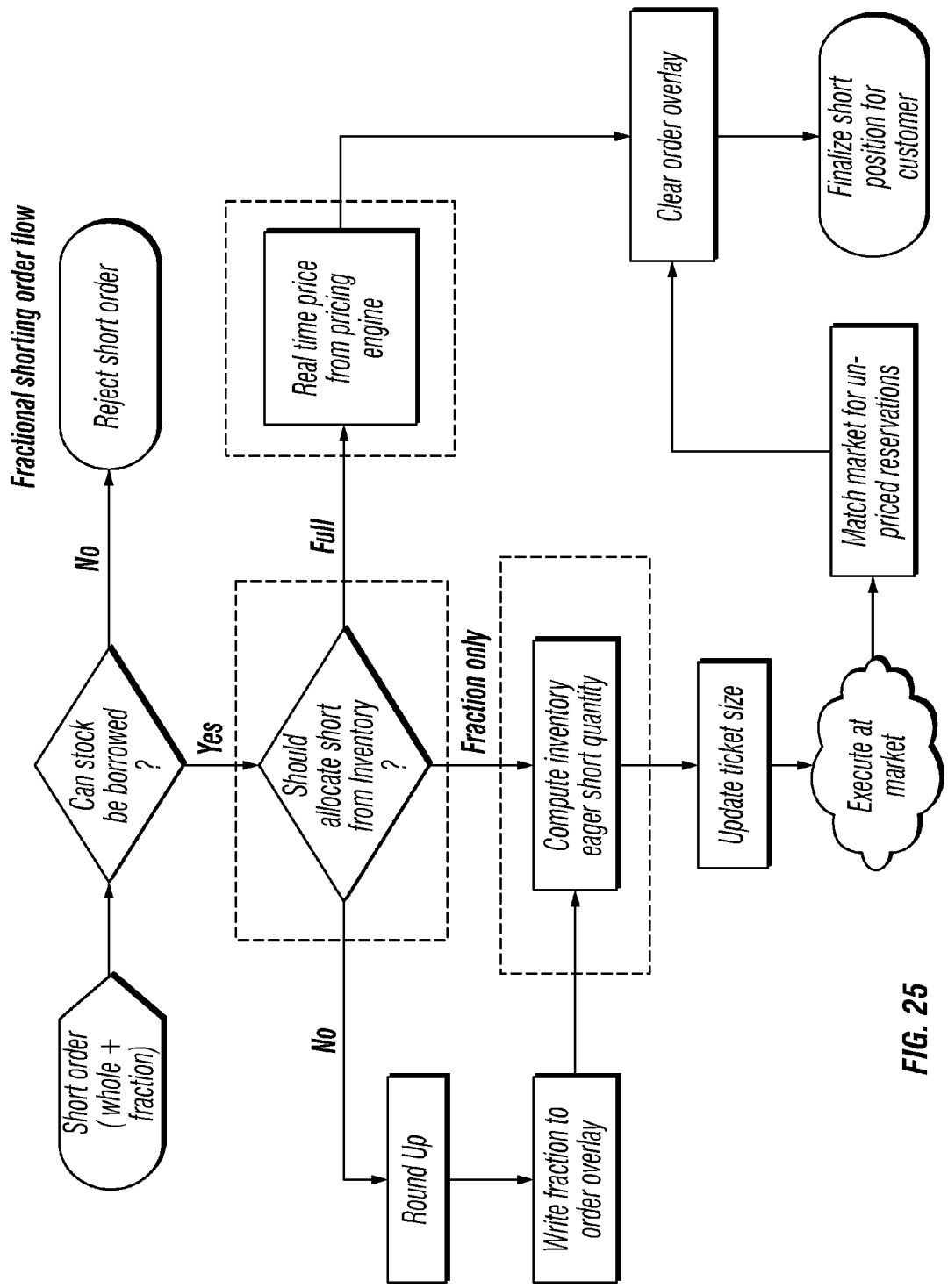
FIG. 25 illustrates an embodiment of the system providing fraction shorting.

In one embodiment, the system 10 provides for fraction shorting, as illustrated in the flowchart in FIG. 25. A sell short order, for a whole or a whole and a fraction of a security, is received. If the security cannot be borrowed, then the short order is rejected.

FIG. 25 is a flowchart for a fraction, whole share, or whole share with fraction short order. A determination is made as to whether the inventory account 16 can and should allocate all, part, or none of the short position. If the logic determines that the inventory account 16 should allocate the entire short position requested, then a real time price is received from the pricing engine 18. To protect against over-shorting the inventory account 16 in the presence of concurrent real-time and/or long-standing limit orders the concept of an open order overlay is introduced. The open order overlay is a data resource that tracks un-executed orders that will have a net impact on the inventory account 16 if and when they are executed. For a market order one hundred percent of the number of shares for the benefit of the inventory account 16 will be applied to the overlay. For limit orders, the number of shares will be discounted according to the probability of fill, determined by historical volatility of the security, the limit price, and the current market price. These factors are periodically recomputed to account for price movements.

Once an order completes either by allocating shares to or from the customer or by filling at the market, the full quantity of that order is moved to the actual balance of the inventory account 16 and cleared from the open order overlay. If the order cannot be filled through an allocation from the inventory account 16, the quantity of the order is rounded up and the fraction component of the order (if any) is written to order overlay. Due to the fact that there are often fixed costs associated with execution, settlement, and clearing, bunching orders with customer orders to refill the inventory can represent a significant cost savings. Therefore logic is implemented which determines whether the quantity of the order should be increased to eagerly acquire a larger short position in the inventory in anticipation of future customer orders. The quantity of the order is increased as determined by the logic described in FIG. 28 and described herein. The order is then sent to the appropriate market and/or market maker to execute. Any un-priced share reservations created are priced at the same price as the whole share order executed at the market. Finally any open order overlay created for this order is cleared, and the shares are allocated to the customer and/or the inventory as appropriate.

Figure 26:
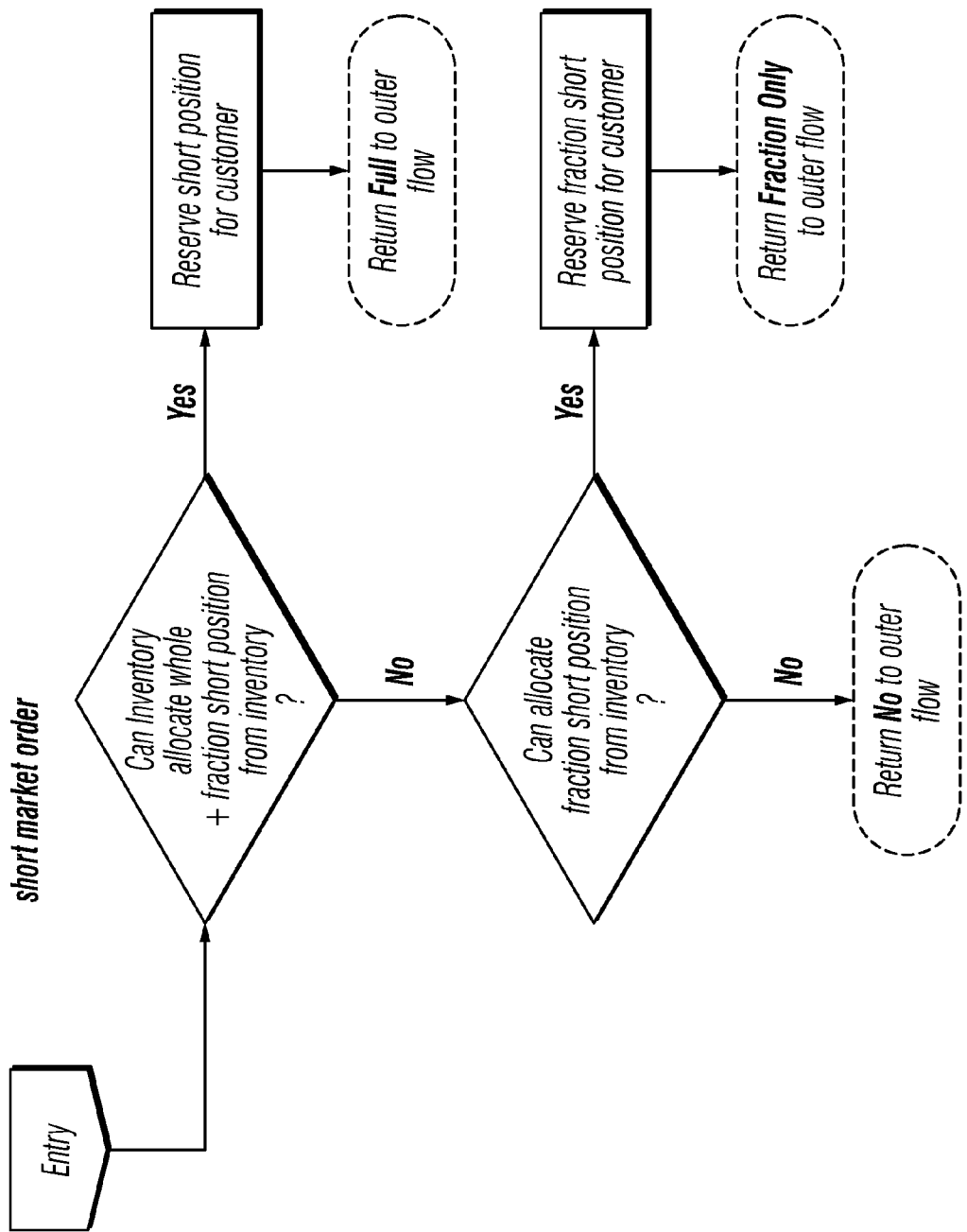
FIG. 26 illustrates an embodiment of a process that determines whether the inventory account can and should allocate all, part, or none of an order for market sell short orders.

FIG. 26 illustrates an embodiment of the process that determines whether or not the inventory can and should allocate all, part, or none of the order for market sell short orders. A database of security short positions held and owned by the system 10 is consulted to determine whether or not there are sufficient shares of the security being traded to fill the customer's order. If so those shares are reserved for the customer. In this path no order is routed to the market, thereby saving the system 10 the cost associated with executing on the open market. If it is determined that the number of shares in the order cannot exclusively be filled from inventory, the database will be consulted again to determine if the fraction piece of the order can be filled by the system 10. If so the fraction is reserved for the customer. The appropriate return condition is sent to the outer flow depending on how many shares were reserved for the client from the inventory.

Figure 27:
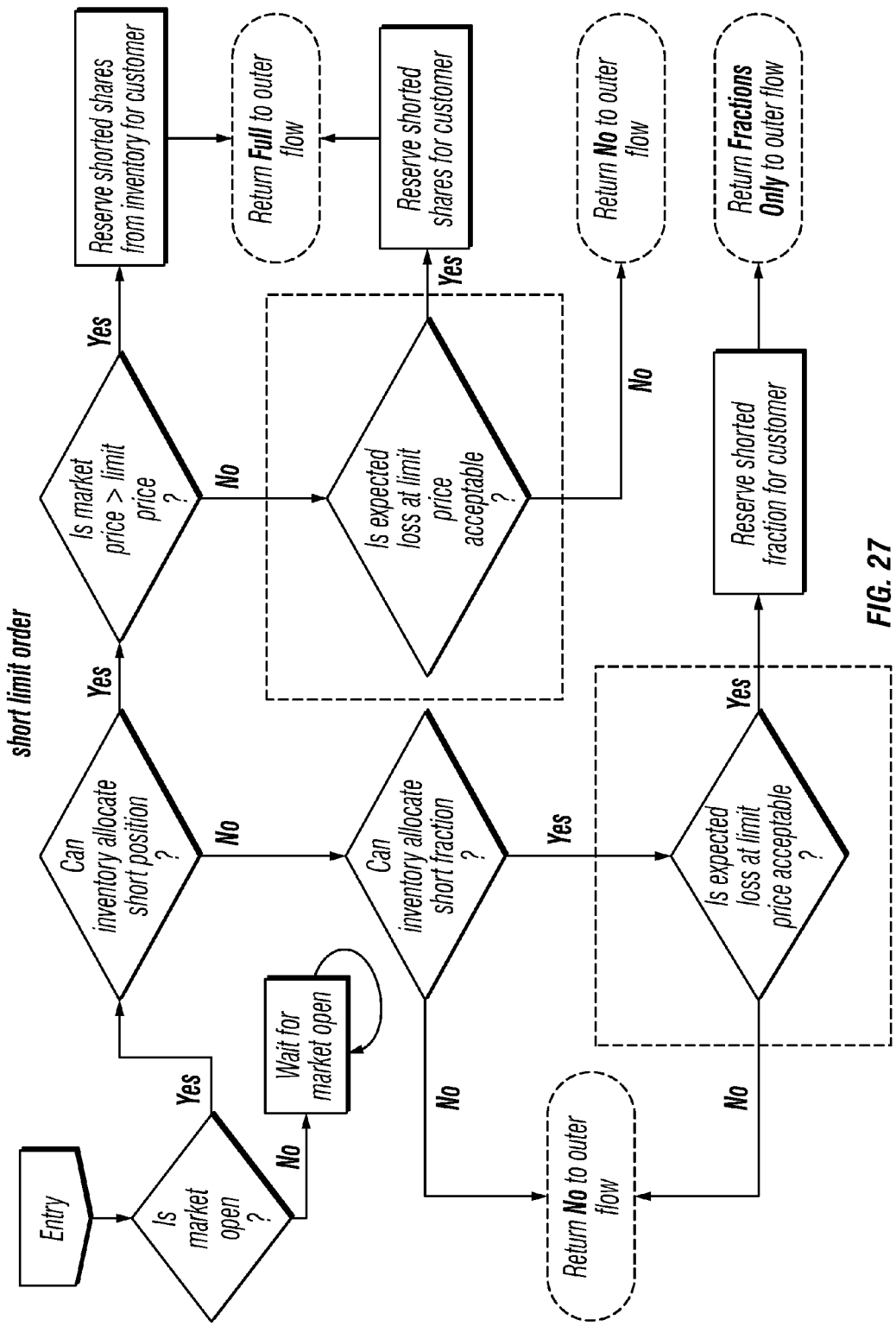
FIG. 27 illustrates one embodiment of a process that determines whether the inventory account can and should fill all, part, or none of a sell short limit order.

FIG. 27 illustrates one embodiment of the process that determines whether or not the inventory can and should fill all, part, or none of the sell short order for limit orders. If the market is open then the process continues and a determination made to see if the inventory account 16 can fulfill the order. If the market is not open, then the transaction does not process until the market opens. After-market limit orders are held until the open when the open market price of the security can be determined. The inventory database of short positions is consulted just as in the case of market orders. If there is sufficient inventory available, the marketability of the order is evaluated. If the order is marketable (the market price is greater or equal to the limit price for a short order), then the shares are reserved for the customer. If the order is not marketable, a decision is made as to whether or not filling from inventory will be more or less beneficial to the system 10 than executing at market the process is illustrated in FIG. 16. The expected loss from executing this order is computed using historical stock volatility data, the limit price, and the current market price. If the expected loss from executing at the limit price is less than the cost to go to market, the shares will be reserved for the client. Alternatively if the short position in the inventory is not sufficient to cover the entire order, the database is consulted to see if the fraction is available. Although the cost of going to market must be incurred at this point, the system 10 still performs an acceptable loss computation. If the loss is too high, the system 10 does not reserve the fraction for the client, since doing so will preclude those shares from servicing other orders that are more likely to fill. However if the order is highly likely to fill, the fraction will be reserved for the customer. The appropriate return condition is sent to the outer flow depending on how many shares were reserved for the client from the inventory.

Figure 28:
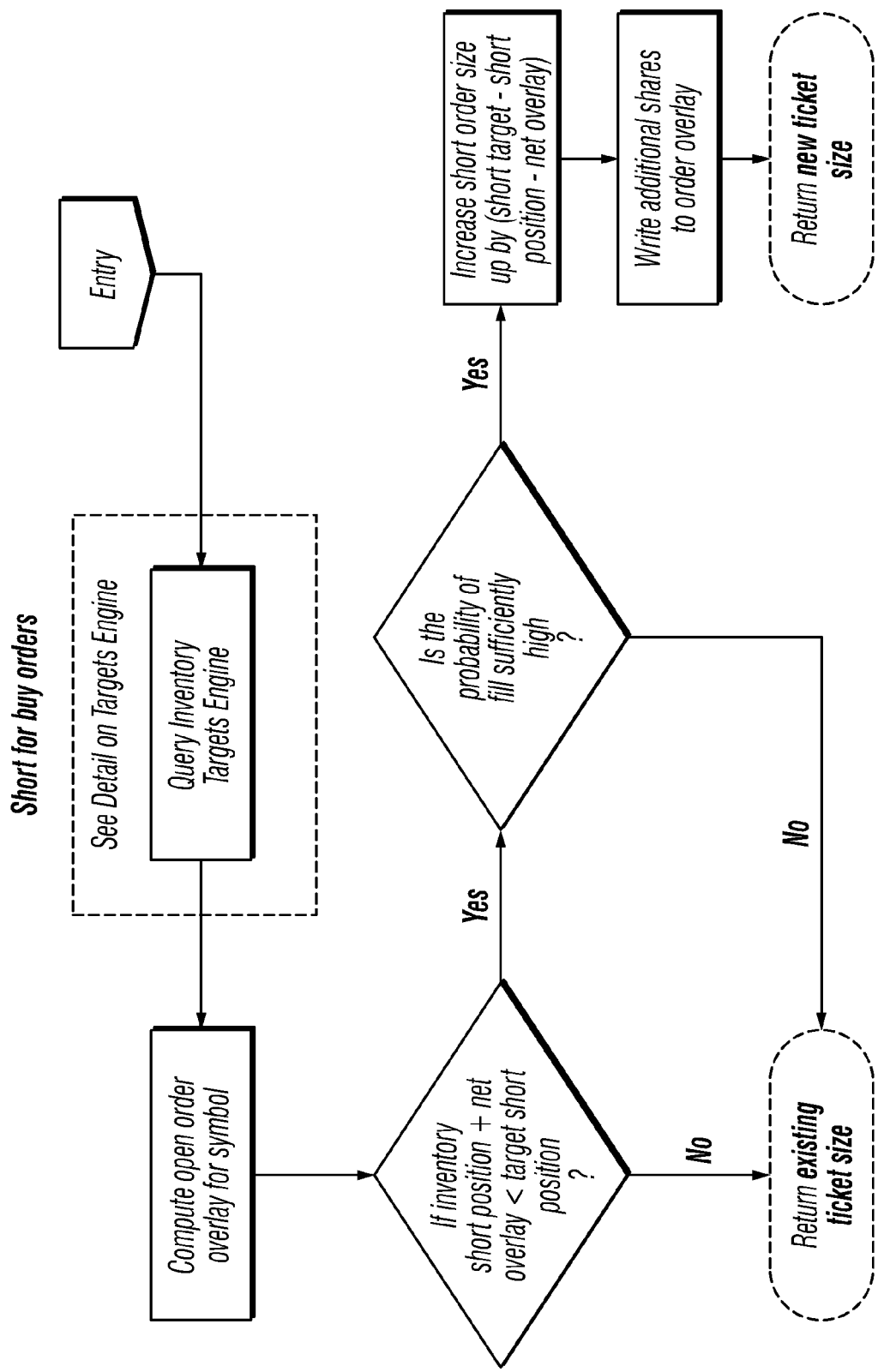
FIG. 28 illustrates one embodiment of logic resources run to determine if the system wants to bunch an inventory short order with a client order to reload the inventory to its target short position in a security.

Referring now to FIG. 28, in the case of a both no-inventory and fraction-only short order logic resources are run to determine if the system 10 wants to bunch an inventory short order with the client order to reload the inventory to its target short position in the security. If the system 10 determines that the net probabilistic exposure of outstanding orders (the open order overlay) summed with the current inventory short position is less than the target, and the order is likely to fill, then the system 10 adjusts the order size. The inventory short target, minus the current inventory short position, minus the net open order overlay, is added to the number of shares the client ordered to determine the new order size. That quantity is then written to the order overlay to prevent other orders from over-shorting for the inventory account 16. If the order is unlikely to fill in the near future then no eager fill will be applied, as it would preclude other orders that are more likely to fill, from bunching and reloading the inventory to the target short level. The probability is defined as 100% for market orders and for limit orders as a function of the historical volatility as well as the limit and current market prices.

Once the final order size has been determined through the above process, the order will be directed to the market.

Figure 29:
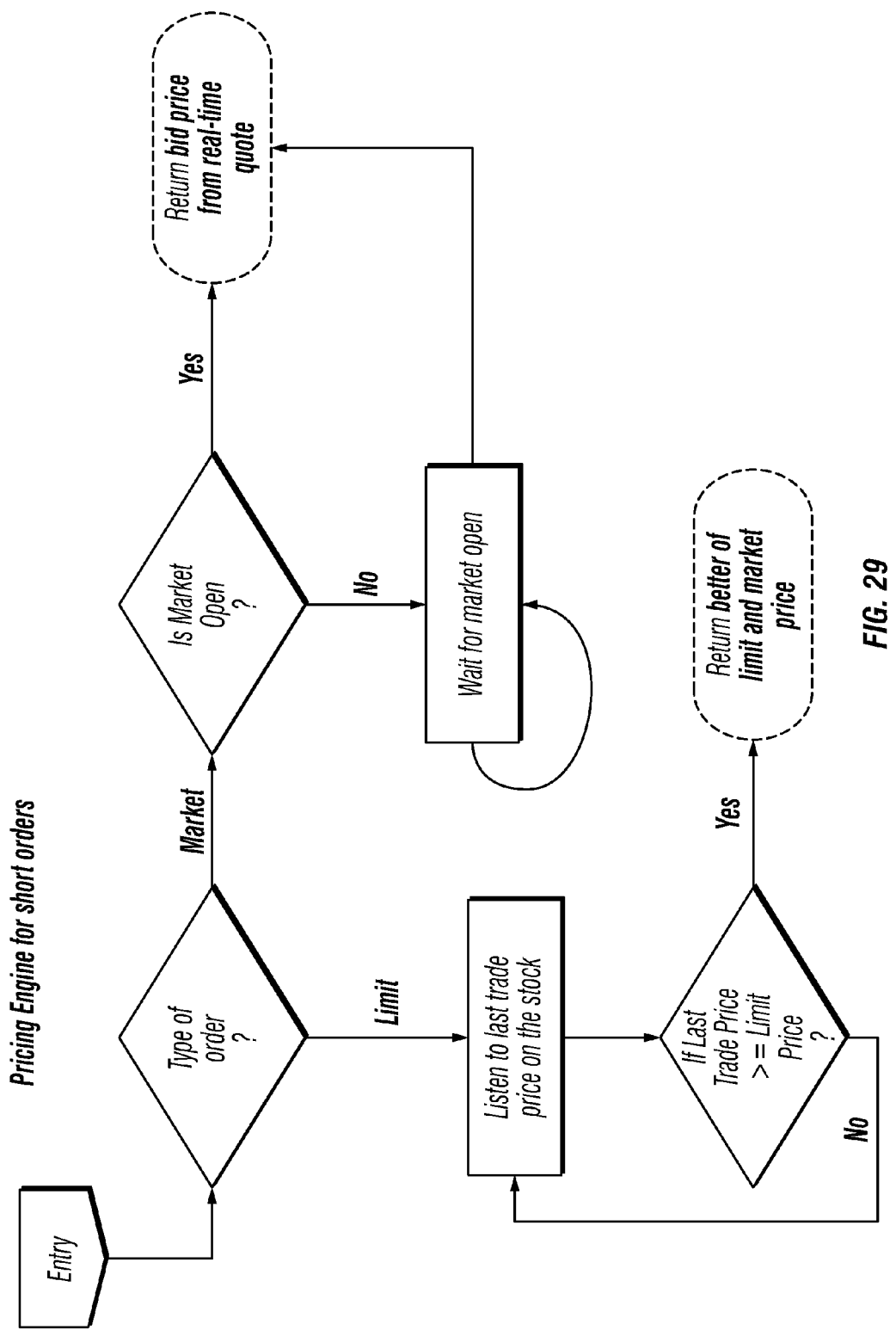
FIG. 29 illustrates an embodiment of how the pricing engine logic prices sell short orders.

FIG. 29 illustrates how the pricing engine 18 logic prices short orders. First, the type of order is determined. If it is a limit order, then the pricing engine 18 looks at the last trade price of the stock. When the last trade price is not greater than or equal to the limit price, then the pricing engine 18 goes back and looks at the most recent trade price of the stock. When the last trade price is greater than or equal to the limit price, then the price is assigned as the better of the limit and market price. In the event that the order is a market order, and the market is open, the price is assigned as the bid price of a real time quote. If the market is not open, then the pricing engine 18 waits for the market to open before it proceeds.

Figure 30:
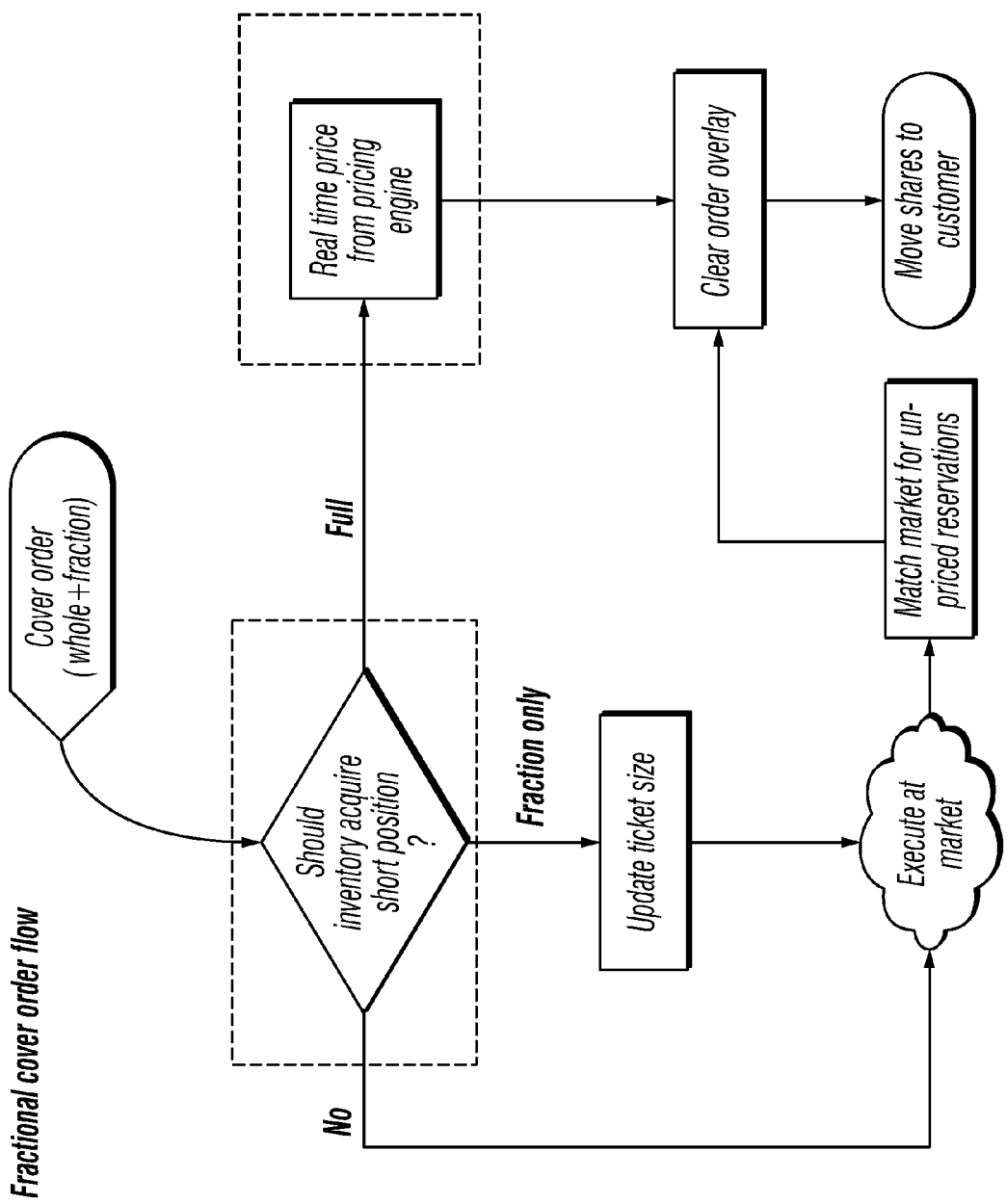
FIG. 30 illustrates an embodiment of the system routing a buy to cover order through a logic resource that decides whether or not the full order, only the fraction component of the order, or no part of the order will be covered from the inventory account.

As discussed above, the system 10 also provides for the buy to cover short positions in securities. Logic resources are applied for handling client buy to cover orders. In an attempt to reduce execution costs and facilitate fraction order execution, inventory logic resources are applied. As illustrated in FIG. 30, the system 10 routes the buy to cover order through a logic resource that decides whether or not the full order, only the fraction component of the order, or no part of the order will be covered from the inventory account 16. Depending on the decision from the flow an order overlay is created which represents the net impact of the order on the inventory account 16 e.g. covering of the shares from the inventory account 16 will cause the short position of the inventory account 16 to increase.

Figure 31:
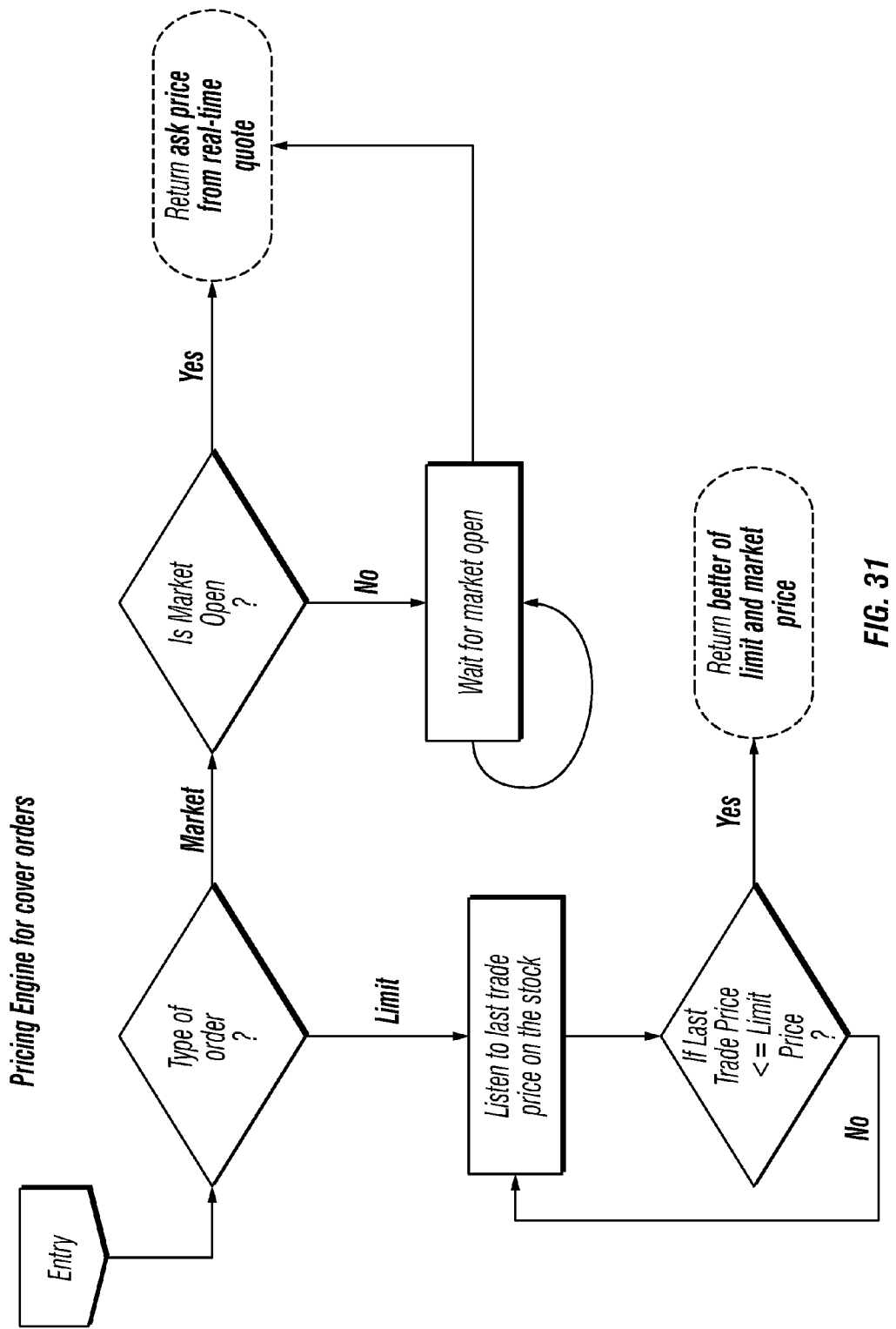
FIG. 31 illustrates an embodiment of how the pricing engine logic prices buy to cover orders.

If the full order is to be covered from the inventory and is deemed to be filled given the current market prices for the stock, the shares are allocated to the inventory at a price determined by the pricing engine 18, FIG. 31. If only the fraction component of the order is to be covered by the inventory, the size of the order is updated e.g. for a cover order of 2.7 shares, 0.7 shares will be covered from the inventory and the order size is updated to 2 shares. No change is made to the size of the order if the order is for a cover on a whole number of shares and the inventory will not acquire any portion of it. For the cases where the inventory will acquire nothing, the order size may be increased to eagerly cover an inventory short position that is higher than the target short position for that security. When the inventory only covers the fraction component, the updated order is sent to the market and the price for the prior reservations is determined from the average fill price obtained in the market e.g., if 2 shares were sent to the market for a cover order for 2.7 shares, the covering of the 0.7 shares from the inventory will be based on the average fill price for the 2 shares.

Figure 32:
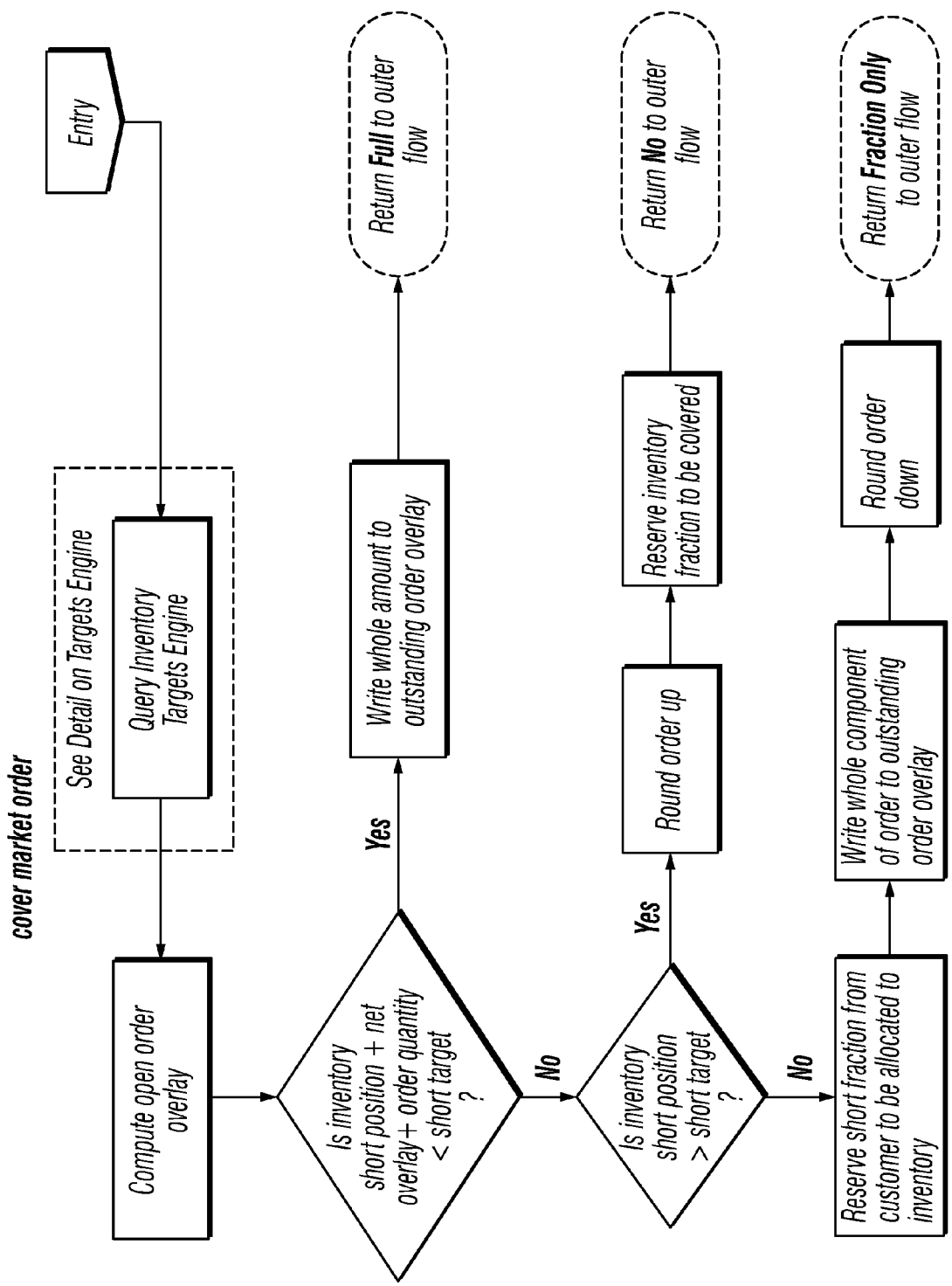
FIG. 32 illustrates an embodiment of the details of a decision process on how much will be covered from the inventory account for a cover market order.

FIG. 32 illustrates the details of the decision process on how much will be covered from the inventory for a cover market order. The targets engine 20 is queried to determine the current short target for the security being traded. The open order overlay is computed for any outstanding short and cover orders for the eventual benefit of the inventory. Determination of the correct target is illustrated in FIG. 24 and described herein. If the sum of the current inventory short position, open overlays and the size of the cover order under consideration is less than the inventory target short position for that stock, the logic informs the outer process flow that the entire cover order will be covered by the inventory. If the entire order cannot be covered, the logic checks if the inventory short position has exceeded the inventory target short position. If the inventory short position is indeed in excess of the inventory target, the cover order is rounded up to reduce inventory risk e.g. if the inventory short target is 10 and the short position is currently 10.5, a cover order for 4.2 shares will be rounded up to 5 such that the inventory short position is reduced to 9.7 (10.5-0.8) when the order is filled. The logic illustrated in FIG. 32 informs the outer flow that no part of the cover order will be covered by the inventory. If the inventory is at or below target, the inventory will cover the fraction component of the order e.g. the inventory target is 10 and the inventory short position is 9.7 then the 0.2 fraction component of a cover order for 4.2 shares can be covered by the inventory. The logic then informs the outer flow that the fraction can be covered by the inventory and the order size is pared down to the whole number only.

Figure 33:
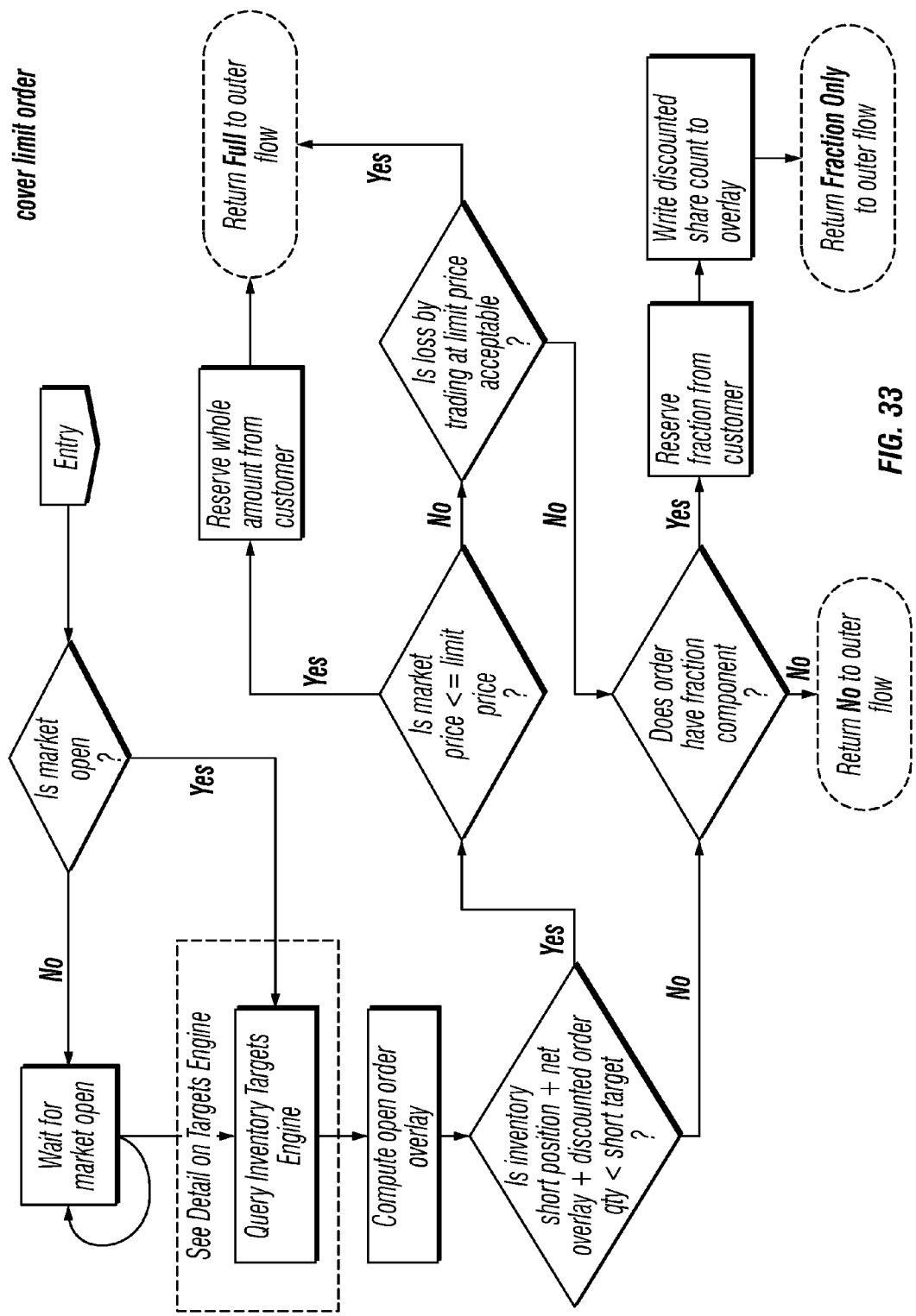
FIG. 33 illustrates an embodiment of the logic for cover limit orders.

FIG. 33 illustrates the logic for cover limit orders. The logic first determines whether or not the market is open. If it is not open the logic waits until the market opens before proceeding. The targets engine 20 is queried for the appropriate short target for the security being traded. The target, in conjunction with the net open order overlay and current short position, is used to determine whether or not the inventory account 16 should cover the shares. If the inventory short position summed with the open order overlay and discounted order quantity is less than the target, then the inventory attempts to cover the shares. If the order is marketable, then the order quantity is reserved from the customer and the logic returns to the outer flow that the inventory will cover the full amount of the order. If the order is not marketable the logic determines whether or not the projected loss from covering the shares is acceptable. If it is acceptable, the logic returns to the outer flow that the inventory will cover the full amount of the order. However if the limit price is too low relative to the current market price, the minimal number of shares will be covered by the inventory. In the case when the order has no fraction component or when covering the order would push the short position above the target, the inventory does not cover anything and returns to the outer flow that it will cover nothing. However if a fraction component of the order exists, the fraction will be reserved from the customer and written to the order overlay. The order size will be reduced by rounding down to the nearest integer.

FIG. 31 illustrates how the pricing engine 18 logic prices buy to cover orders. First, the type of order is determined. If it is a limit order, then the pricing engine 18 looks at the last trade price of the stock. When the last trade price is not less than or equal to the limit price, then the pricing engine 18 goes back and looks at the most recent trade price of the stock. When the last trade price is less than or equal to the limit price, then the price is assigned as the better of the limit and market price. In the event the order is a market order, and the market is open, the price is assigned as the ask price of a real time quote. If the market is not open, then the pricing engine 18 waits for the market to open before it proceeds.

Figure 34:
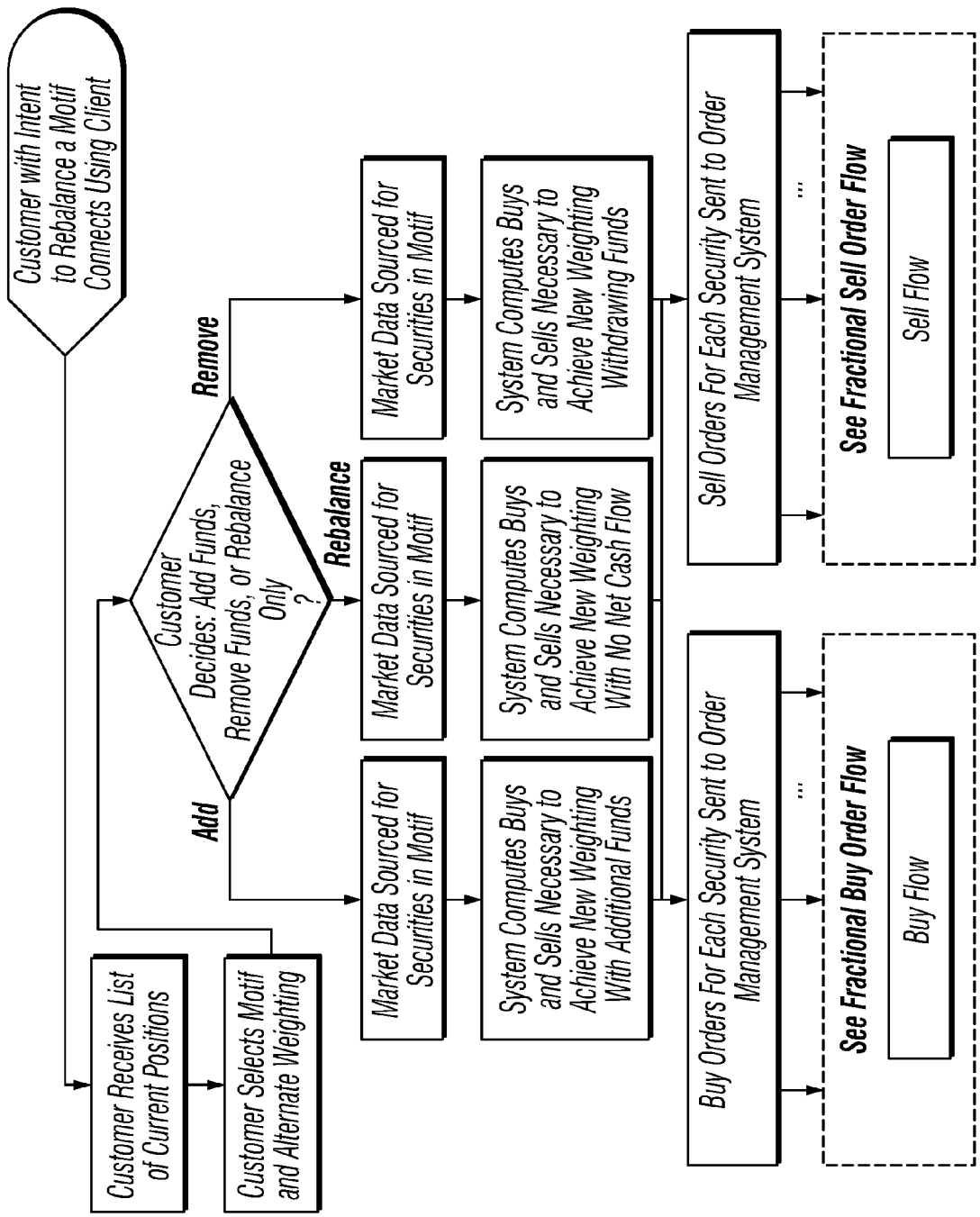
FIG. 34 is a flowchart for a customer that desires to rebalance a share-weighted portfolio and connects through the customer interface.

FIG. 34 is a flowchart for a customer that desires to rebalance a share-weighted portfolio and connects through the customer interface. The customer receives a list of current positions and selects a share-weighted portfolio and an alternate weighting. The customer then decides to, (i) add funds, (ii) remove funds or (iii) only rebalance the share-weighted portfolio. When adding funds, market data is sourced for securities in the share-weighted portfolio. The system 10 computes buy and sell orders that are necessary to achieve the new weighting and add the desired additional funds to the share-weighted portfolio. When the customer elects to remove funds, market data is also sourced to compute the buy and sell orders necessary to achieve the new weighting and remove the desired amount of funds. With a rebalance, the system 10 computes buy and sell orders necessary to achieve new weighting with no net cash flow. Buy and sell orders are then sent to the order management system. Fraction buys and sells are achieved using the flowcharts of FIGS. 13 and 20 and described herein.

Figure 35:
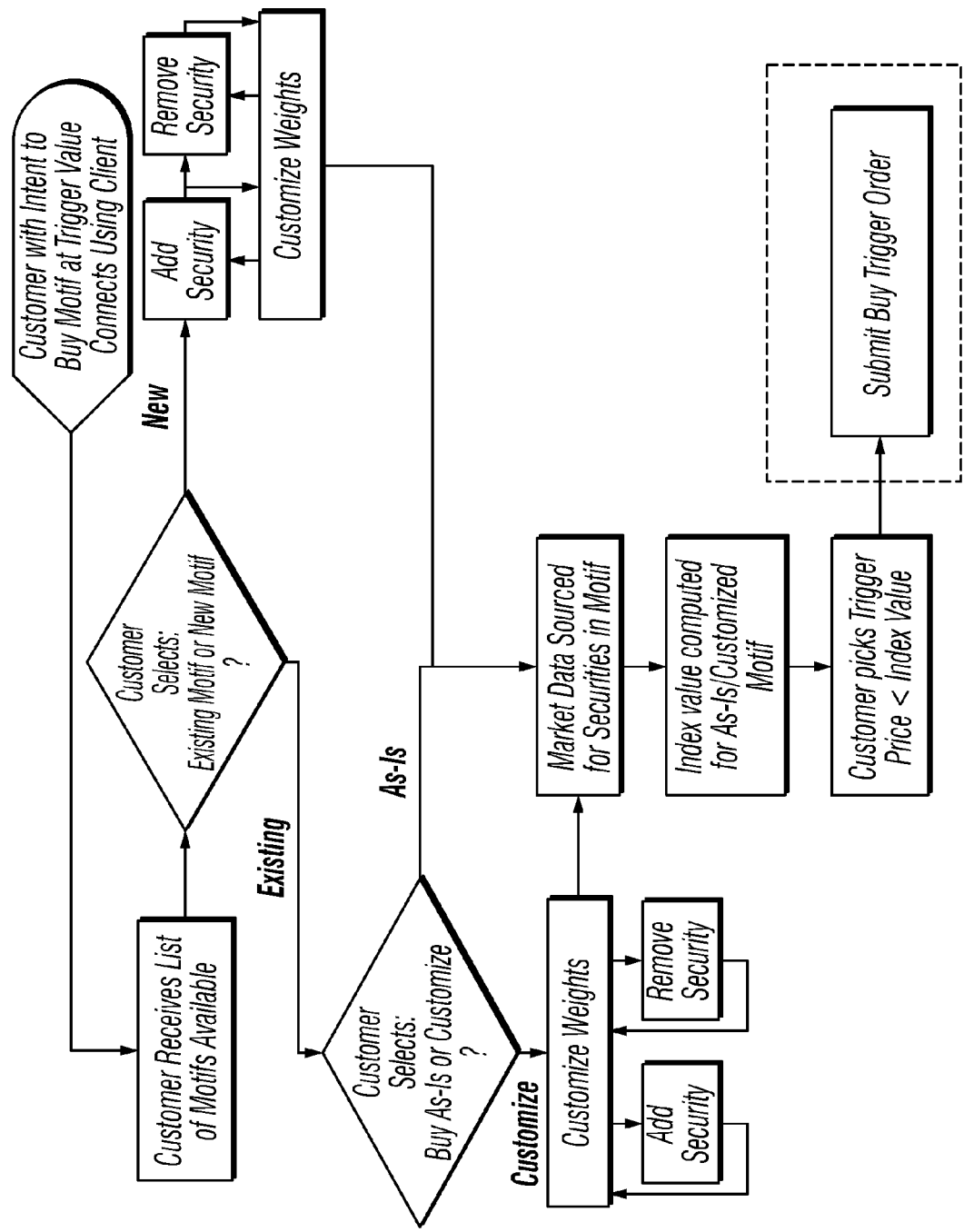
FIG. 35 is an embodiment of a flowchart of a customer buy trigger order flow.

FIG. 35 is flowchart of customer buy trigger order flow. When a customer wants to buy a share-weighted portfolio at a trigger value, the customer receives a list of available share-weighted portfolios. The customer selects an existing or new share-weighted portfolio. With a new share-weighted portfolio, the customer adds, removes and customizes security weights until the desired construction is achieved. For an existing share-weighted portfolio, the customer selects whether to buy as-is or customize. If the customer decides to customize, securities are added, removed, and weights are customized until the desired construction is achieved. Market data is sourced for the securities in the share-weighted portfolio and an index value is computed for the construction. The customer selects a trigger price that is less than the index value and also selects the amount to be invested. This is then submitted as a buy trigger order. A non-customized order follows a similar path.

Figure 36:
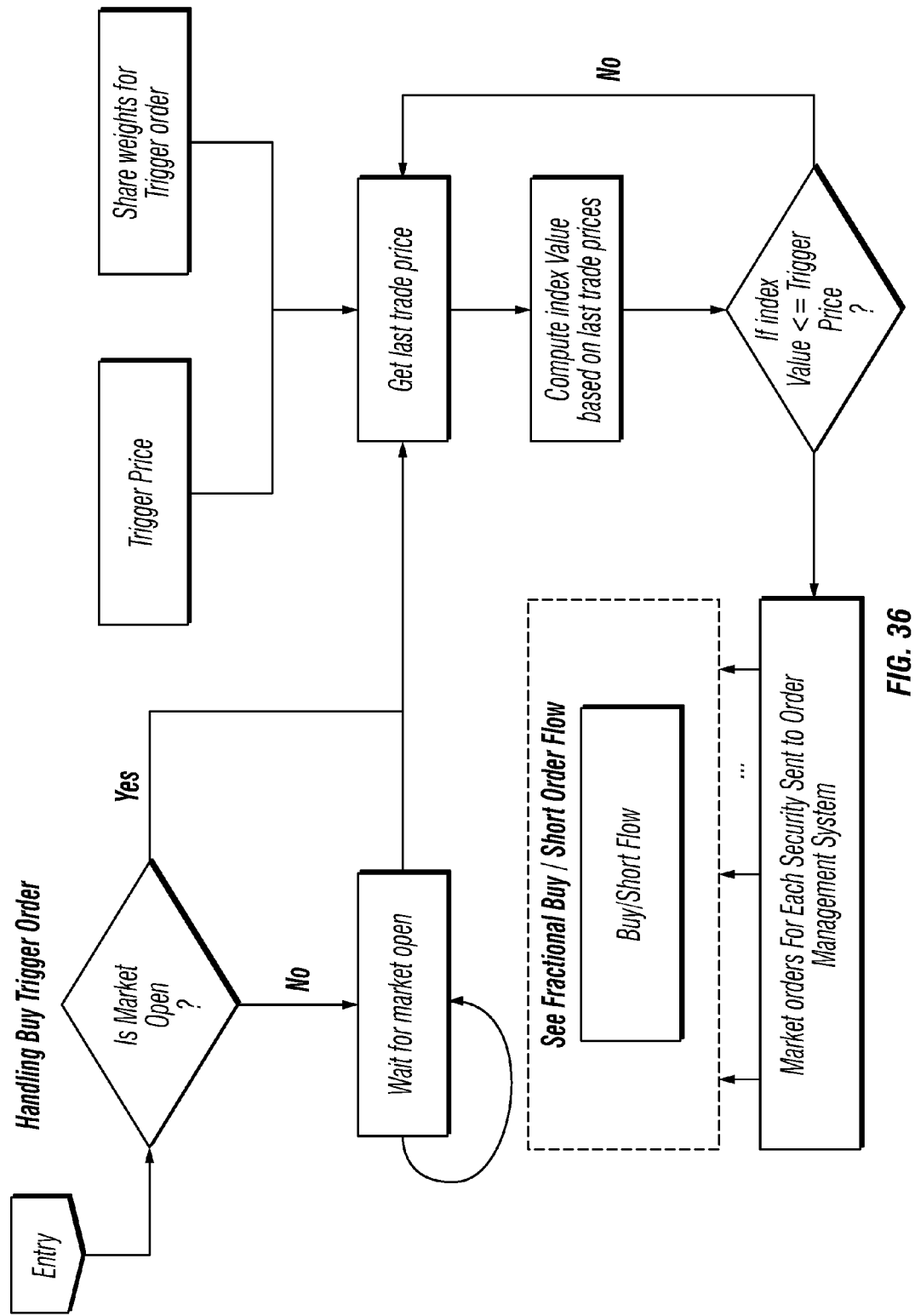
FIG. 36 illustrates one embodiment of the handling of buy trigger orders.

The handling of buy trigger orders is illustrated in FIG. 36. The trigger order flow waits for the computed index value to reach the desired limit index value. Once the index value falls below the target, the input dollar amount and the market data are used to compute the appropriate share counts to achieve the desired weighting and dollar amount invested. Buy market orders are created for each security and sent to the buy order flow as described herein.

Figure 37:
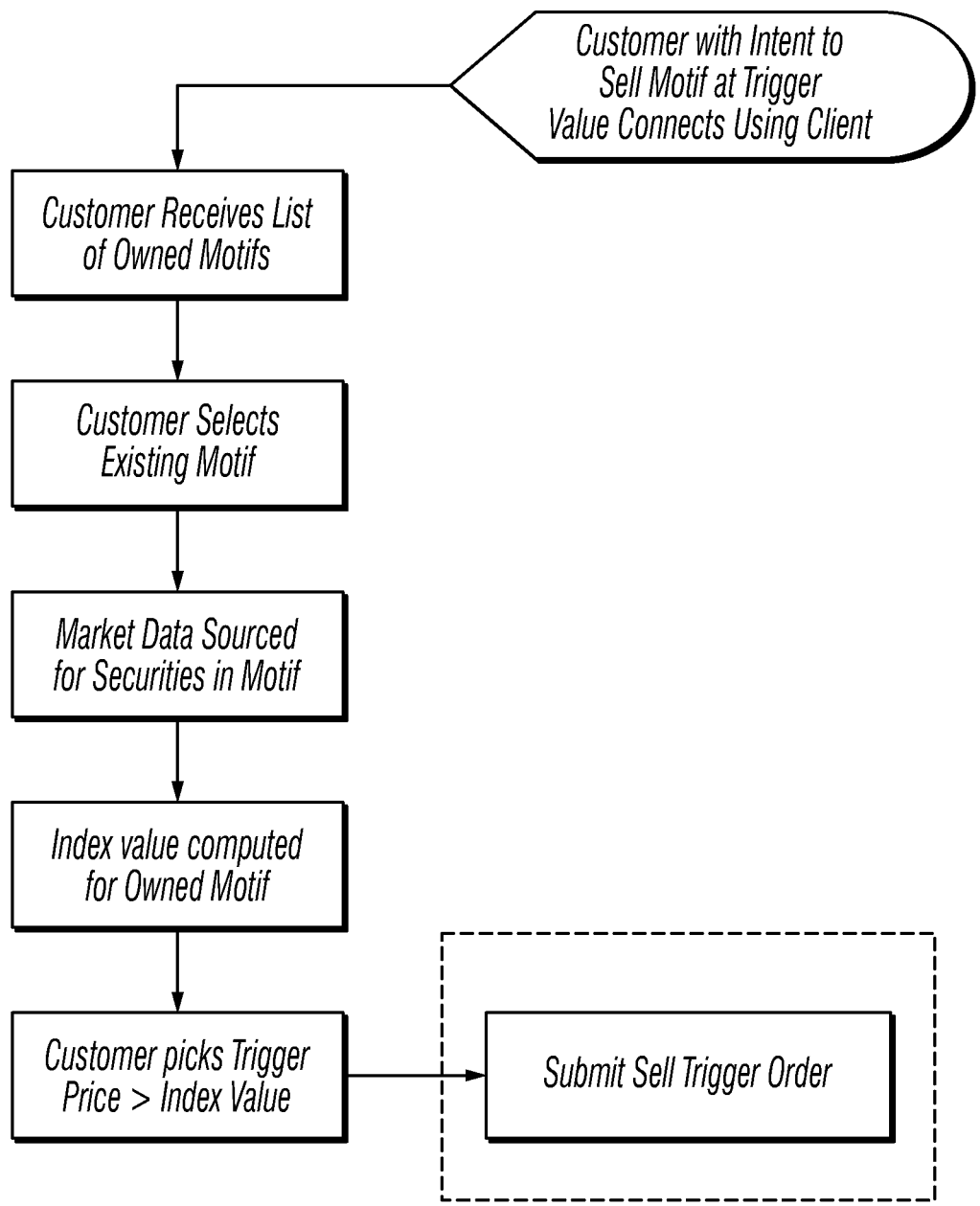
FIG. 37 illustrates one embodiment of a customer sell trigger order flow.

FIG. 37 illustrates a customer sell trigger order flow. In this embodiment, the customer wants to sell a share-weighted portfolio at a trigger value using the client interface. The customer receives a list of his or her owned positions. The customer selects an existing share-weighted portfolio, market data is sourced for securities in the share-weighted portfolio, and an index value computed for the owned share-weighted portfolio. The customer then selects a trigger price that is greater than the current index value. Finally the customer selects the percentage value of the owned share-weighted portfolio to be sold. The order is sent to the sell trigger order flow.

Figure 38:
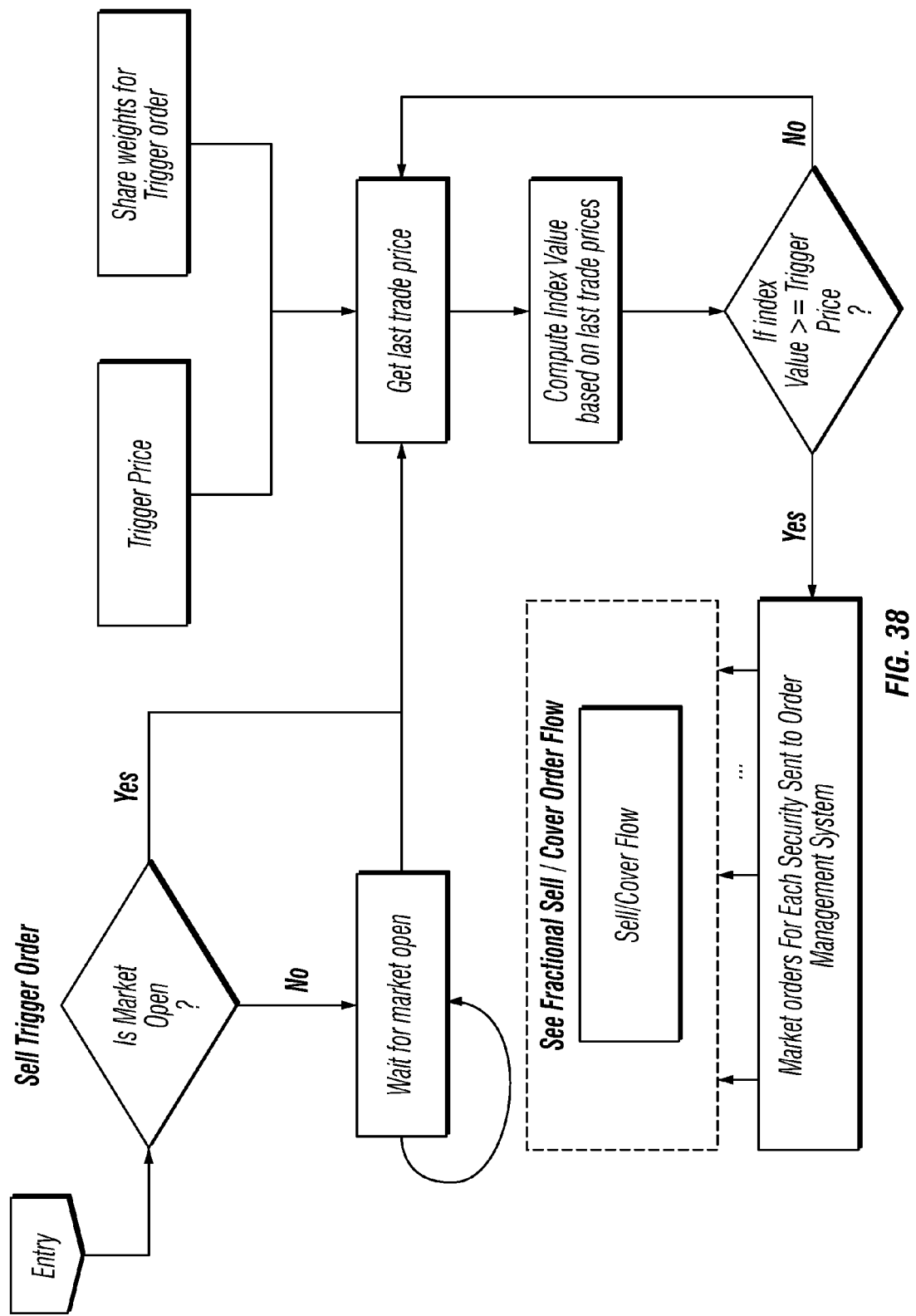
FIG. 38 illustrates one embodiment of a submitted sell trigger order.

A sell trigger order is submitted, as illustrated in FIG. 38. Selling the trigger order takes place when the market is open. The share weights and current prices are used to compute the current index value. The logic continues to compute the current index value until the value is greater than the trigger price. Once the trigger index value is hit the sell percentage is used to compute the number of shares to be sold for each security and sell orders are entered in the sell order flow described herein.

The system 10 also enables customers to access hedging of market exposure or harvesting of tax losses. The trading engine is configured to process the client hedging of market exposure or harvesting of tax losses order and enables the trading of fraction shares in real time as well as reduces a frequency of orders sent to market by executing principal trades against the inventory account 16.

In another embodiment of the present invention, the trading engine processes the hedging of market exposure or harvesting of tax losses order in real time as a single order. For a buy order the trading engine (i) fills the buy order for both whole and fraction shares from the inventory account 16 if there is sufficient inventory in the inventory account 16, (ii) when there is insufficient inventory completes a purchase of fraction shares first from the inventory account 16 and then purchases the remainder of the buy order from the market, and (iii) when the inventory account 16 can not fill any of the buy order then the trading engine purchase the entire buy order from the market and also purchases a target of share set by the targets engine 20 for the inventory account 16.

Figure 39:
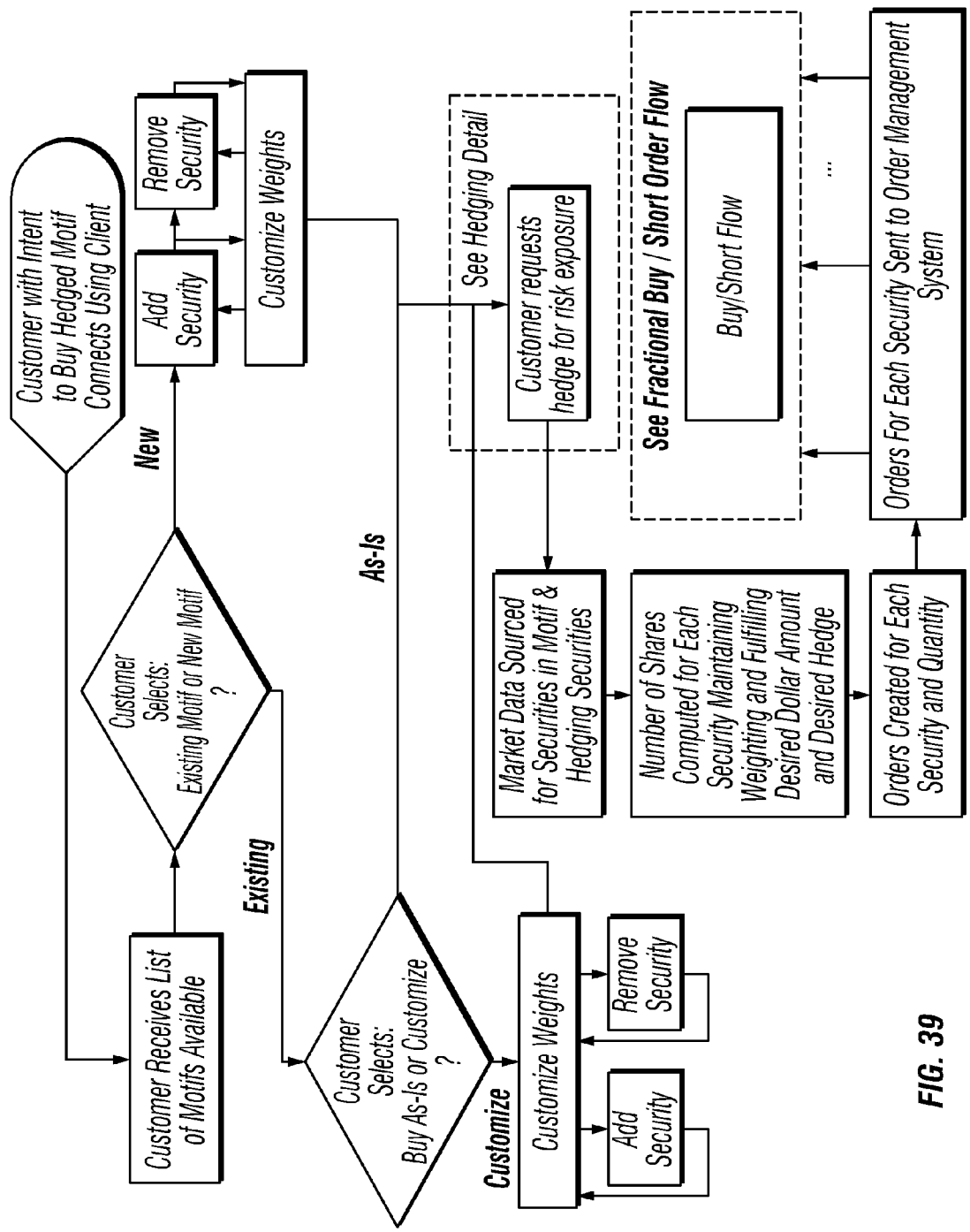
FIG. 39 illustrates an embodiment of a flow for a customer desiring to buy a hedged share-weighted portfolio.

In FIG. 39 a customer wants to buy a hedged share-weighted portfolio. Similarly to the aforementioned buy flow the customer receives from the system 10 a list of available share-weighted portfolios. The customer selects either an existing or a new share-weighted portfolio. For a new motif the customer adds or removes securities, as well as customizes weights until the desired construction is achieved. If the customer chooses an existing motif he or she will then choose whether to buy as-is or to customize the share-weighted portfolio. If the customer elects to customize they will add or remove securities, and customize weights until the desired construction is achieved. The customer requests a hedge for a risk exposure. Market data is sourced for securities in the share-weighted portfolio and for the hedging securities. A number of shares is computed for each security while maintaining weighting and fulfilling desired dollar amount and desired hedge. Orders are created for each security and quantity. Orders are then sent to the order management system as described herein.

Figure 40:
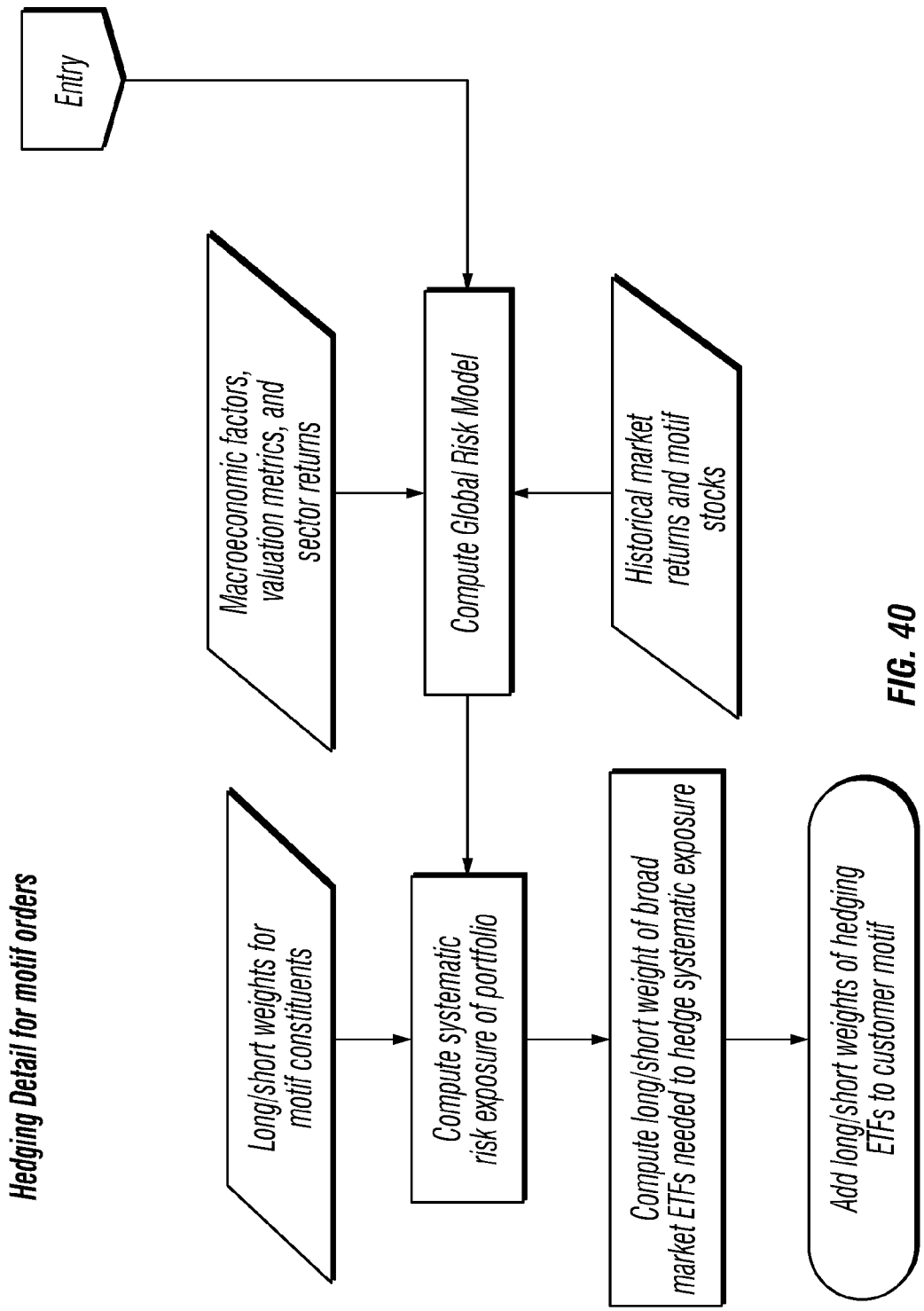
FIG. 40 illustrates further details for hedging.

Referring now to FIG. 40, more details are provided for hedging. A global risk model is computed using macroeconomic factors, valuation metrics, and sector returns. Historical market returns and share-weighted portfolio stocks are also use for the compute the global risk model. Long/short weights for share-weighted portfolio constituents are used to compute systematic risk exposure of the share-weighted portfolio. Hedging securities are selected and long/short weights for hedging securities are computed to achieve the desired hedge. Long/short weights of hedging securities are added to the customer's share-weighted portfolio.

Figure 41:
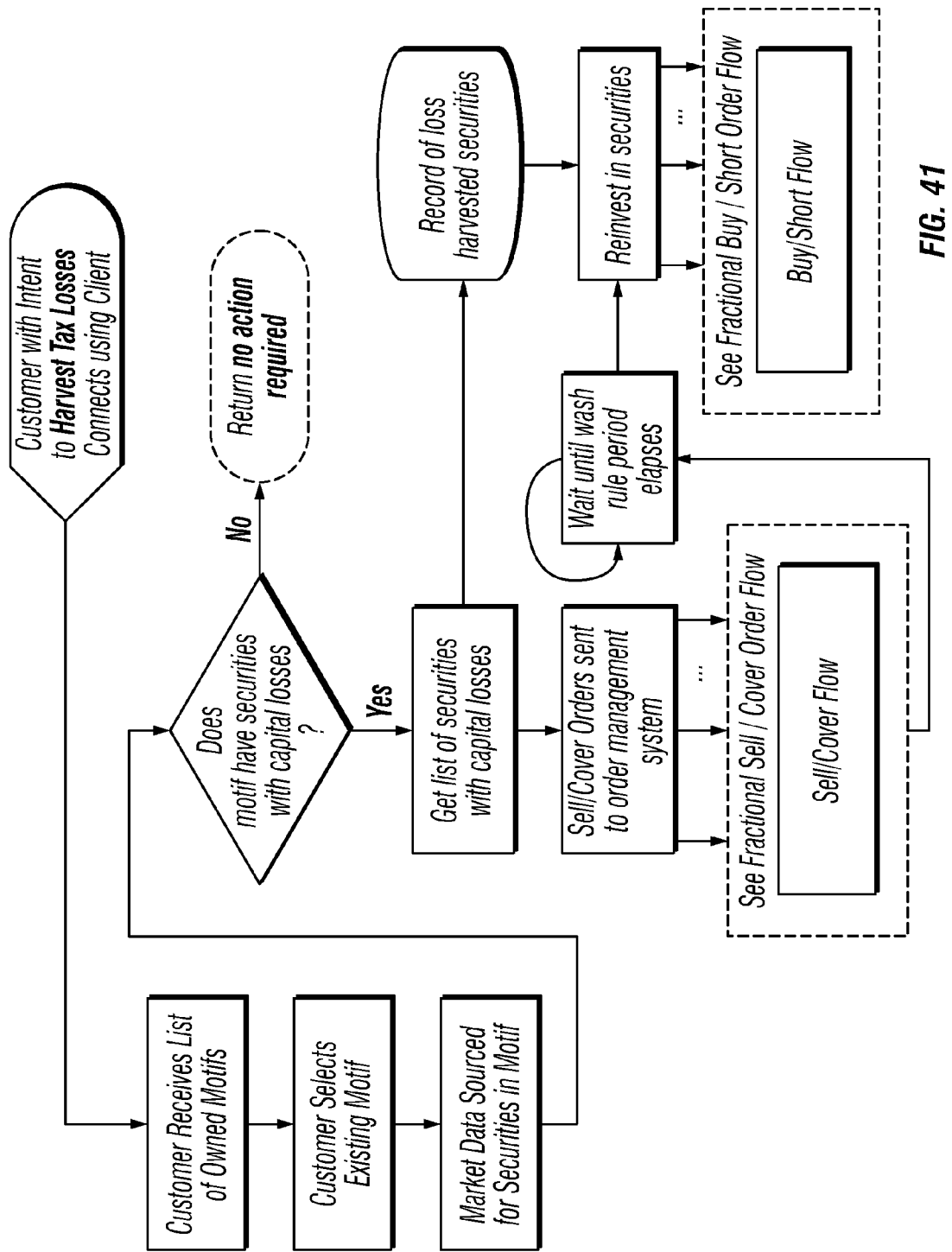
FIG. 41 illustrates an embodiment of tax loss harvesting.

FIG. 41 illustrates an embodiment of tax loss harvesting. The customer receives a list of owned share-weighted portfolios and selects an existing motif. Market data is sourced for securities in the share-weighted portfolio. If the share-weighted portfolio does not have securities with capital losses then the client is informed that no action is required. If the share-weighted portfolio contains securities that have incurred unrealized capital losses, sell or buy to cover orders including whole and fraction shares are executed for these securities. A record is maintained of the securities for which tax losses were harvested. There is a wait until the wash rule period elapses. A reinvestment is then made in the same securities through buy or sell short orders that include whole and fraction shares.

In another embodiment, the system 10 provides for at least one of, a client buy, sell, sell short and buy to cover order from a customer associated with a social media network and having at least one social network friend. A social networking engine allows customers to share information for at least one of, portfolios, orders, investment ideas. The social networking engine allows users to execute securities transactions in real time based on the shared information. Customers are allowed to share information for at least one of, portfolios, orders, investment ideas.

Figure 42:
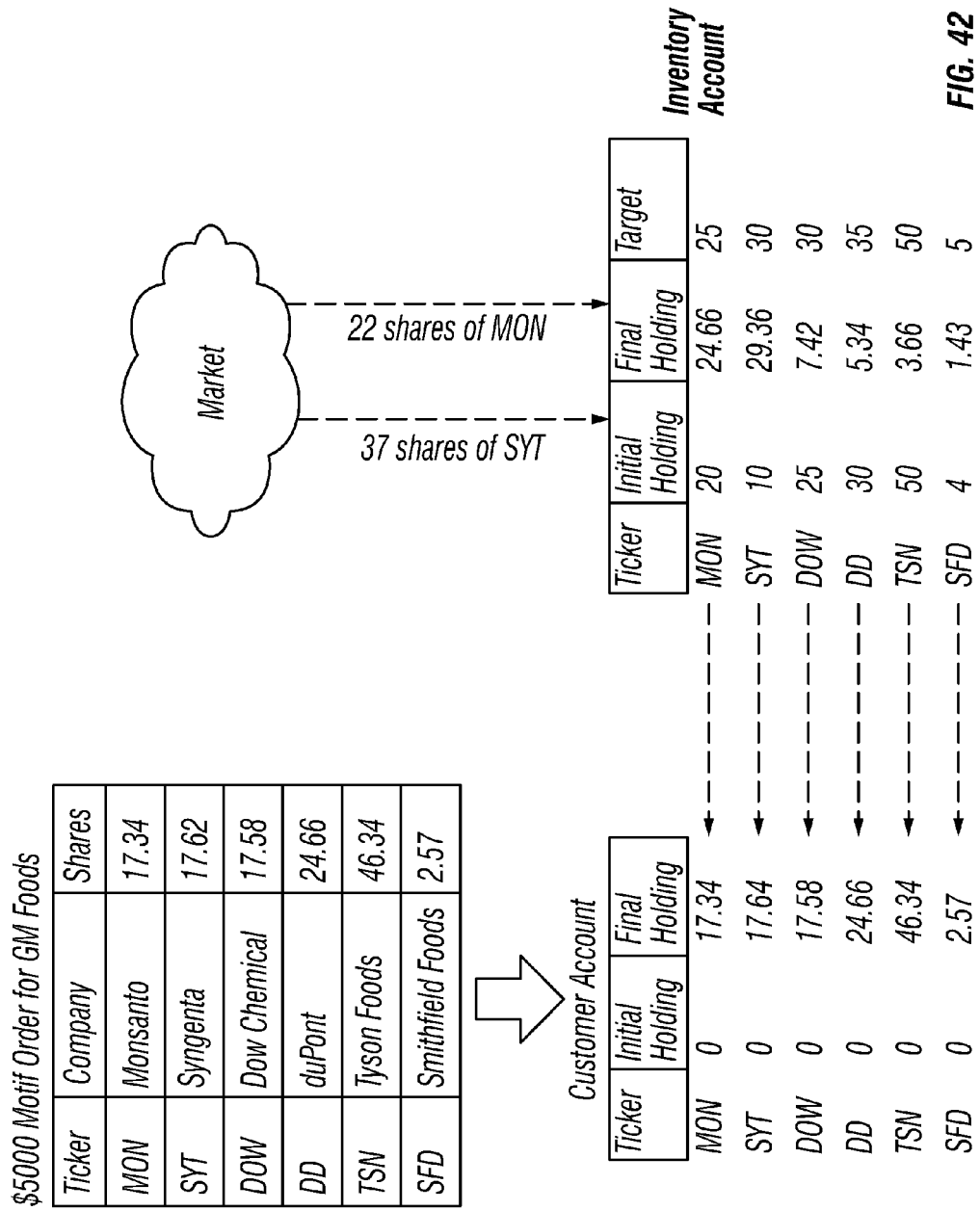
FIG. 42 illustrates an example of a share-weighted portfolio order.

FIG. 42 illustrates an example of a share-weighted portfolio order.

Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

What is claimed is:

1. A system for allowing a client to balance a client's security portfolio that includes constituent securities with a set of securities within different segments of securities, comprising:
   a client device with a client interface;
   a host server coupled to the client device which in operation executes logic resources for balancing the portfolio;
   a balancing engine with logic resources that in operation allow a client to change the client's security portfolio with different segments and keep it in balance at all times, wherein the balancing engine in operation is configured to provide that any constituent moved by a client remains at a declared level and remaining constituents are proportionally balanced so that the sum of the weights adds to 100%, the logic resources determining if there are any unlocked securities that do not have weights set at levels declared by the client, if there are unlocked securities then, the set of securities is filtered to only include the unlocked securities;
   computing a sum of the unlocked securities;
   for each of a security to be adjusted, an adjustment is calculated as a weight of the security divided by a sum of weights of securities to be adjusted multiplied by a total amount to apply across the set of securities to create a proportional adjustment that is added to the security's weight;

when there are no unlocked securities in the set of securities then the logic resources determines if it is allowed to modify the weights of locked securities whose weights have been set at declared levels by the client;

when a modification of locked securities is allowed, then the locked securities are used as the set of securities to be adjusted;

recalculating segment weights as a sum of the weights of securities within each segment; and updating user interface elements related to the segments.

2. The system of claim 1, wherein the balancing engine in operation is configured to provide for adjustment of weight for a group of securities.

3. The system of claim 1, wherein positive and negative weights can be adjusted to represent long or short exposure to an underlying security, wherein a sum of an absolute value of the negative and positive percentages adds to 100%.

4. The system of claim 1, wherein a declared weight level of a stock can be overridden by client adjustment.

5. The system of claim 1, wherein a client can disable declared weight levels of a stock for a given constituent.

6. The system of claim 1, wherein errors are displayed to the client when the declared weight level of a stock prevents the desired action.

7. The system of claim 1, further comprising:
a trading engine which in operation processes client orders independently from other clients.

8. The system of claim 7, wherein the trading engine in operation does not net client orders when processing client orders.

9. The system of claim 1, further comprising:
a pricing engine configured to provide a market price of shares transacted from the inventory account.

10. The system of claim 1, wherein a client's order is based on a pre-packaged or customized thematically weighted portfolio.

11. The system of claim 1, wherein the host server is configured to receive requests for dynamic advertisement.

12. The system of claim 1, wherein the client device is selected from at least one of, a smart or dumb terminal, network computer, personal digital assistant, wireless device, smartphone, tablet, game machine, music player, mobile telephone, laptop, palmtop, wireless telephone, information appliance, workstation, minicomputer, mainframe computer and other computing device.

13. The system of claim 1, wherein the client device includes logic resources that allow a client to perform at least one of, create, compare, customize, promote, track, optimize, and shop for portfolios of securities.

14. A method for allowing a client to balance a client's security portfolio that includes constituent securities, comprising:
providing a client device with a client interface, and a balancing engine;
using the balancing engine to allow the client to change the client's security portfolio with different segments and keep it in balance at all times;
applying the balancing engine to provide that any constituent moved by the client remains at a declared level and remaining constituents are proportionally balanced so that the sum of the weights adds to 100%;
determining if there are any unlocked securities that do not have weights set at levels declared by the client, if there are unlocked securities then, the set of securities is filtered to only include the unlocked securities;
computing a sum of the unlocked securities;
for each of a security to be adjusted, an adjustment is calculated as a weight of the security divided by a sum of weights of securities to be adjusted multiplied by a total amount to apply across the set of securities to create a proportional adjustment that is added to the security's weight;
when there are no unlocked securities in the set of securities then the logic resources determines if it is allowed to modify the weights of locked securities whose weights have been set at declared levels by the client;
when a modification of locked securities is allowed, then the locked securities are used as the set of securities to be adjusted;
recalculating segment weights as a sum of the weights of securities within each segment; and
updating user interface elements related to the segments.

15. The method of claim 14, further comprising:
using the balancing engine to provide for adjustment of weight for a group of securities.

16. The method of claim 14, further comprising:
adjusting positive and negative weights to represent long or short exposure to an underlying security, wherein a sum of an absolute value of the negative and positive percentages adds to 100%.

17. The method of claim 14, wherein a declared weight level of a stock can be overridden by client adjustment.

18. The method of claim 14, further comprising:
enabling the client to disable declared weight levels for a given constituent.

19. The method of claim 14, further comprising:
displaying errors to the client when a declared weight level prevents the desired action.

20. The method of claim 14, further comprising:
providing a trading engine to processes client orders independently from other clients.

21. The method of claim 20, wherein the trading engine in operation does not net client orders when processing client orders.

22. The method of claim 14, further comprising:
using a pricing engine of the system to provide a market price of shares transacted from the inventory account.

23. The method of claim 14, wherein the client's order is based on a pre-packaged or customized thematically weighted portfolio.

24. The method of claim 14, further comprising:
receiving requests for dynamic advertisement.

* * * * *